United States Patent [19]
Tamura et al.

[11] Patent Number: 5,844,543
[45] Date of Patent: Dec. 1, 1998

[54] INFORMATION PROCESSING APPARATUS

[75] Inventors: Yoshimi Tamura, Nara; Tetsuo Tanihata, Yamatokoriyama; Satoshi Yamada, Kitakatsuragi-gun, all of Japan

[73] Assignee: Sharp Kabushiki Kaisha, Osaka, Japan

[21] Appl. No.: 236,086

[22] Filed: May 2, 1994

[30] Foreign Application Priority Data

| May 14, 1993 | [JP] | Japan | 5-113025 |
| Jul. 23, 1993 | [JP] | Japan | 5-182779 |
| Dec. 10, 1993 | [JP] | Japan | 5-310872 |

[51] Int. Cl.⁶ .................................................. G09G 5/00
[52] U.S. Cl. ........................ 345/156; 345/168; 345/179; 345/905
[58] Field of Search ............... 345/87, 179, 168, 345/156, 905, 30, 126; 361/679, 680, 681, 686

[56] References Cited

U.S. PATENT DOCUMENTS

| 2,526,539 | 10/1950 | Carroll . | |
| 4,267,555 | 5/1981 | Boyd et al. . | |
| 4,542,377 | 9/1985 | Hagen et al. . | |
| 4,739,316 | 4/1988 | Yamaguchi et al. | 345/87 |
| 4,831,368 | 5/1989 | Masimo et al. | 345/126 |
| 5,077,551 | 12/1991 | Saitou . | |
| 5,238,421 | 8/1993 | Kobayashi . | |
| 5,255,214 | 10/1993 | Ma | 361/680 |
| 5,262,759 | 11/1993 | Moriconi et al. | 345/30 |
| 5,329,289 | 7/1994 | Sakamoto et al. | 345/126 |
| 5,390,075 | 2/1995 | English et al. . | |
| 5,394,297 | 2/1995 | Toedter | 361/681 |
| 5,489,924 | 2/1996 | Shima et al. | 345/173 |

FOREIGN PATENT DOCUMENTS

| 0394879 A2 | 4/1990 | European Pat. Off. . | |
| 0454120 A2 | 4/1991 | European Pat. Off. . | |
| 0458316 A2 | 5/1991 | European Pat. Off. . | |
| 4-188213 | 7/1992 | Japan . | |
| 4-188214 | 7/1992 | Japan . | |
| 4-218820 | 8/1992 | Japan . | |
| 4-221989 | 8/1992 | Japan . | |
| 4221989 | 8/1992 | Japan | 345/905 |
| 525206 | 2/1940 | United Kingdom . | |
| 2239538 | 12/1990 | United Kingdom . | |
| WO 93/01700 | 1/1993 | WIPO . | |

OTHER PUBLICATIONS

Patent Abstracts of Japan, vol. 17, No. 163 (P–1513) 30 Mar. 1993 & JP–A–04 326 456 (Sharp) 16 Nov. 1992.
Machine Design, vol. 63, No. 11, 6 Jun. 1991, Cleveland US, p. 36 XP237693 "Notebook More Like Desktop".
Layman et al, "Mechanical Design of the HP–18C and HP–28C Handheld Computers", Hewlett–Packard Journal, vol. 38, No. 8, Aug. 1987, Palo Alto, US, pp. 17–20.

*Primary Examiner*—Richard Hjerpe
*Assistant Examiner*—Juliana S. Kim
*Attorney, Agent, or Firm*—Nixon & Vanderhye P.C.

[57] ABSTRACT

An information processing apparatus is provided with a main body including a key-control section, a connecting section rotatably provided with respect to the main body and an input display section which is rotatably connected to the connecting section and enables pen-input. The information processing apparatus is capable of taking three positions: a stored position, a key-input position and a pen-input position. The center of rotation of the input display section and the connecting section is set at the back of the input display section. The connecting section serves as a stopper for controlling the rotating movement of the connecting section, and enables the rotatable range of the input display section to be controlled within 180° without requiring a special mechanism. Thus, the input display section can be prevented from contacting the key-control section of the main body by over-rotating in the pen-input position. Moreover, since the input display-section is supported by the connecting section, the input display section can be held in stable conditions both in the key-input position and in the pen-input position.

26 Claims, 39 Drawing Sheets

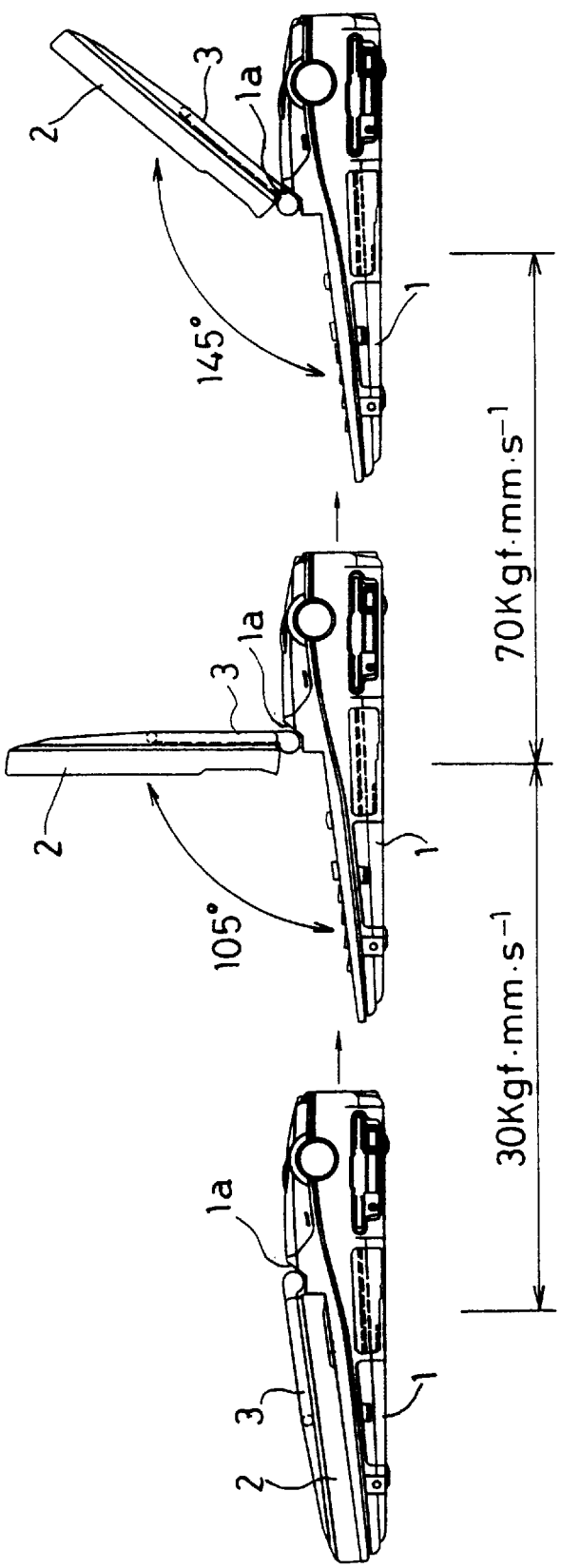

F I G. 45
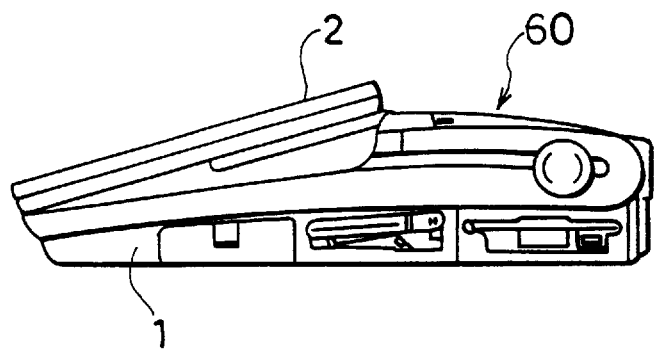

INFORMATION PROCESSING APPARATUS

FIELD OF THE INVENTION

The present invention relates to an information processing apparatus such as a word processor, a personal computer, etc., which is provided with a key-control section such as a key board and an input display section whereon input is permitted using a pen.

BACKGROUND OF THE INVENTION

Conventionally, key-input using a keyboard has been accepted as the most common input method for a simplified-type information processing apparatus. Recently, a pen-input technique using a tablet integrated with a display screen has been developed, which enables character and image input handwritten with a pen, editing by hand, etc.

Generally, when carrying out a key-input operation, it is preferable to carry out touch-typing with a display screen placed in front of the user and a keyboard placed below the display screen. Therefore, this position is considered as the standard position in carrying out a key-input operation.

When carrying out a pen input operation, a tablet surface which serves as a display screen is preferably placed facing upward so that the user can input with a pen as if writing characters on a sheet placed on the desk. Therefore, this position is considered as the standard position in carrying out a pen-input operation.

For the above simplified-type information processing apparatus, it is required to be stored compact so that it is well suited for portable use.

Therefore, the simplified-type information processing apparatus is required to take the following three positions: a stored position at which a display screen of the display section is folded so as to face the keyboard provided in the main body; a key-input position at which the display screen of the display section forms a predetermined angle to the main body so that key-input is permitted at the standard position; and a pen-input position at which the display screen of the display section is placed nearly flat above the keyboard so that pen-input operation can be carried out at the standard pen-input position.

The simplified information processing apparatus which can take the above three positions is disclosed in Japanese Laid-Open Patent Publication No. 188213/1992 (Tokukaihei 4-188213), Japanese Laid-Open Patent Publication No. 188214/1992 (Tokukaihei 4-188214), Japanese Laid-Open Patent Publication No. 218820/1992 (Tokukaihei 4-218820), and Japanese Laid-Open Patent Publication No. 221989/1992 (Tokukaihei 4-221989).

The information processing apparatus disclosed in the Japanese Laid Open Patent Application No. 4-188213 includes a top cover provided so as to be rotatable with respect to the main body and a display section rotatably provided and covered by the top cover which serves as the outer frame. A hinge mechanism for rotating the display section with respect to the outer frame is provided on both side faces of the display section. Here, the axis of rotation of the top cover is set parallel to the axis of rotation of the display section.

The information processing apparatus disclosed in the Japanese Laid Open Patent Application No. 188214/1992 is arranged such that on one end of a connecting cover provided so as to be rotatable with respect to the main body, a top cover is rotatably provided. A display section is provided on the upper cover. A hinge mechanism for rotating the upper cover with respect to the connecting cover is provided on the side face below the upper cover. The axis of rotation of the upper cover is set perpendicular to the axis of rotation of the connecting cover. Here, since the display screen is inverted between the key input control position and the pen input control position, an exchange of the display address is required.

The information processing apparatus disclosed in the Japanese Laid-Open Patent Application No. 218820/1992 is arranged such that the display section is connected to the main body using the first arm having one end attached to the front portion of the side face of the display section and the second arm having one end attached to the central portion of the side face of the display section. In the apparatus having the above arrangement, the other end of the first arm is arranged so as to move along a long groove formed along the side face of the main body. On the other hand, the other end of the second arm is provided so as to be rotatable with respect to the back end portion of the side face of the main body. The display section is moved from the key-input position to the pen-input position or vice versa as the other end of the first arm moves along the long groove.

The information processing apparatus disclosed in the Japanese Laid-Open Patent Application No. 221989/1992 is arranged such that a support member, provided so as to be rotatable with respect to the main body, has a display section. The support member is provided on both side faces of the display section.

As described, in any of the above publications, by moving the display section using each mechanism, the apparatus can take the above-mentioned three positions: the stored position, the key-input position and the pen-input position. However, because the movable display section is used, the problem of inefficient operation arises.

More specifically, members such as the hinge mechanism which enables a rotatable movement of the display section, the support member, etc., are all provided on the side faces of the display section. In this arrangement, as the fulcrum of the display section for rotatably supporting the display section is provided on the side face, the display section is rotated by 360°, thereby presenting the problem that key input operation cannot be carried out under the stable condition. Moreover, even when it is set in the pen-input position, the input display section may over-rotate and hit the keyboard. In order to prevent the above problem, a mechanism for controlling a rotatable range of the display section is required separately.

Additionally, during the movement from the stored position to the key-input position where the input display section forms a predetermined angle to the main body by rotating a member connecting the display section, a braking force is exerted onto the member being rotated, at the same braking efficiency as the braking force exerted during the movement from the key-input position to the pen-input position or to the stored position by rotating the member connecting the display section and the main body in an opposite direction. Normally, since it is arranged such that the display section can be set at a predetermined angle by a friction hinge, the user feels a strong resistance in opening the display section. If the braking force exerted when lifting up and pressing down the display section is set smaller so as to allow a smoother movement (rotating movement) of the display section, the display section may be suddenly shut, thereby presenting the problem that the display section may damage itself or the main body by an impact.

Furthermore, the angle of sight of the user with respect to the display section differs between the pen-input position and the key-input position, thereby presenting the problem that the display quality and the preciseness in the tablet input may be lowered. Moreover, if the display section hits a key in the pen-input position, key-input error may occur.

In the conventional arrangement where the display section may be set at the key-input position and the pen-input position, a display section formed in a rectangular shape is all provided with a horizontal screen. However, when an A-4 size sheet placed vertically is used, it is not possible to display data included in one sheet on the horizontal screen at one time, thereby presenting the problem that efficient operation cannot be ensured.

SUMMARY OF THE INVENTION

An object of the present invention is to achieve a more accomplished information processing apparatus which is capable of taking at least three positions: a stored position, a key-input control position and a pen-input position by eliminating an inefficient operability due to a rotating movement of the display section.

In order to achieve the above object, the information processing apparatus in accordance with the present invention is characterized by including:

a main body including a key-control section;

an input display section including data input means on a display screen thereof;

a connecting member for connecting the input display section to the main body;

first hinge means for rotatably connecting one end of the connecting member to the main body; and second hinge means for rotatably connecting the other end of the connecting member to a back surface of the input display section.

The information processing apparatus is also characterized by being capable of taking the following three positions:

a stored position at which the display screen of the input display section is placed so as to face the key-control section of the main body;

a first input control position at which the back surface of the input display section is supported by the connecting member, and the display screen of the input display section forms a predetermined angle to the key-control section of the main body so that a key-input is permitted using the key-control section while observing the display screen of the input display section; and a second input control position at which the back surface of the input display section is supported by the connecting member, and the display screen of the input display section is placed facing upward and substantially flat above the key-control section of the main body so that data-input is permitted using the data input means.

According to the above arrangement, a center of rotation of the input display section and the connecting member exists on the back surface of the input display section. Thus, the connecting member serves as a stopper for controlling the rotation of the input display section, thereby permitting the rotatable range of the input display section with respect to the connecting member to be controlled within 180° by making the connecting member in contact with the back surface of the input display section without using a special mechanism. Namely, when the input display section is rotated, since the back surface of the input display section contacts the connecting member, the input display section will not rotate over 180° with respect to the connecting member. Therefore, in the second input control position, the input display section is prevented from contacting the key-control section of the main body by being over-rotated.

In the first input control position, the back surface of the input display section is supported by contacting the connecting member, thereby achieving a stable condition of the input display section. Also in the second input control position, the back surface of the input display section is supported by contacting the connecting member, thereby achieving a stable condition of the input display section.

The information processing apparatus having the above arrangement may be arranged so as to include locking means for locking the input display section to the connecting member and unlocking the input display section from the connecting member. In this arrangement, since the input display section is kept locked to the connecting member during the movement from the stored position to the first input control position or vice versa, the connecting member and the input display section can be integrally rotated, thereby achieving an improved operation efficiency.

Additionally, the information processing apparatus having the above arrangement may be arranged as follows which enables a desirable electrical connection between the main body and the input display section in addition to the effect of improving the operation efficiency.

That is, the information processing apparatus of the present invention may be arranged so as to further including:

a flexible signal wire which communicates through an inner space of the connecting member and electrically connects the main body and the input display section;

a guide shaft member rotatably provided on one end of the connecting member so that its center of rotation coincides with that of the second hinge means; and a guide shaft connecting member for connecting the guide shaft member to a back surface section of the input display section, wherein:

a first through hole is formed in the guide shaft member so that whose cross section circularly expands into the inner space of the connecting member in order to allow a free passage for the signal wire, and a second through hole is formed in the guide shaft connecting member so as to join to the first through hole in order to allow a free passage for the signal wire.

According to the above arrangement, the flexible signal wire which electrically connects the main body and the input display section extends into the input display section and the inner space of the connecting member through the first through hole of the guide shaft member and the second through hole of the guide shaft connecting member. The guide shaft member is connected to the back surface of the input display section by the guide shaft connecting member. The guide shaft member is connected to one end of the connecting member so as to be rotatable about a center of rotation which coincides with the center of rotation of the second hinge means. Additionally the guide shaft member is arranged so as to rotate with the rotation of the input display section with respect to the connecting member.

The input display section is rotated within a range of approximately 180° with respect to the connecting member. Therefore, as the guide shaft member rotates with the rotation of the input display section, the flexible signal wire which passes through the first through hole also bends approximately by 90°. Here, since the first through hole extends into an inner space of the connecting member, the signal line bends along the surface of the circular through hole, thereby preventing the signal wire from sharply bending. As a result, a longer life of the signal line is ensured without being disconnected.

An information processing apparatus having the above arrangement may be provided with a covering member which covers the first through hole of the guide shaft member in order to prevent the signal line from being exposed, thereby improving an appearance of the apparatus.

In order to achieve the above object, the information processing apparatus of the present invention is also characterized by including at least the following members:

a main body including a key-control section;

an input display section including data input means on a display screen thereof;

a connecting member for connecting the input display section to the main body;

first hinge means for rotatably connecting one end of the connecting member to the main body; and second hinge means for rotatably connecting the other end of the connecting member to the input display section, and braking force change means for changing a braking force exerted on the connecting member being rotated according to a rotating direction of the connecting member with respect to the main body.

The information processing apparatus having the above arrangement is further characterized by capable of taking the following three positions:

a stored position at which the display screen of the input display section is placed so as to face the key-control section of the main body;

a first input control position at which the display screen of the input display section forms a predetermined angle to the key-control section of the main body so that key-input is permitted using the key-control section while observing the display screen of the input display section; and a second input control position at which the display screen of the input display section is placed facing upward and substantially flat above the key-control section of the main body so that data-input is permitted using the data input means.

According to the above arrangement, by the braking force change means, a braking force exerted on the connecting member being rotated while the connecting member is being rotated in an "open" direction can be set different from a braking force exerted on the connecting member being rotated while the connecting member is being rotated in a "close" direction, i.e., during a movement from the first input control position to the second input control position or to the stored position. More specifically, for example, by setting the braking force exerted on the connecting member being rotated in the "close" direction larger than the braking force exerted on the connecting member being rotated in the "open" direction, the apparatus can be easily opened from the stored position and the apparatus can be closed gently without having a collision between the input display section and the main body. Thus, an impact force exerted on the input display section and the main body can be reduced, thereby achieving an improved operation efficiency.

In order to achieve the above object, another information processing apparatus of the present invention is characterized by including:

a main body including a key-control section;

an input display section including data input means on a display screen thereof;

a connecting member for connecting the input display section to the main body;

first hinge means for rotatably connecting one end of the connecting member to the main body; and second hinge means for rotatably connecting the other end of the connecting member to the input display section.

The information processing apparatus having the above arrangement is further characterized by being capable of taking the following three positions:

a stored position at which the display screen of the input display section is placed so as to face the key-control section of the main body;

a first input control position at which the display screen of the input display section forms a predetermined angle to the key-control section of the main body so that key-input is permitted while observing the display screen of the input display section; and a second input control position at which the display screen of the input display section is placed facing upward and substantially flat above the key-control section of the main body so that data-input is permitted using the data input means and by further including:

interval control means for controlling an interval between the input display section and the key-control section during a movement from the first input control position to the second input control position.

According to the above arrangement, during the movement from the first input control position to the second input control position, a predetermined interval can be ensured between the input display section and the key-control section by the interval control means, thereby preventing the input display section from contacting the key-control section which may generates key-input error.

In order to achieve the above object, another information processing apparatus of the present invention is characterized by including:

a main body including a key-control section;

an input display section including data input means on a display screen thereof;

a connecting member for connecting the input display section to the main body;

first hinge means for rotatably connecting one end of the connecting member to the main body; and second hinge means for rotatably connecting the other end of the connecting member to the input display section.

The information processing apparatus having the above arrangement is also characterized by capable of taking the following three positions:

a stored position at which the display screen of the input display section is placed so as to face the key-control section of the main body;

a first input control position at which the display screen of the input display section forms a predetermined angle to the key-control section of the main body so that key-input is permitted using the key-control section while observing the display screen of the input display section; and a second input control position at which the display screen of the input display section is placed facing upward and substantially flat above the key-control section of the main body so that data-input is permitted using the data input means, and by further including:

a rotatable range controlling member for controlling a rotatable range of the input display section with respect to the connecting member by contacting the back surface of the input display section, the rotatable range controlling member being provided on the connecting member so as to be capable of moving forward and backward; and drive means for moving the rotatable range controlling member along an orbit of rotation when the connecting member is rotated in an "open" direction during a movement from the stored position to the first input control position and for moving the rotatable range controlling member so as to come off the orbit of rotation of the input display section when the connecting member is rotated in a "close" direction during a movement from the first input control position to the second input control position or to the stored position.

According to the above arrangement, the rotatable range controlling member, which is provided on the connecting member so as to be capable of moving forward and backward, is driven by the drive means. Thus, when the connecting member is rotated in the "open" direction to the first input control position, the rotatable range controlling member is moved to the orbit of the input display section. Namely, in the first input control position, by making the rotatable range controlling member in contact with the back surface of the input display section, the rotatable range of the input display section to the connecting member is controlled.

On the other hand, when the connecting member is rotated in the "close" direction to the stored position or the second input control position, the rotatable range controlling member comes off the orbit of rotation of the input display section, thereby achieving a desirable stored position or the second input position without having the rotatable range of the input display section being controlled with respect to the connecting member.

As described, in the first input control position, the rotation of the input display section is controlled so that the input display section does not contact the main body, thereby avoiding a collision between the end portion of the input display section and the main body which cause them damaged or broken.

In order to achieve the above-described object, another information processing apparatus is characterized by including:

a main body including a key-control section; and
an input display section including data input means on a display screen thereof.

The information processing apparatus is also characterized by being capable of taking the following three positions:

a stored position at which the display screen of the input display section is placed so as to face the key-control section of the main body;

a first input control position at which the display screen of the input display section forms a predetermined angle to the key-control section of the main body so that key-input is permitted using the key-control section while observing the display screen of the input display section; and a second input control position at which the display screen of the input display section is placed facing upward and substantially flat above the key-control section of the main body so that data-input is permitted using the data input means, and by further including:

display position detection means for detecting whether the input display section is in the first input control position or in the second input control position, and key input determination means for determining a key-input invalid when the display position detection means detects that the input display position is in the second input control position even if a key-input is made.

In the above arrangement, the position of the input display position is detected by the display position detection means. Furthermore, the key-input determination means determines an input from the key-control section invalid when the display position detection means detects that the input display section is in the second control position. Therefore, input error from the key-control section in the second input control position can be prevented, thereby improving an operation efficiency.

In order to achieve the improved operation efficiency, the information processing apparatus may be arranged so as to include display voltage control means for controlling a voltage to be applied to the input display section based on the result of detection by the display position detection means between the first input control position and the second input control position. In the above arrangement, a display voltage is controlled so that high quality display can be ensured in respective positions. Thus, even if the angle of the input display section to the main body differs between the above two positions, desirable display quality can be ensured.

Alternatively, the coordinate adjusting means for adjusting the coordinate data of the data input means based on the result of detection by the display position detection means may be provided. Thus, even if the angle of the input display section to the main body differs between the above two positions, input can be made accurately.

In order to achieve the above object, another information processing apparatus of the present invention, is characterized by including:

a main body including a key-control section;
an input display section including data input means on a display screen whose length is different from width;
a connecting member for connecting the input display section to the main body;
display rotating means for rotating the input display section by 90°; and
moving means which enables the input display section to take the following four positions:
  a stored position at which the display screen of the input display section is placed so as to face the key-control section of the main body;
  a first input control position at which the display screen of the input display section forms a predetermined angle to the key-control section of the main body so that key-input is permitted using the key-control section while observing a horizontally placed display screen;
  a second input control position at which the display screen of the input display section is placed facing upward and nearly flat above the key control section of the main body so that data-input is permitted using the data input means while observing a horizontally placed display screen; and
  a third input control position at which the display screen of the input display section forms a predetermined angle to the key-control section of the main body so that key-input is permitted using the key-control section while observing a vertically placed display screen obtained by rotating the input display section from the first input control position by 90° by the display rotating means.

According to the above arrangement, since the input display section is rotated by 90° by the display rotating means with respect to the connecting member, the information processing apparatus is permitted to take the third input position at which the display screen is vertically placed. Therefore, compared with the case where the horizontally placed screen is used, a greater number of rows can be displayed at one time. For example, when creating a document for the vertically placed A4 size sheet, all the data contained in one page can be displayed at one time. Thus, an operation efficiency in the case of key-input using the key-control section when many rows exist in one page can be improved.

Also, in the case of carrying out the data-input by the data input means, as the apparatus is made applicable to the vertically placed display screen, an operation efficiency can be improved.

In the above arrangement where the connecting member is secured to the back surface of the input display section by the second hinge means, by rotating the input display section by the display rotating means in the direction orthogonal to the rotating direction of the input display section by the second hinge means, a smoother movement in changing the apparatus position can be achieved.

More specifically, the apparatus position can be smoothly changed from the first input control position to the third input control position or from the second input control position to the fourth input control position or vice versa. Furthermore, by moving the input display section to a position behind the main body by the second hinge means and by inverting the input display section by the display rotating means, the display screen can be set behind the main body. As a result, the apparatus is enabled to take additional position, thereby achieving a still improved an operation efficiency.

The information processing apparatus having the above arrangement may be arranged so as to further include rotation angle control means for controlling a rotating movement of the input display section by the display rotating means at every 90° so as to prevent the input display section from being set at an intermediate and unstable position. Thus, both in the first input control position at which the display screen is horizontally placed and in the third input control position at which the display screen is vertically placed, a desirable position of input display position can be ensured, thereby preventing the screen from being slanted to an intermediate position. Furthermore, during the movement from the first input position to the second input position and from the third input control position to the fourth input control position, the rotating movement of the input display section is controlled so that the respective reference horizontal and vertical lines of the input display section are kept parallel to the reference lines of the main body. Therefore, unstable condition of the input display section can be avoided, thereby smoothly changing the position of the apparatus.

The information processing apparatus may be arranged so as to further include locking means for locking the input display section and the connecting member. In this arrangement, during the movement from the stored position to the first input control position, smoother rotating movement can be achieved. Moreover, this rocking means also serves to control the rotation of the input display section in the first input control position and the third input control position. Thus, a stable condition of the input display section in the first input control position and in the third input control position can be ensured, thereby achieving an improved operation efficiency.

Furthermore, the apparatus may be arranged so as to further include the lock guiding means for guiding a fixing section of the locking means with the rotating movement of the input display section. In this arrangement, the input display section can be rotated by the display rotating means without unlocking the input display section from the connecting member by the locking means. Therefore, a still improved operation efficiency in moving to each position can be achieved. Also, the fact that the input display section will not be unlocked at an intermediate angle also contributes to achieve an operation efficiency. Additionally, the lock guiding means also serves to stabilize the rotating movement of the input display section.

In order to achieve the above object, the information processing apparatus of the present invention is characterized in that a center of rotation of said input display section by said display rotating means is located at a position slightly displaced from the center of said input display section so that a distance from the center of rotation to said input display screen in said first input control position is equal to a distance from the center of rotation of said input display section to a bottom end of said input display section in said third input control position.

In the above arrangement, by setting the center of rotation of the input display section at the above position, a relative position between the main body and the bottom end of the input display section can be maintained constant after the input display section is being rotated. Therefore, the input display section can be easily locked to the connecting member by the locking means. Additionally, when moving the input display section to the third input control position or to the fourth input control position, the respective positions of the cabinet of the input display section and the cabinet of the main body can be easily set.

For a fuller understanding of the nature and advantages of the invention, reference should be made to the ensuing detailed description taken in conjunction with the accompanying drawings.

BRIEF DESCRIPTION OF THE DRAWINGS

FIG. 4A is a detailed view of the locking mechanism in a locked state.

FIG. 5A is a detailed view of the locking mechanism in an unlocked state.

FIG. 8(*a*) through FIG. 8(*c*) are explanatory views respectively showing relationships between the rotatable range of the connecting section and the braking efficiency when the information processing apparatus position is changed from the stored position to the key-input position.

FIG. 45 is a side view of the information processing apparatus in the first pen-input position.

DESCRIPTION OF THE EMBODIMENTS

EMBODIMENT 1

The following description will discuss one embodiment of the present invention in reference to FIG. 1 through FIG. 32.

Figure 1:
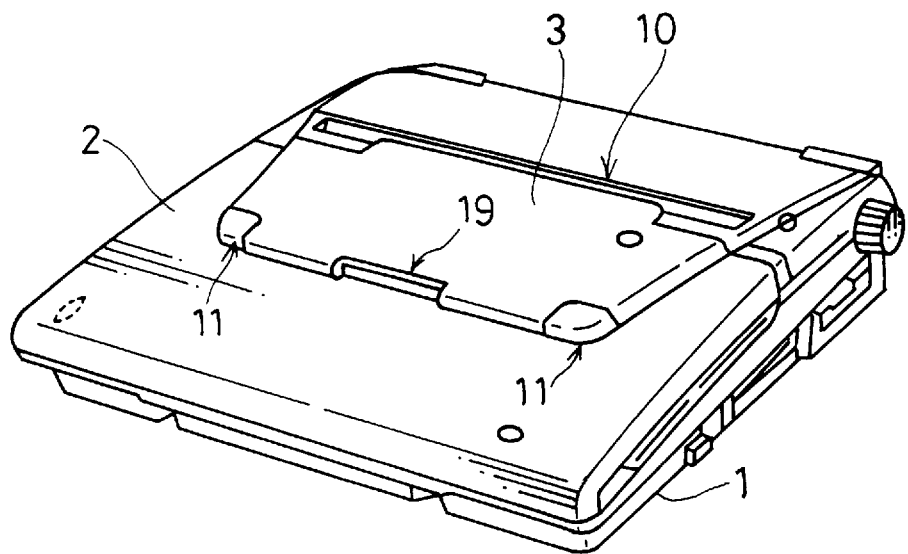
FIG. 1 which explains one embodiment of the present invention is a perspective view showing an information processing apparatus in a stored position.
Figure 2:
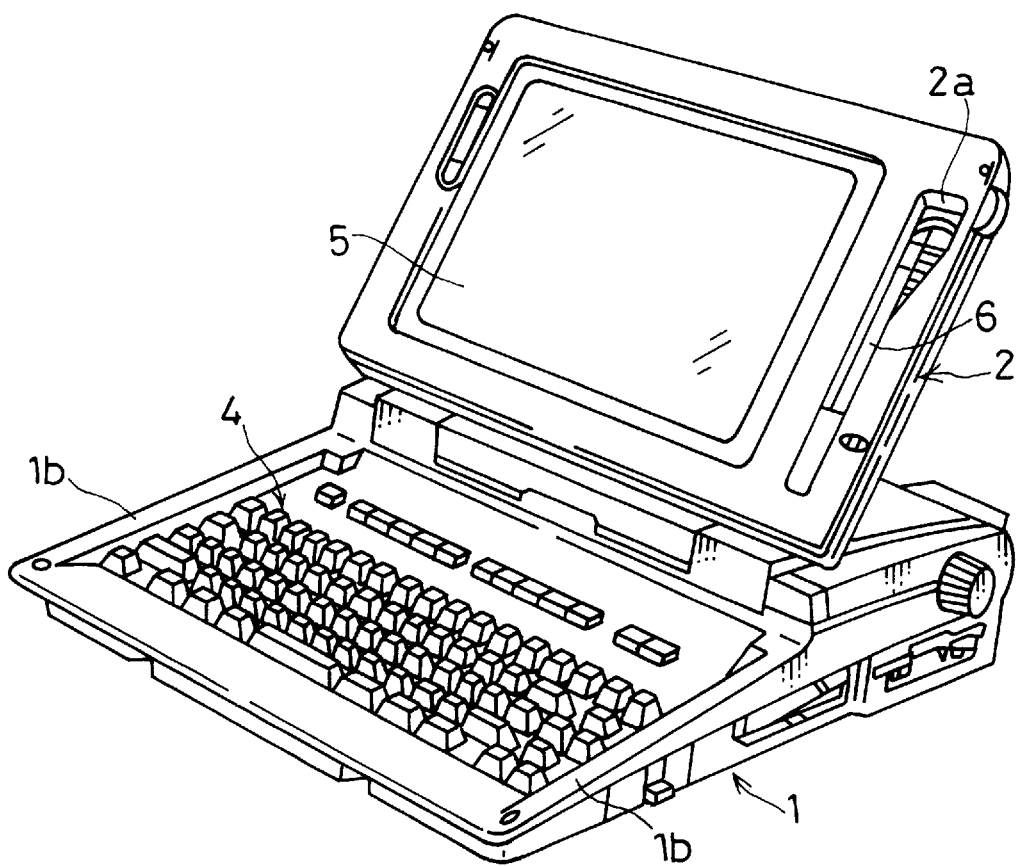
FIG. 2 is a perspective view showing the information processing apparatus of FIG. 1 in a key-input position.

As shown in FIG. 1 and FIG. 2, the information processing apparatus in accordance with the present embodiment is provided with a main body 1 including a key input control section 4 (key-control section), an input display section 2 having an input display screen 5 which enables an input with a pen and a connecting section 3 (connecting member) which connects the input display section 2 and the main body 1.

The input display section 2 is provided with a flat display such as a liquid crystal display and a transparent tablet (data input means) laminated on the display screen of the display. As shown in FIG. 2, a recessed section 2a is formed beside the input display screen 5 of the input display section 2, for storing therein a pen 6. A pen input is carried out using the pen 6 and the transparent tablet.

Figure 4:
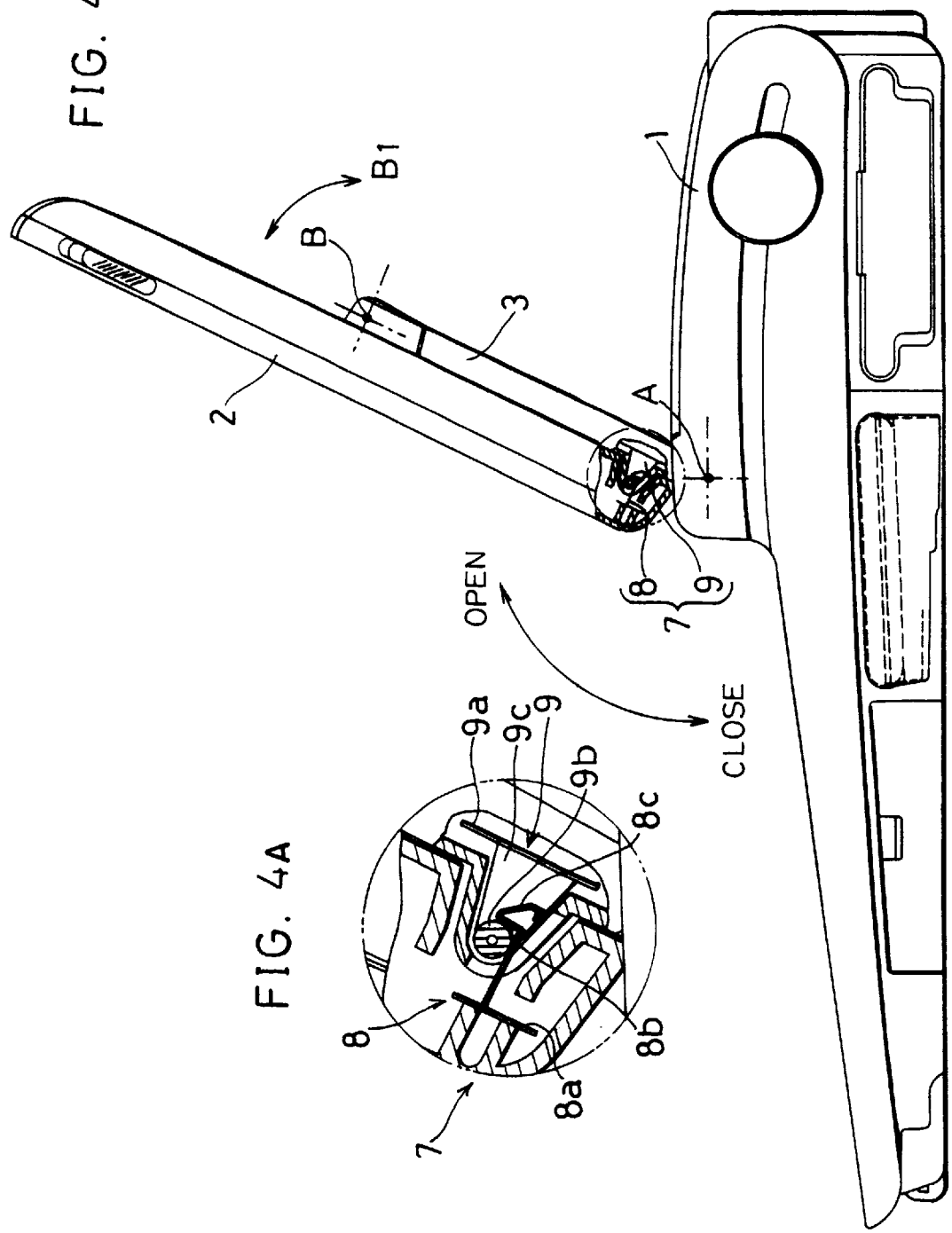
FIG. 4 is a partial cross section which shows the side face of the information processing apparatus in the key-input position.

As shown in FIG. 1, one end of the connecting section 3 is rotatably connected to the main body 1 by a first hinge mechanism 10 (first hinge means). The other end of the connecting section 3 is rotatably connected to an approximate center of the back surface of the input display 2 (opposite side of the input display 5) by a second hinge mechanism 11 (second hinge means). As shown in FIG. 4, the connecting section 3 is rotated in "open" and "close" directions about the rotation center A with respect to the main body 1. On the other hand, the input display section 2 is rotated about the rotation center B with respect to the connecting section 3.

Figure 3:
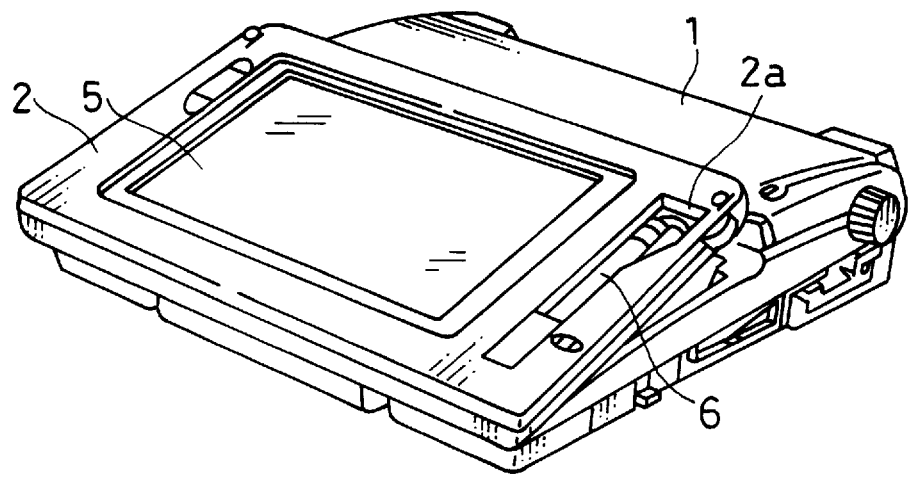
FIG. 3 is a perspective view showing the information processing apparatus of FIG. 1 in a pen-input position.

In the above arrangement, the information processing apparatus of the present embodiment takes the following three positions: a stored position, a key-input position (first input control position) and a pen-input position (second input control position). As shown in FIG. 1, when it is set in the stored position, the input display screen 5 of the input display 2 is placed so as to face the key input control section 4 of the main body 1. As shown in FIG. 2, when it is set in the key-input position, the input display screen 5 of the input display section 2 forms a predetermined angle to the key input control section 4 of the main body 1 so that key input is permitted using the key input control section 4 while observing the input display section 5. As shown in FIG. 3, in the pen-input position, the input display screen 5 of the input display section 2 is placed facing upward and nearly flat above the key input control section 4 of the main body 1 so that pen input is enabled as if writing characters on a sheet, etc., on the desk.

As described, as one end of the connecting section 3 is connected to an approximate center of the input display section 2 by the second hinge mechanism 11, the center of rotation B (fulcrum) of the input display section 2 is located on the back surface of the input display section 2. As a result, the connecting section 3 serves as a stopper for the rotation of the input display section 2, and the rotatable range of the input display section 2 with respect to the connecting section 3 is limited within 180°. Namely, when rotating the input display section 2, since the back surface of the input display section 2 comes in contact with the connecting section 3, the input display section 2 does not rotate over 180° with respect to the connecting section 3.

For example, in the key-input position shown in FIG. 2, since the back surface of the input display section 2 is supported by the connecting section 3 by leaning against it, the rotatable range of the input display section 2 is controlled. Therefore, an unstable condition of the input display section 2 can be avoided, and the input display section 2 is maintained in a stable condition by the connecting section 3. In the conventional model where the center of rotation (fulcrum) of the input display section 2 is located on the side face of the input display section, a mechanism for controlling the rotatable range of the input display section 2 is required separately. Moreover, in order to obtain a stable key input operation, a member for supporting the input display section 2 to be held at a predetermined position is required.

Similarly, in the pen-input position shown in FIG. 3, the back surface of the input display section 2 is supported by the connecting section 3, and thus the rotatable range of the input display section 2 is controlled. Therefore, an unstable condition of the input display section 2 can be avoided, and it can be held in a stable condition. In contrast, in the conventional model where the center of rotation (fulcrum) of the input display section is located on the side face of the input display section, the problem that the input display section is over-rotated and comes in contact with the key input control section 4 of the main body 1 may occur.

Figure 5:
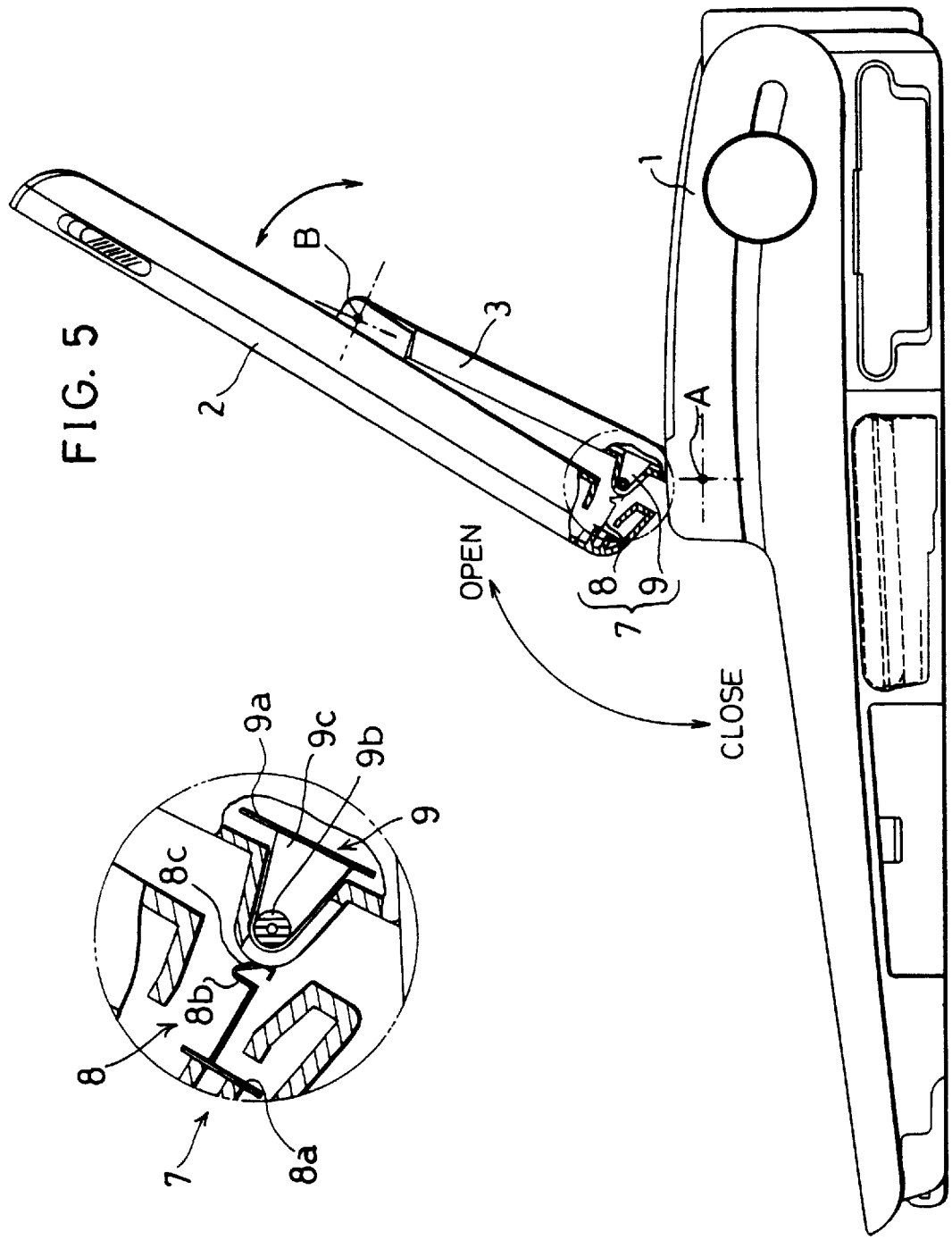
FIG. 5 is a partial cross section which shows an unlocked state by a locking mechanism of the information processing apparatus in the key-input position.

As shown in FIG. 4 and FIG. 5, the information processing apparatus is provided with a locking mechanism 7 (locking means) which enables the connecting section 3 to be locked to and unlocked from the input display section 2. The locking mechanism 7 is composed of a lock spring 8 provided on one end of the input display section 2 on the side of the main body 1 and a lock angle 9 provided on the connecting section 3 so as to face the lock spring 8. Here, it may be arranged such that the lock spring 8 is provided on the side of the connecting section 3 and that the lock angle 9 is provided on the side of the input display section 2.

Figure 6:
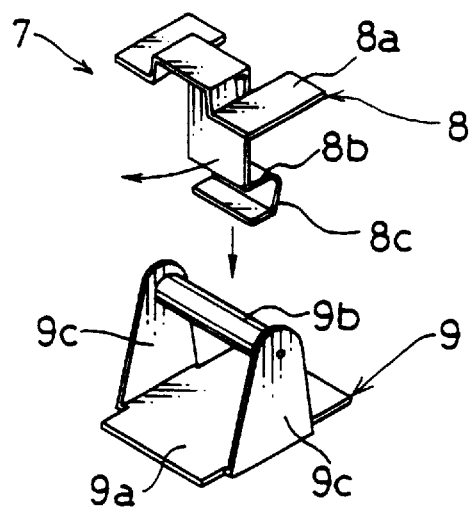
FIG. 6 is a perspective view of the locking mechanism of FIG. 5.

As shown in FIG. 6, the lock spring 8 has a fixing section 8a formed on one end thereof so as to secure the lock spring 8 onto the input display section 2. The other end of the lock spring 8 bents virtually at a right angle so as to form a hook 8b and a slide guiding section 8c which bents so as to form an acute angle with respect to the hook 8b. The lock angle 9 is composed of a fixing member 9a for securing the lock angle 9 to the connecting section 3, a shaft 9b which mates with the hook 8b of the lock spring 8 and a pair of supporting members 9c for supporting the shaft 9b.

Figure 7:
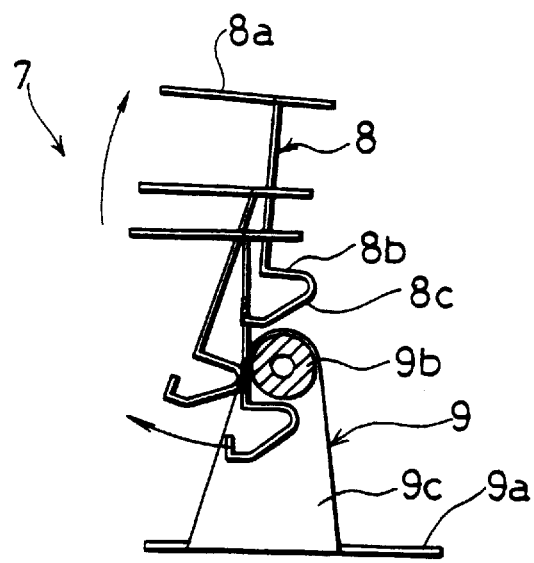
FIG. 7 is an explanatory view of an unlocking process of the locking mechanism.

In the key-input position shown in FIG. 4, when the user pulls the bottom portion of the input display section 2 (i.e., when the input display section 2 is rotated about the center B of the rotation in the direction of $B_1$), the lock spring 8 bends, and the hook 8b comes off the shaft 9b of the lock angle 9 as shown in FIG. 7. As a result, the input display section 2 is unlocked from the connecting section 3. On the other hand, when the input display section 2 is pressed onto the connecting section 3, the slide guiding section 8c of the lock spring 8 makes the shaft 9b of the lock angle 9 slides, thereby bending the lock spring 8. As a result, the hook 8b of the lock spring 8 which mates with the shaft 9b of the lock angle 9 at the position where the back surface of the input display section 2 is made in contact with the connecting section 3, thereby securing the input display section 2 to the connecting section 3.

When the information processing apparatus position is changed from the stored position to the key-input position, the connecting section 3 is fixed to the input display section 2 by the lock mechanism 7, thereby permitting a smoother rotating movement. On the other hand, the information processing apparatus position can be smoothly changed from the key-input position to the pen-input position because the input display section 2 can be unlocked from the connecting section 3 by pulling the bottom portion of the input display section 2. As described, since the input display section 2 can be locked to the connecting section 3 by the locking mechanism 7 and unlocked from the connecting section 3, an operation efficiency in changing the apparatus position can be improved.

In the present embodiment, the locking mechanism 7 composed of the lock spring 8 and the lock angle 9 is adopted as locking means. However, the present invention is not limited to the above arrangement. For example, it may be arranged such that the input display section 2 is locked to and unlocked from the connecting section 3 by a sliding hook provided on the input display section 2. In the case of adopting the sliding hook as the locking means, the sliding direction is preferably set in an operating direction (i.e., in the pulling direction toward the user). For the locking means, not only mechanical means, but also a magnet, etc., may be used.

Figure 9A:
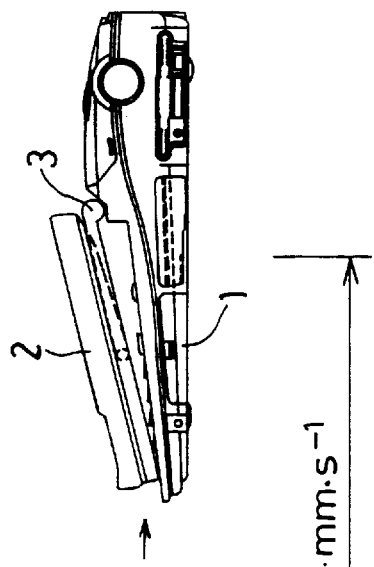
FIG. 9(a) through FIG. 9(c) are explanatory views respectively showing relationships between the rotatable range of the connecting section and the braking efficiency when the information processing apparatus position is changed from the key-input position to the pen-input position.
Figure 9B:
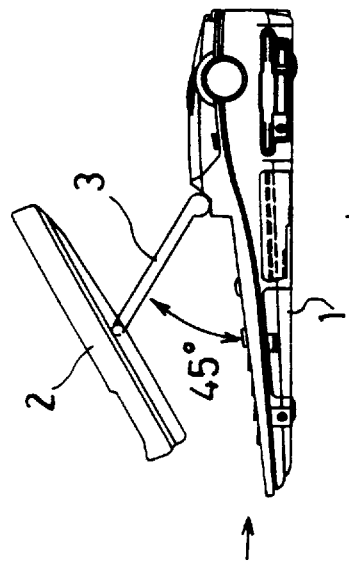
Figure 9C:
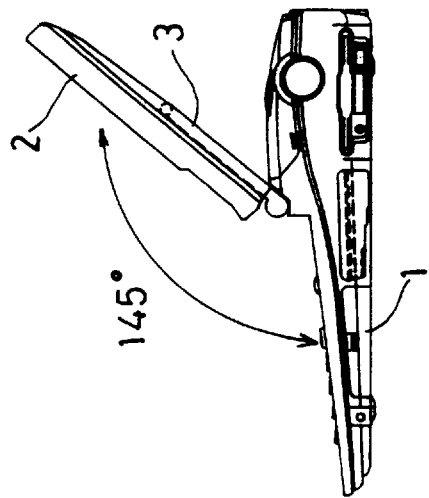

In the present embodiment, a one-way clutch system (to be described later) is adopted for the first hinge mechanism 10 which rotatably connects the connecting section 3 to the main body 1. By adopting the one-way clutch system, a braking force exerted when rotating the connecting section 3 with respect to the main body 1 can be changed depending on the rotating direction and rotation angle of the connecting section 3. FIG. 8(a) through FIG. 8(c) respectively show relationships between the rotatable range of the connecting section 3 and the braking efficiency when the apparatus position is changed from the stored position to the key-input position (i.e., when rotating the connecting section 3 in the "open" direction). FIG. 9(a) through FIG. 9(c) respectively show relationships between the rotatable range of the connecting section 3 and the braking efficiency when the apparatus position is changed from the key-input position to the pen-input position (i.e., when rotating the connecting section 3 in the "close" direction).

In the present embodiment, when the input display section 2 secured to the connecting section 3 by the locking mechanism 7 is moved from the stored position shown in FIG. 8(a) to the key-input position shown in FIG. 8(c), i.e., when the connecting section 3 is rotated in the "open" direction shown in FIG. 8(b), a braking force is exerted on the connecting section 3 being rotated at a braking efficiency of 30 kgf·mm·s$^{-1}$ until the connecting section 3 forms an angle of 105° to the main body 1. On the other hand, when the connecting section 3 forms an angle of over 105° with respect to the main body 1, i.e., when the apparatus position is changed form the position shown in FIG. 8(b) to the position shown FIG. 8(c), a braking force is exerted at a braking efficiency of 70 kgf·mm·s$^{-1}$.

The main body 1 is provided with a slide control section 1a which is in contact with the connecting section 3 when the connecting section 3 is rotated by 145° from the stored position in the vicinity where the first hinge mechanism 10 is provided. The slide control section 1a prevents the connecting section 3 from being rotated over 145° with respect to the main body 1.

In the present embodiment, when the apparatus position is changed from the key-input position shown in FIG. 9(a) to the pen-input position shown in FIG. 9(c), i.e., when the connecting section 3 is rotated in the "close" direction, the braking force to be exerted on the connecting section 3 changes as follows: during the movement from the position shown in FIG. 9(a) at which the connecting section 3 forms an angle of 145° to the main body 1 to the position shown in FIG. 9(b) at which the connecting section 3 forms an angle of 45° to the main body 1, a braking force is exerted on the connecting section 3 being rotated at a braking efficiency of 30 kgf·mm·s$^{-1}$; whereas, when the connecting section 3 is further declined from the position shown in FIG. 9(b), a braking force is exerted on the connecting section 3 being rotated to the position shown in FIG. 9(c), a braking force is exerted at a braking efficiency of 70 kgf·mm·s$^{-1}$.

In the information processing apparatus of the present embodiment, the first hinge mechanism 10 has the arrangements shown in FIG. 10 through FIG. 13 in order to control the braking force in accordance with the direction and angle of rotation of the connecting section 3.

The first hinge mechanism 10 has a main shalt 12 fixed to the connecting section 3, which serves as the rotation axis and two other shafts 13 and 14. Along the circumference of the main shaft 12, the partial gear 12a is provided within a range of 0°–180°, and when rotating the main shaft 12, the braking force is exerted at the braking efficiency of 30 kgf·mm·s$^{-1}$.

Along the circumference of the shaft 13, a gear 13a which mates with the partial gear 12a are provided. In this arrangement, the shaft 13 can be smoothly rotated because almost no braking force is exerted. Along the circumference of the gear 14, the gear 14a is provided so as to mate with both the partial gear 12a of the main shaft 12 and the gear 13a of the shaft 13. Additionally, the shaft 14 is also provided with the one-way clutch (not shown).

Figure 10:
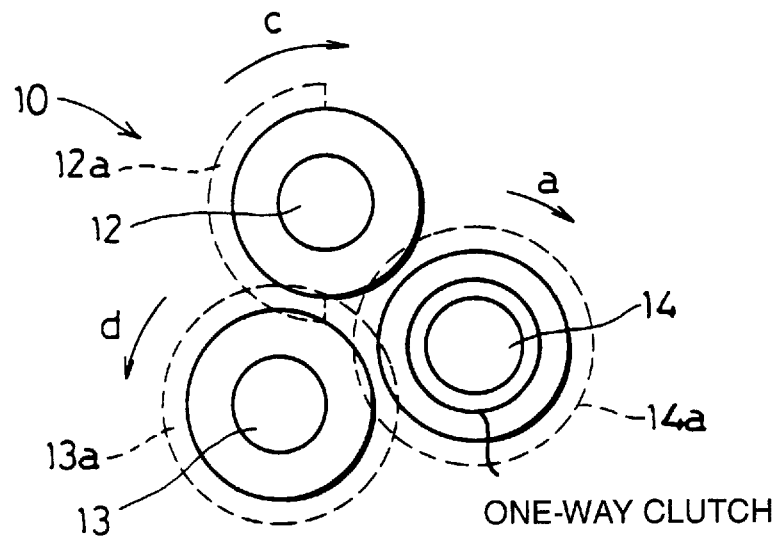
FIG. 10 is an explanatory view showing three shafts of the first hinge mechanism when the connecting section of the information processing apparatus is rotated from a stored position in an "open" direction.
Figure 11:
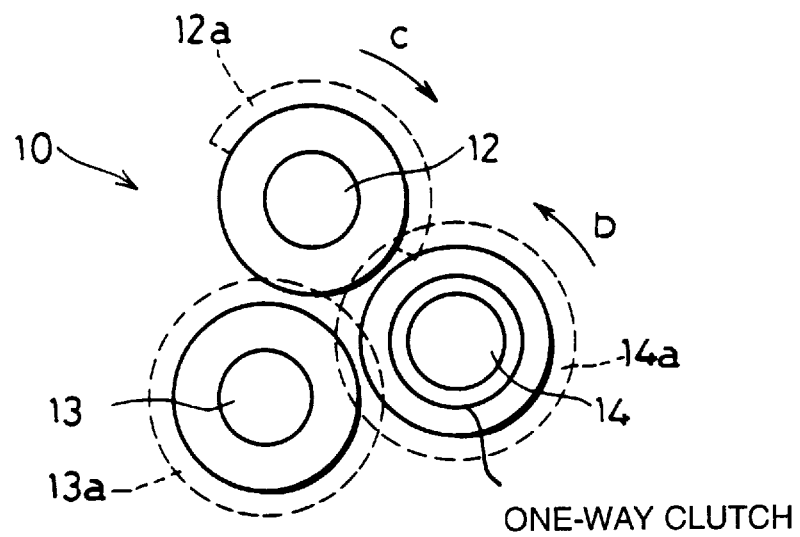
FIG. 11 is an explanatory view showing three shafts of the first hinge mechanism when the connecting section of the information processing apparatus is rotated by 105° in the "open" direction.

As shown in FIG. 10, when the shaft 14 is rotated in the direction of a, the one-way clutch is disengaged and thus the shaft 14 is in the free state. In this state, since almost no braking force is exerted, the shaft 14 can be smoothly rotated. On the other hand, as shown in FIG. 11, when the shaft 14 is rotated in the direction of b opposite to the direction of a, the one-way clutch is engaged, and the braking force is exerted at the braking efficiency of 40 kgf·mm·s$^{-1}$.

Additionally, the main shaft 12 having the partial gear 12a and the shafts 13 and 14 respectively having gears 13a and 14a constitute the braking force change means.

FIG. 10 shows respective positions of the shafts 12, 13 and 14 when the information processing apparatus is set in the stored position shown in FIG. 8(a). In this position, the one end of the partial gear 12a of the main shaft 12 mates with the gear 13a of the shaft 13. From this position, when the connecting section 3 is rotated in the "open" direction, the main shaft 12 is rotated in the direction of c, and the shaft 13 is rotated in the direction of d while the partial gear 12a of the main shaft 12 mates with the gear 13a of the shaft 13. With the rotations of the shaft 13, the shaft 14 is rotated in the direction of a. When the shaft 14 is rotated in the direction of a, the one-way clutch is off and the shaft 14 is in a free state. The braking force of the main shaft 12, i.e., the braking force at the braking efficiency of 30 kgf·mm·s$^{-1}$ is exerted on the connecting section 3 being rotated.

Thereafter, when the connecting section 3 is rotated in the direction of c, the partial gear 12 of the main shaft 12 is disengaged from the gear 13a of the shaft 13. Even after the partial gear 12a is disengaged from the gear 13a, the braking force of the main shaft 12, i.e., the braking force at the braking efficiency of 30 kgf·mm·s$^{-1}$ is exerted on the connecting section 3 being rotated.

As shown in FIG. 8(b), when the connecting section 3 is rotated so as to form an angle of 105° to the main body 1, the shafts 12, 13 and 14 are set in the state shown in FIG. 11. The other end of the partial gear 12a of the main shaft 12 is engaged with the gear 14a of the shaft 14, and thereafter, the shaft 14 is rotated in the direction of b with the rotation of the main shaft 12 in the direction of c until the apparatus position is changed to the key-input position shown in FIG. 8(c). When the shaft 14 is rotated in the direction of b, the one-way clutch is engaged, and the braking force is exerted at the braking efficiency of 40 kgf·mm·s$^{-1}$. Therefore, the sum of the braking force of the main shaft 12 and the shaft 14, i.e., the braking force at the braking efficiency of 70 kgf·mm·s$^{-1}$ is exerted on the connecting section 3 being rotated.

Although the above explanation on the braking force is given through the case of moving from the stored position to the key-input position, the same can be said in the case of moving from the pen-input position to the key-input position as the connecting section 3 is rotated in the "open" direction.

Figure 14:
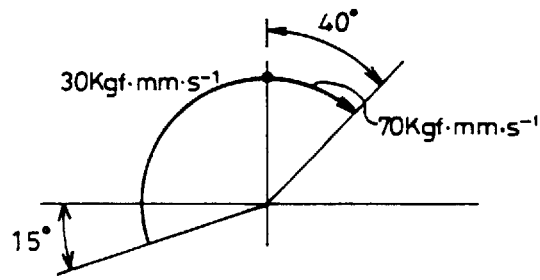
FIG. 14 is an explanatory view showing the rotatable range of the connecting section and the braking efficiency when the connecting section is rotated in the "open" direction.

FIG. 14 shows the relationship between the rotatable range of the connecting section 3 and the braking efficiency when the connecting section 3 rotates in the "open" direction. When the connecting section 3 rotates in the "open" direction, the input display section 2 can be lifted up with a small resistance because the braking force exerted while the connecting section 3 being rotated by 105° from the stored position is small (at the braking efficiency of 30 kgf·mm·s$^{-1}$). On the other hand, a large braking force (at the baking efficiency of 70 kgf·mm·s$^{-1}$) is exerted on the connecting section 3 being rotated in the range of 105°–145° where an adjustment of the angle is required. Therefore, the angle can be easily adjusted. Moreover, an unstable condition of the input display section 2 can be avoided when the angle falls within the above range.

Figure 12:
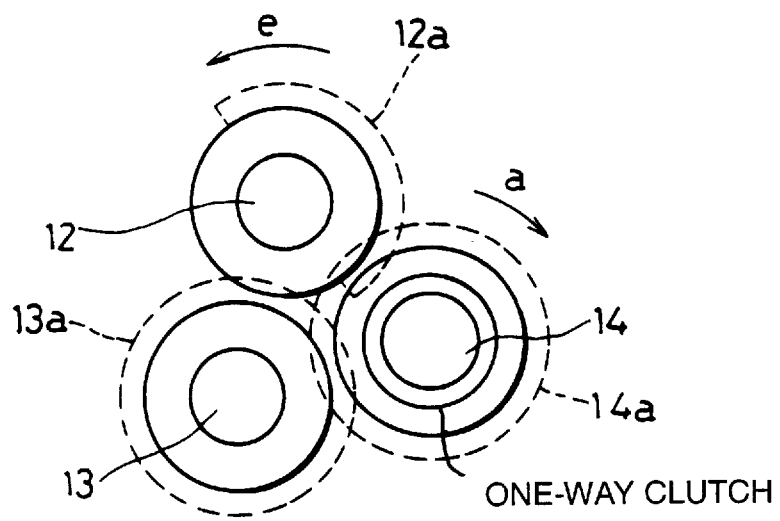
FIG. 12 is an explanatory view showing three shafts of the first hinge mechanism when the connecting section of the information processing apparatus is rotated from the key-input position by 105° in the "close" direction.

On the other hand, when the connecting section 3 is rotated in the "close" direction from the key-input position shown in FIG. 9(a), the main shaft 12 is rotated in the direction of e as shown in FIG. 12, and with the rotation of the main shaft 12, the shaft 14 is rotated in the direction of a. In this state, since the shaft 14 is set in the free state, the braking force of the main shaft, i.e., the braking force at the braking efficiency of 70 kgf·mm·s$^{-1}$ is exerted on the connecting section 3 being rotated.

Thereafter, as the connecting section 3 further rotates in the "close" direction, the partial gear 12 of the main shaft 12 is disengaged from the gear 14a of the shaft 14. In this state, while the connecting section 3 is rotating, the braking force of the main shaft 12, i.e., the braking force at the braking efficiency of 30 kgf·mm·s$^{-1}$ is exerted.

Figure 13:
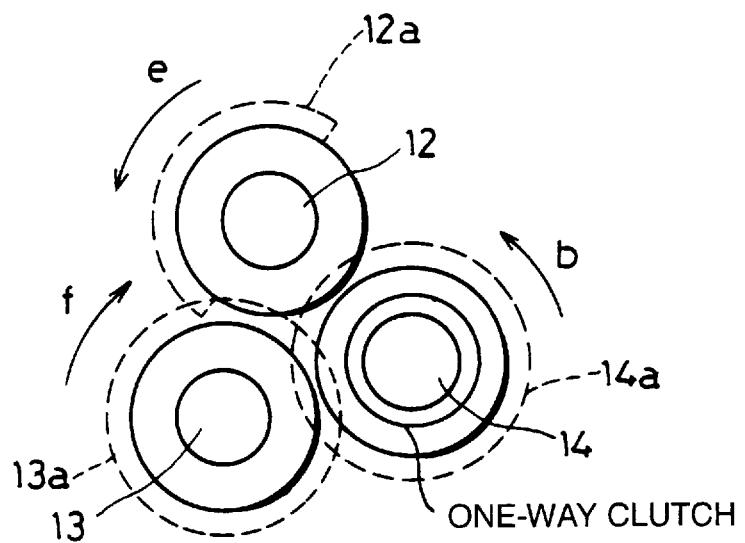
FIG. 13 is an explanatory view showing three shafts of the first hinge mechanism when rotating the connecting section 3 from the key-input control position in a "close" direction until it forms an angle of 45° with respect to the main body 1.

As shown in FIG. 9(b), when the connecting section 3 it rotated until it is inclined to the main body at 45°, one end of the partial gear 12a of the main shaft 12 is engaged with the gear 13a of the shaft 13 as shown in FIG. 13. From the above position to the pen-input position shown in FIG. 9(c), the shaft 13 is rotated in the direction of f as the main shaft 12 is rotated, and the shaft 14 is further rotated in the direction of b as the shaft 13 rotates. With the rotation of the shaft 14 in the direction of b, the one-way clutch is connected, and the braking force is exerted at the braking efficiency of 40 kgf·mm·s$^{-1}$. Therefore, the braking force at the braking efficiency of 70 kgf·mm·s$^{-1}$, i.e., the sum of the braking force of the main shaft 12 and the shaft 14 is exerted on the connecting section 3 being rotated in the above process.

The above explanation is given through the case where the apparatus position is changed from the key-input position to the pen-input position. However, when the apparatus position is changed from the key-input position to the stored position, as the connecting section 3 rotates in the "close" direction, the braking force is exerted at the same braking efficiency as the above case.

Figure 15:
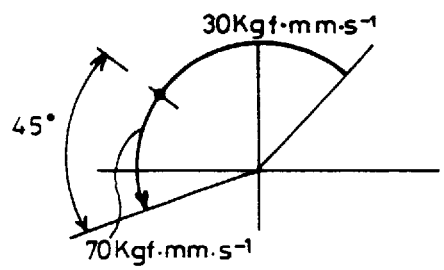
FIG. 15 is an explanatory view showing the rotatable range of the connecting section and the braking efficiency when the connecting section is rotated in the "open" direction.

FIG. 15 shows the relationship between the rotatable range of the connecting section 3 and the braking efficiency when the connecting section 3 is rotated in the "close" direction. When the connecting section 3 rotates in the closing direction, the input display section 2 can be lifted up with a small resisting force until the connecting section 3 is declined at 45° to the main body 1 because the braking force exerted on the connecting section 3 being rotated is small (at the baking efficiency of 30 kgf·mm·s$^{-1}$). On the other hand, a large braking force (at the baking efficiency of 70 kgf·mm·s$^{-1}$) is exerted on the connecting section 3 being rotated, when the connecting section 3 is further declined to the main body 1 at an angle less than 45°. According to the above arrangement, since the input display section 2 can be prevented from hitting the main body 1, an impact between the input display section 2 and the main body 1 can be made small.

Figure 16:
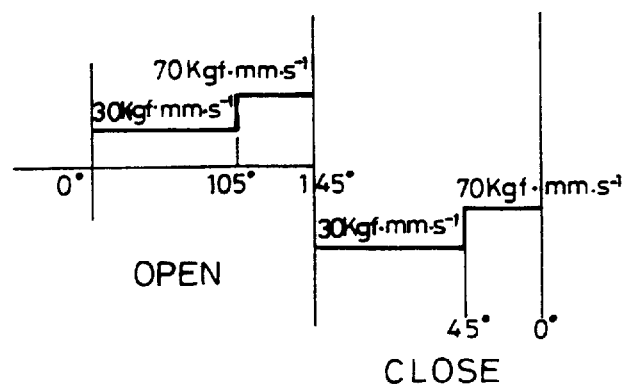
FIG. 16 is an explanatory view showing the relationship among the rotating direction, the rotation angle of the connecting section and the braking efficiency.

A change in the braking efficiency in accordance with the rotation angle of the connecting section 3 with the opening and closing movement of the connecting section 3 is summarized in FIG. 16.

As shown in FIG. 16, a change in the braking force in accordance with the direction and the angle of the rotation of the connecting section 3 is complicated in the present embodiment. However, timing and an amount of change in the braking force are not limited to those in the present embodiment. In order to change at least the braking force exerted while the connecting section 3 is rotating in accordance with the rotating direction, the apparatus may be arranged such that, for example, the braking force exerted when the connecting section 3 is rotated in the "open" direction is set smaller than the braking force exerted when the connecting section 3 is rotated in the "close" direction. In the above arrangement, since a braking force exerted when opening the input display section 2 from the stored position is small, easy operation can be achieved. On the other hand, a large braking force is exerted when closing the input display section 2. Thus, a collision between the input display section 2 and the main body 1 can be avoided, thereby permitting a force of impact on the input display section 2 and the main body 1 to be reduced.

Figure 19:
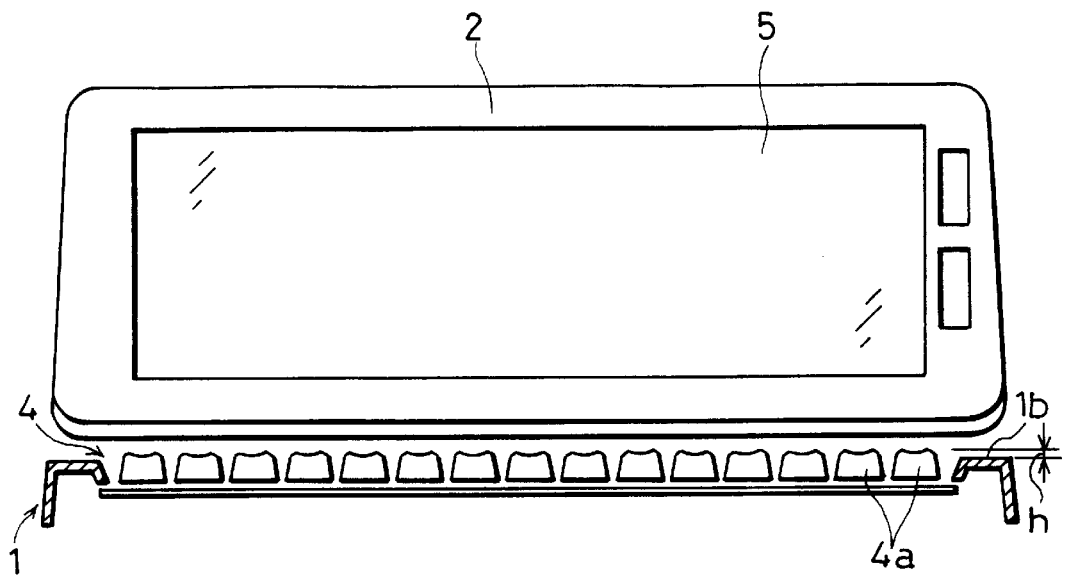
FIG. 19 is a longitudinal sectional view of the information processing apparatus without the interval control means at an intermediate position while the apparatus position is changed from the key-input control position to the pen-input control position.

Normally, as shown in FIG. 19, the information processing apparatus is arranged such that the key input control section 4 of the main body 1 is higher than the main body cabinet 1b. Namely, the upper surface of an input key 4a is above the the upper face of the main cabinet 1b by h shown in FIG. 19. In this arrangement, when the position of the input display section 2 is changed from the key-input position to the pen-input position, the bottom portion of the input display section 2 may come in contact with the input key 4a, thereby presenting the problem that key-input error may occur.

Figure 17:
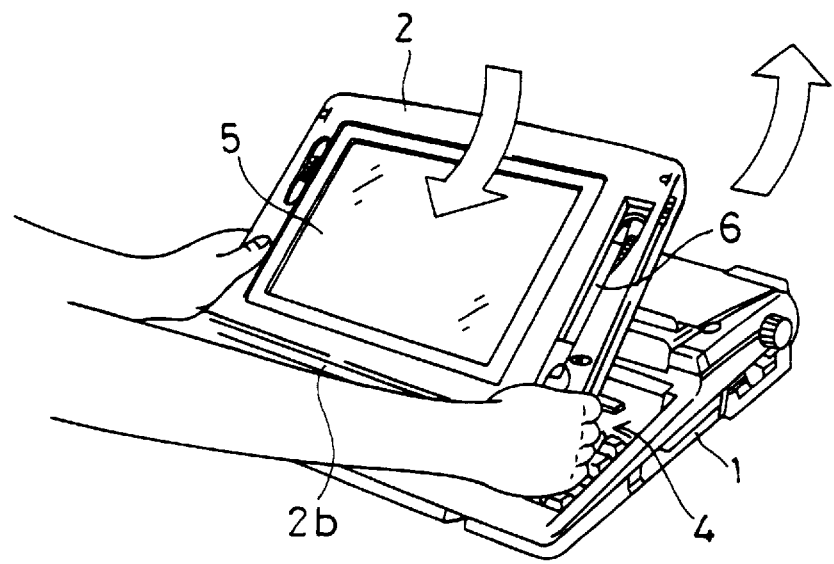
FIG. 17 is a perspective view showing the information processing apparatus when the operator moves the apparatus from the key-input position to the pen-input position.
Figure 18:
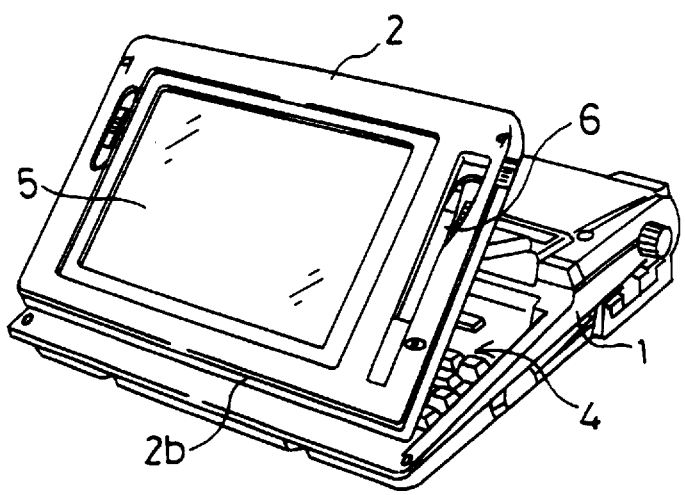
FIG. 18 is a perspective view showing the information processing apparatus at an intermediate position between the key-input position and the pen-input position.

FIG. 17 shows an operation by the user when the apparatus position is changed from the key-input position to the pen-input position. In this case, the input display section 2 is inclined, and the bottom 2b of the input display section 2 first comes in contact with the main body 1. Here, when the apparatus position is changed from the key input position to the stored position, the frame portion of the input display section 2 comes in contact with the main body 1 virtually at the same time. Therefore, the fact that the upper surfaces of input keys 4a are projected above the upper surface of the main body cabinet 1b is not a problem. However, when the apparatus position is changed from the key-input position to the pen-input position, the bottom 2b of the input display section 2 may come in contact with the input key 4a, thereby presenting the problem that key-input error may occur.

Figure 20:
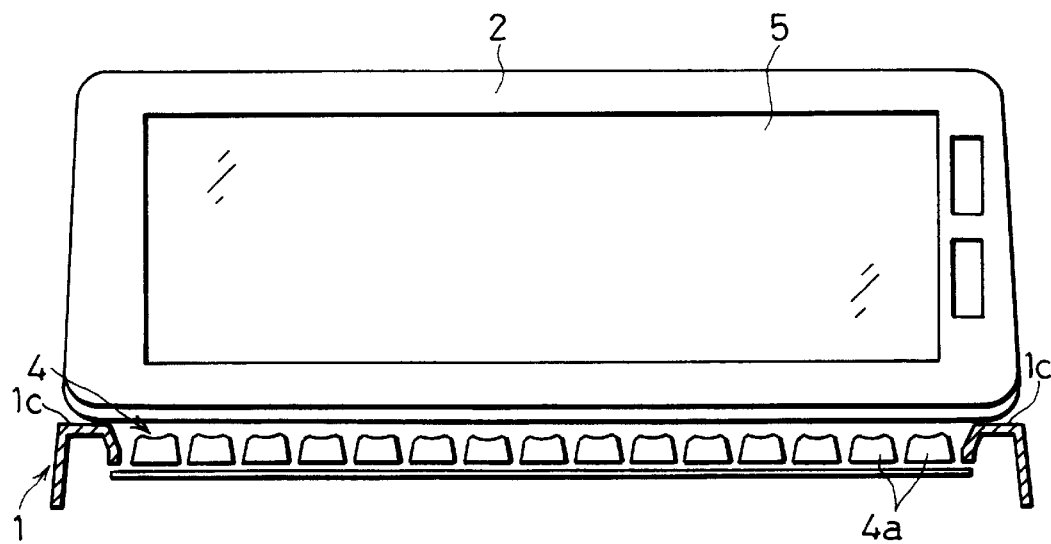
FIG. 20 is a longitudinal sectional view of the information processing apparatus provided with the interval control means at an intermediate position while the apparatus position is changed from the key-input control position to the pen-input control position.

In order to prevent the above problem, the information processing apparatus of the present embodiment is arranged such that projections 1c (interval control means) which are higher than the input key 4a of the key input operation section 4 are formed on both sides; of the key input control section 4 as shown in FIG. 20. The projection 1c controls the movement of the input display section 2 so that a predetermined interval can be ensured between the input display section 2 and the key input operation section 4 when the apparatus position is changed from the key-input position to the pen-input position. In this way, an occurrence of input error when the apparatus position is changed from the key-input position to the pen-input position can be prevented.

Alternatively, an interval between the input display section 2 and the key input operation section 4 when the apparatus position is changed from the key-input position to the pen-input position can be controlled by forming projections on both sides of the back surface (at least on both sides of the bottom 2b) of the input display section 2 instead of forming the projections 1c on the main body cabinet 1b.

Figure 21A:
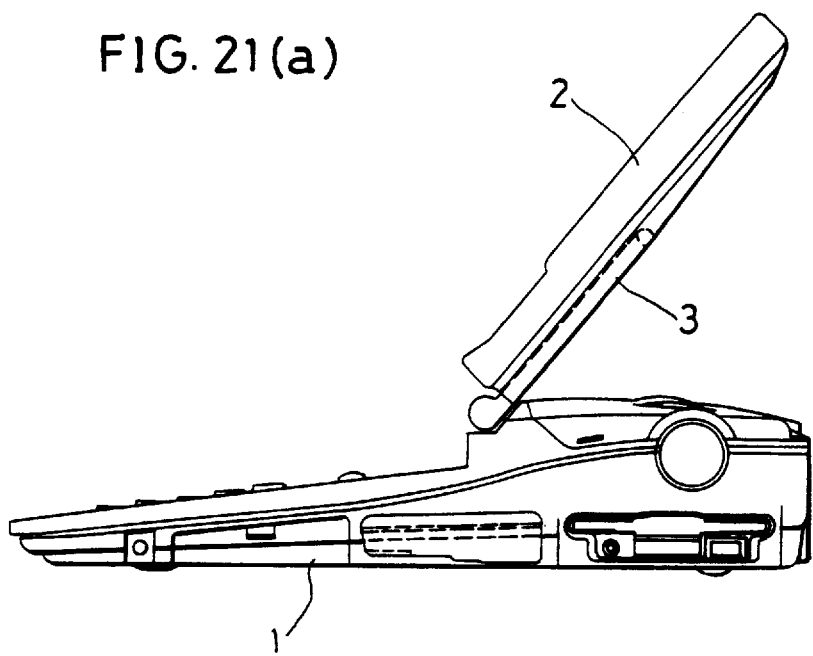
FIG. 21(a) is a side view of the information processing apparatus in the key-input control position.
Figure 21B:
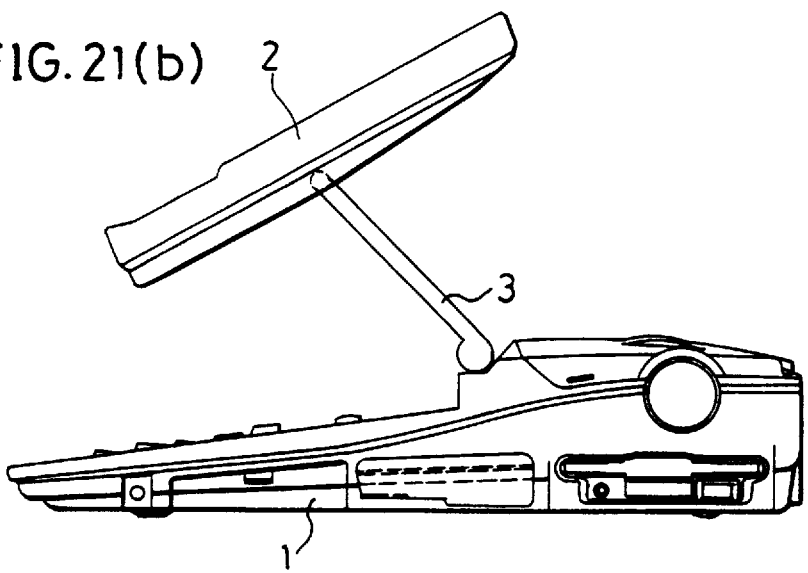
FIG. 21(b) is a side view of the information processing apparatus when the apparatus position is being moved from the key-input control position to the pen-input control position.
Figure 21C:
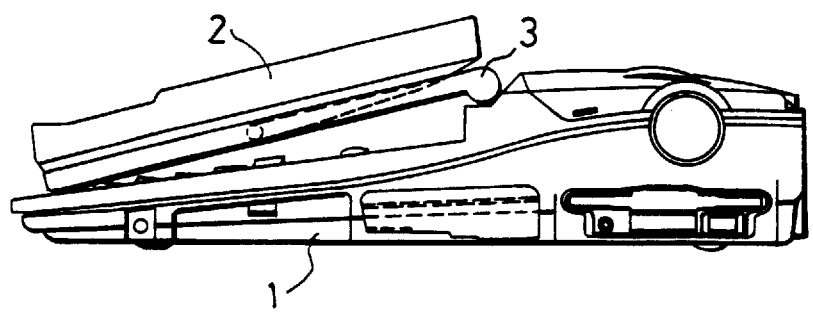
FIG. 21(c) is a side view of the information processing apparatus in the pen-input control position.
Figure 22:
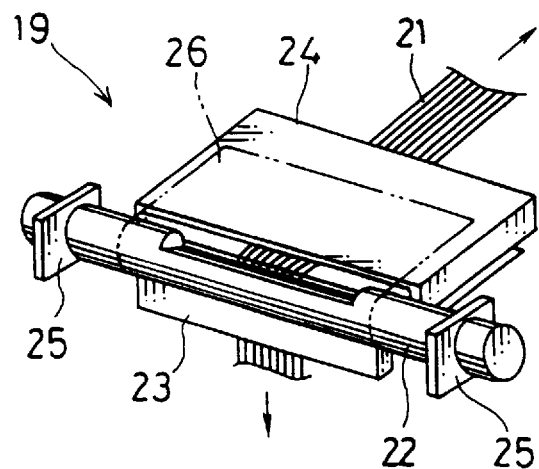
FIG. 22 is a perspective view of a wiring mechanism of signal wires of the information processing apparatus.
Figure 23:
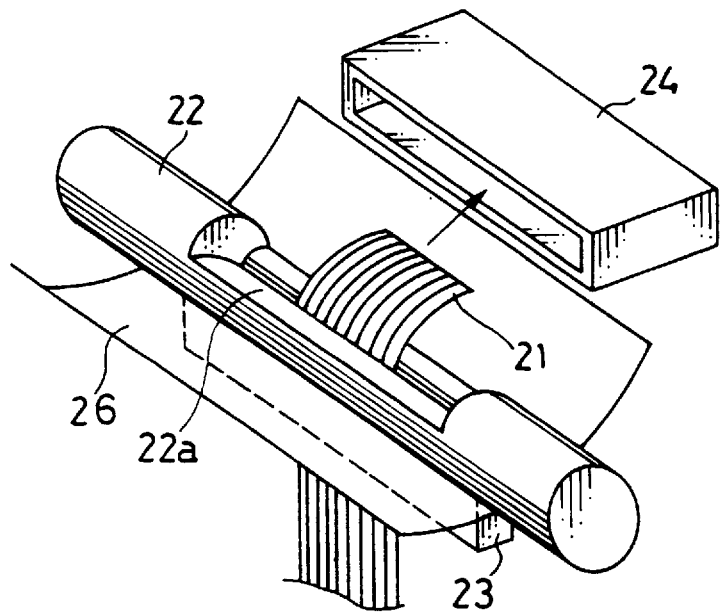
FIG. 23 is a divided perspective view of the wiring mechanism of signal wires.

As described, the information processing apparatus of the present invention is characterized by changing its position from the key-input position shown in FIG. 21(a) to the pen-input position shown in FIG. 21(c) through the position shown in FIG. 21(b). While the above movement, the input display section 2 is rotated by approximately 180° about the connecting section 3. Therefore, in the present embodiment as a wiring processing mechanism for electrically connecting the input display section 2 and the main body 1 which make the above movement through the connecting section 3, a wiring mechanism 19 using a FPC (Flexible Printed Circuit) wire 21 as a flexible signal wire is adopted as shown in FIG. 22 through 24.

Figure 24A:
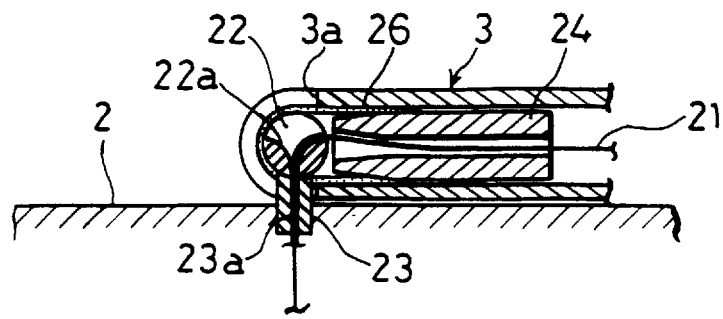
FIG. 24(a) is a longitudinal cross section showing the wiring mechanism of the signal wires of the information processing apparatus in the key-input control position.
Figure 24B:
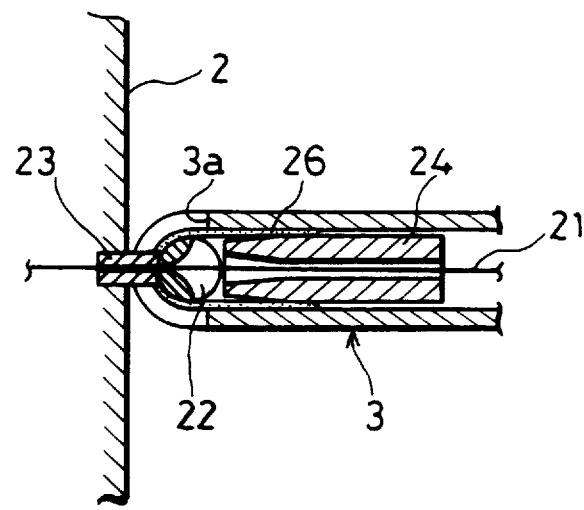
FIG. 24(b) is a longitudinal cross section showing the wiring mechanism of the signal wires at an intermediate position while the apparatus position is moved from the key-input position to the pen-input control position.
Figure 24C:
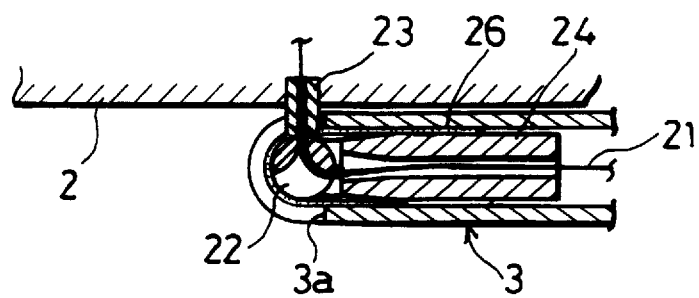
FIG. 24(c) is a longitudinal cross section showing the information processing apparatus in the pen-input position.

As shown in FIG. 1, the wiring processing mechanism 19 is formed along the end of the connecting section 3 on the side of the input display section 2. As shown in FIGS. 22 and 23, the wiring processing mechanism 19 includes a guide shaft 22 (guide shaft member) whose rotation center coincides with that of the previously described second hinge mechanism 11. The guide shaft 22 is provided with a guide member 23 (guide shaft connecting member) so as to be projected toward the side of the input display section 2. As shown in FIG. 24(a) through FIG. 24(c), the end portion of the guide member 23 is fixed to the input display section 2.

The guide shaft 22 is provided in the connecting section 3 using a supporting member 25 so as to be rotatable. In order to achieve a 180° rotating movement of the guide shaft 22, a through hole 3a is formed at the end portion of the connecting section 3.

A through hole 22a and a through hole 23a are formed respectively in the guide shaft 22 and the guide member 23 so as to allow a free passage for the FPC wire 21. The FPC wire 21 circularly extends into the input display section 2 and the cabinet of the connecting section 3 (inner space) through the through holes 22a and 23a. The through hole 22a provided in the guide shaft 22 is circularly expands from the boundary between the through hole 23 and itself (toward the inner space of the connecting section 3).

The connecting section 3 is provided with a tubular cover guide 24 whose cross section has a rectangular shape in the cabinet so that the FPC wire 21 passes through the cover guide 24.

The wiring processing mechanism 19 is provided with a cover film 26 which covers the through hole 22a as a coating member. Since this cover film 26 is provided, the unpresentable condition that the FPC wire 21 appears from the through hole 3a of the connecting section 3 and the through hole 22a of the guide shaft 22 can be prevented. The cover film 26 is flexible and almost the same color as the connecting section 3 and the input display section 2. The cover film 26 is sandwiched between the guide shaft 22 and the guide member 23, and is integrated with the connecting section 3. The cover film 26 is provided within a space formed by the cabinet of the connecting section 3 and the outer surface of the cover guide 24, and makes a sliding movement within the space with the rotating movement of the connecting section 3.

FIG. 24(a) through FIG. 24(c) respectively show relative positions between the input display section 2 and the connecting section 3 in the positions shown in FIG. 21(a) through FIG. 21(c). Since the wiring mechanism 19 is provided, at any angle between the input display section 2 and the connecting section 3, a free passage for the FPC wire 21 can be ensured in the input display section 2 and the connecting section 3.

As shown in FIG. 21(a), when the information processing apparatus is in the key-input position shown in FIG. 24(a), the FPC wire 21 bends approximately at a right angle. In this case, the FPC wire 21 can be prevented from bending sharply as it bends through the through hole 22a with a circular cross section formed in the guide shaft 22. When the input display section 2 is rotated with respect to the connecting section 3 from the position shown in FIG. 21(a) so as to form a right angle with respect to the connecting section 3 as shown in FIG. 21(b), the guide shaft 22 is rotated with the rotation of the input display section 2. Thus, the FPC wire 21 hardly bends.

When the input display section 2 is further rotated with respect to the connecting section 3 from the position shown in FIG. 21(b) to the pen-input position shown in FIG. 21(c), as shown in FIG. 24(c), the FPC wire 21 bends approximately at a right angle in the direction opposite to the key-input position. In this case also, the FPC wire 21 can be prevented from bending sharply as it bends through the through hole 22a with a circular cross section in the guide shaft 22.

As described, when the apparatus position is changed from the key-input position to the pen-input position or vice versa, the angle formed by the input display section 2 and the connecting section 3 is changed approximately by 180°, and accordingly the FPC wire 21 bends. However, the FPC cable can be prevented from bending sharply. Therefore, disconnections of wires hardly occur, thereby ensuring an improved durability of the FPC wire 21 for a long period of time. Moreover, since the through hole 22a is covered by the cover film 26, the unpresentable condition that the FPC wire 21 appears from the space formed in the wiring processing mechanism 19 can be prevented.

A suitable signal wire is not limited to the FPC wire 21, and other flexible signal wires may be used as well. However, since the FPC wire uses a smaller space in the connecting section 3 required for wiring the signal wire, by adopting the FPC wire, the connecting section 3 can be made thinner.

Figure 25:
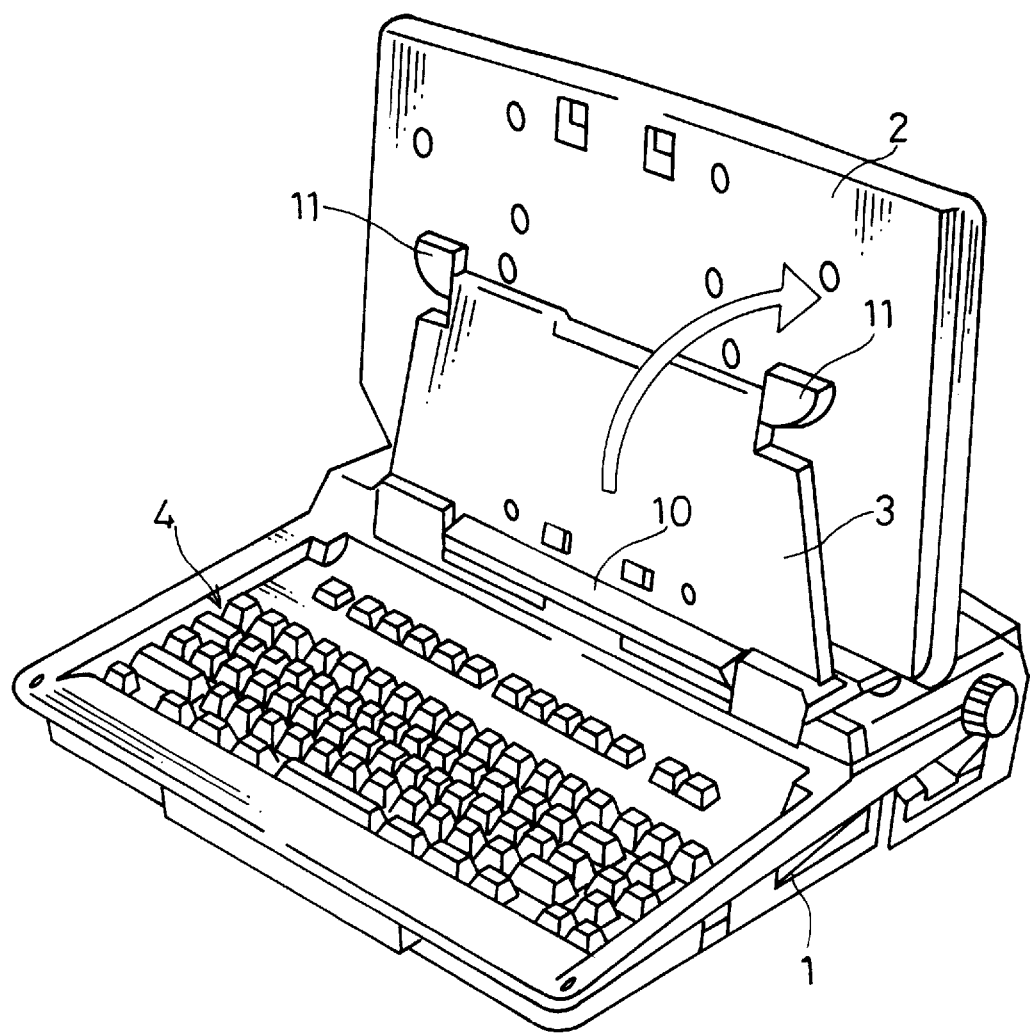
FIG. 25 is a perspective view showing the information processing apparatus without the over-rotation preventing mechanism when the input display section is rotated by an angle of approximate 180 in the key-input position.

In the key-input position, when the input display section 2 is unlocked from the connecting section 3 by the locking mechanism 7, the input display section 2 is rotated with respect to the connecting section 3 by 180° as shown in FIG. 25. As a result, the input display section 2 comes in contact with the main body 1. In order to prevent the occurrence of the above situation, the information processing apparatus of the present embodiment is provided with an over-rotation preventing mechanism for preventing the input display section 2 from being over-rotated in the key-input position.

Figure 26:
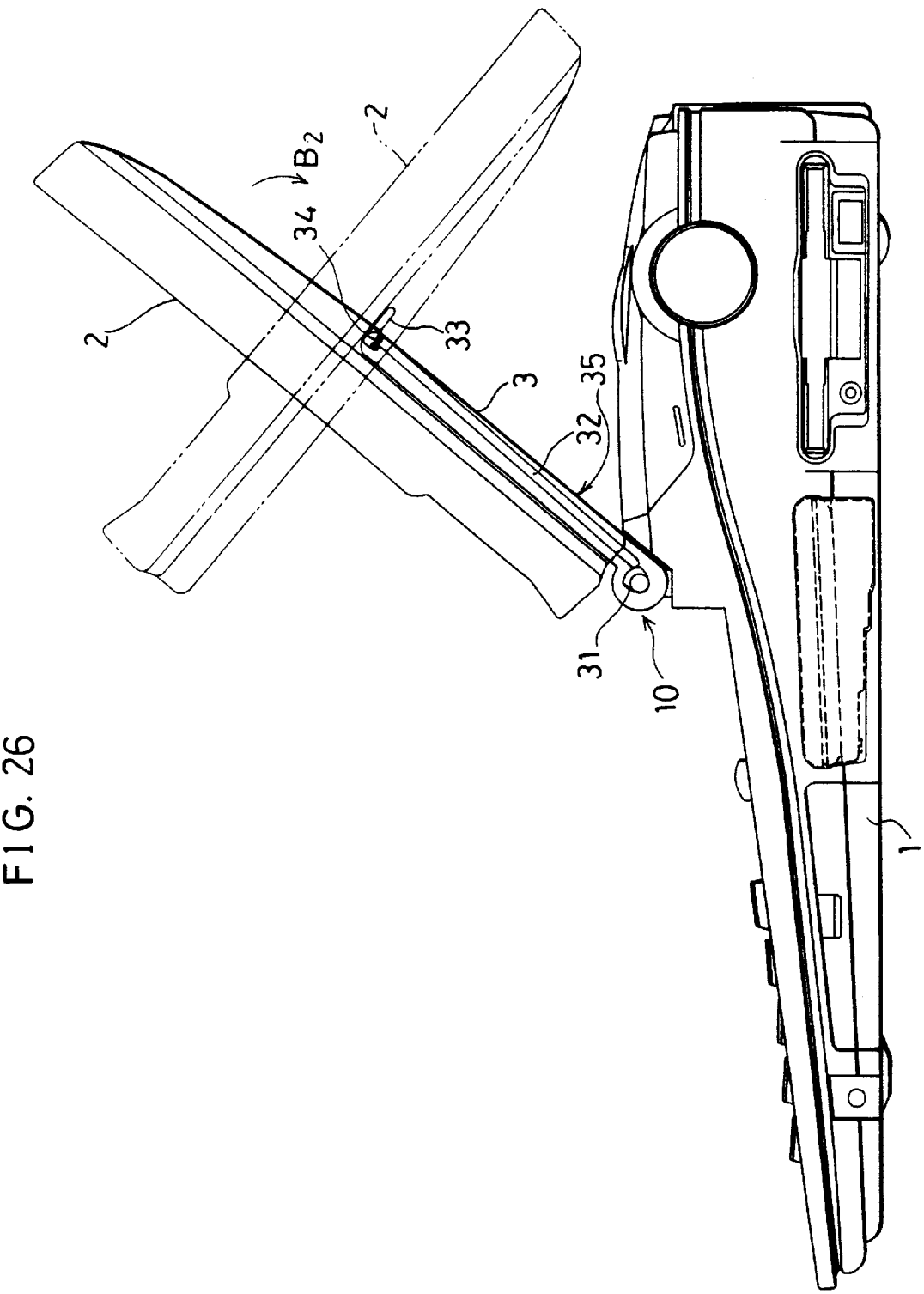
FIG. 26 is a partial cross section showing the side view of the information processing apparatus provided with the over-rotation preventing mechanism in the key-input position.

As shown in FIG. 26, the over-rotation preventing mechanism includes a stop lever 33 (rotatable range controlling member ) and a lever driving section 35 (drive means) for driving the stop lever 33. Here, one end of the stop lever 33 is rotatably secured to the connecting section 3. When the connecting section 3 is rotated in the "open" direction, the stop lever 33 is rotated by the lever drive section 35, and the other end of the stop lever is projected from a stored section for the connecting section 3. In this state, even when the input display section 2 is rotated in the direction of $B_2$, the rotation of the input display section 2 stops when the back surface of the input display section 2 comes in contact with the other end of the stop lever 33. In the described manner, the stop lever 33 controls the rotatable range of the input display section 2.

On the other hand, when the connecting section 3 is rotated in the "close" direction, the lever drive section 35 activates the stop lever 33 so that the other end which is projected from the connecting section 3 is stored in the storing section of the connecting section 3.

The lever drive section 35 is provided with a cam 31, an angle detection bar 32 and a crank shaft 34. The cam 31 is secured to the approximate center of the rotation of the first hinge mechanism 10 which makes the main body 1 and the connecting section 3 rotatably mate with one another. The angle detection bar 32 is provided within the cabinet of the connecting section 3 in such a way that one end thereof is in contact with the surface of the cam 31. The angle detection bar 32 detects the rotation angle of the connecting section 3 by making one end thereof slide along the surface of the cam 31 with the rotating movement of the connecting section 3.

The crank shaft 34 is rotatably provided on the other end of the angle detection bar 32. The crank shaft 34 rotates the stop lever 33 in accordance with an amount of movement in the lengthwise direction of the angle detection bar 32, which is changed by the rotation of the cam 31.

Figure 31:
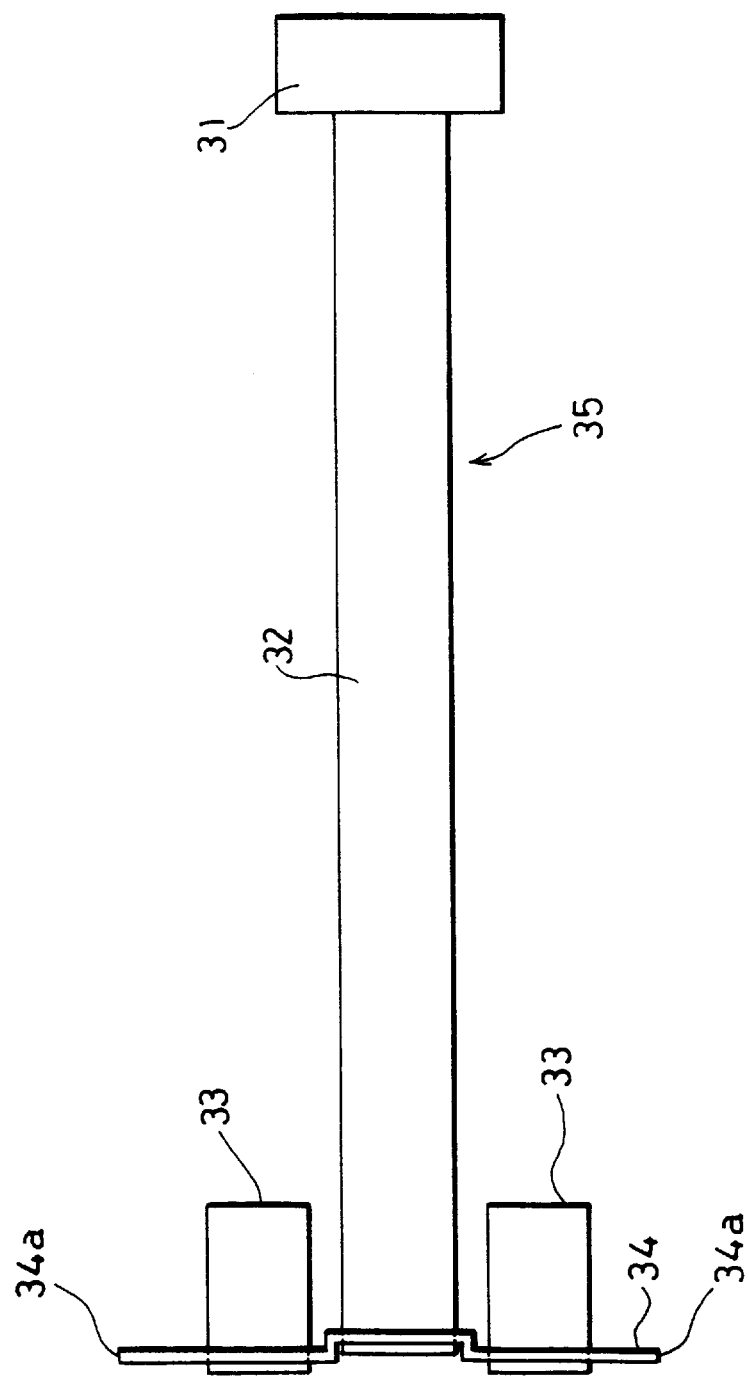
FIG. 31 is a perspective view showing the connecting section in the state of $Y_2$ of FIG. 30 taken in the direction of R.
Figure 32:
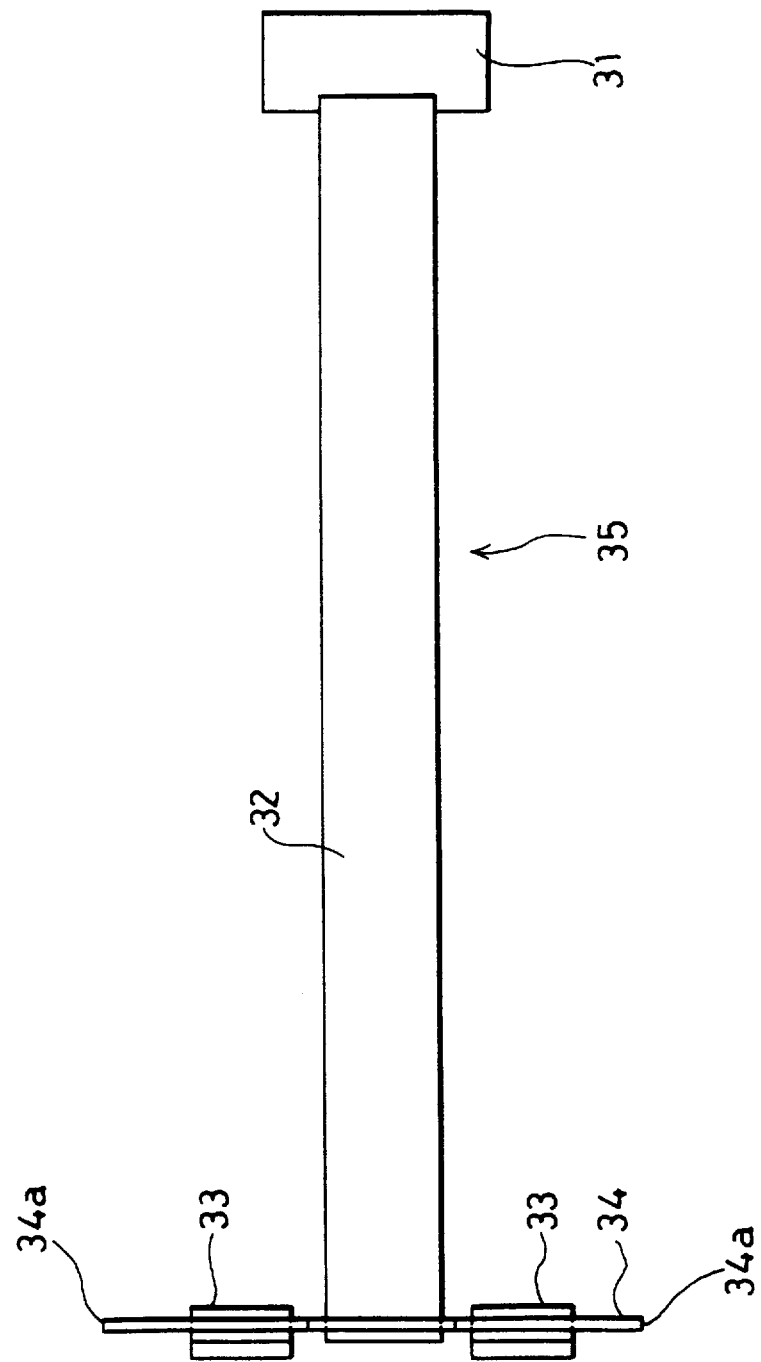
FIG. 32 is a perspective view showing the connecting section in the state of $Y_4$ of FIG. 30 taken in the direction of Q
Figure 33:
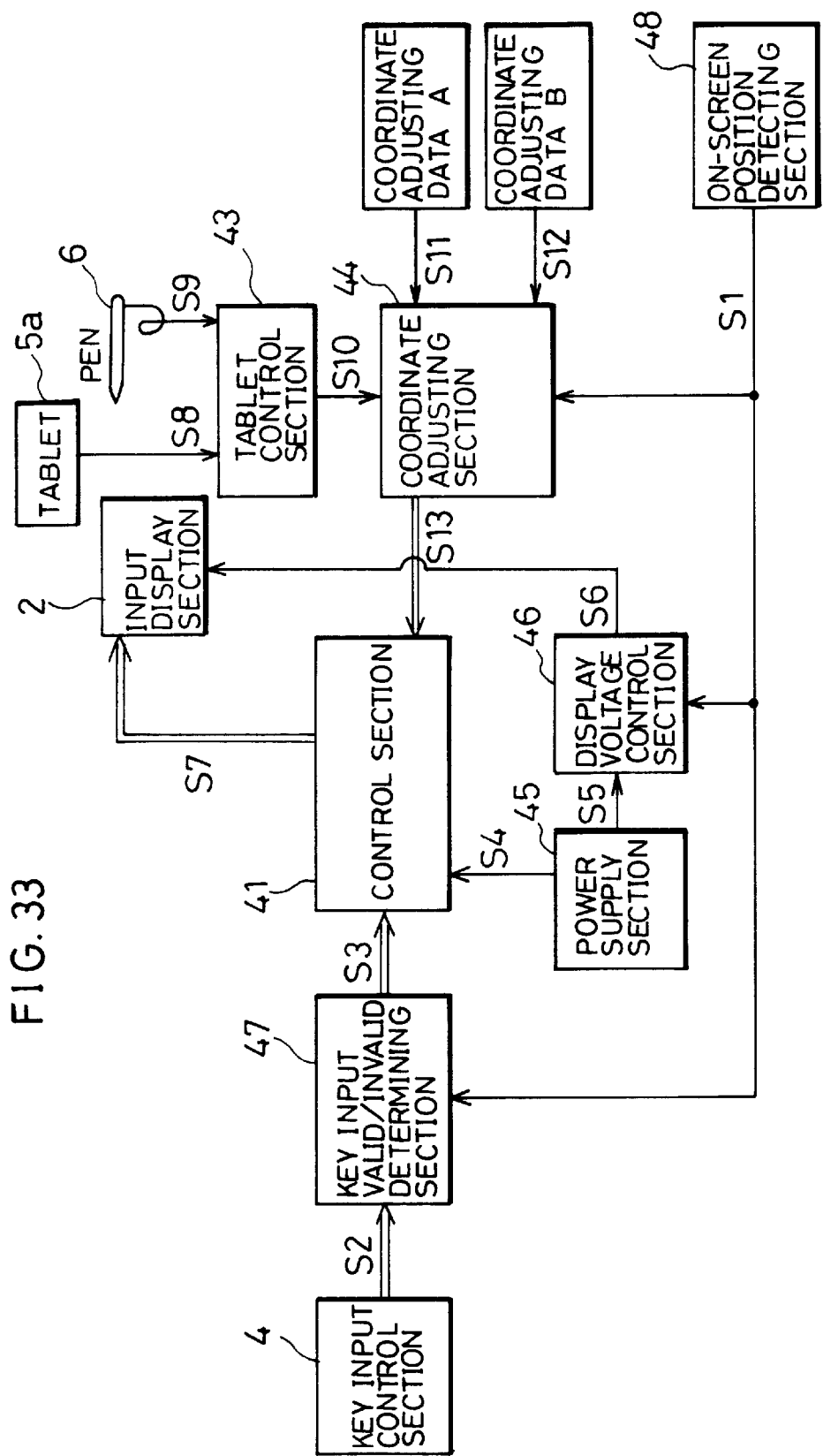
FIG. 33 is a block diagram showing the arrangement of the control system in the information processing apparatus of another embodiment of the present invention.

As shown in FIG. 31 and FIG. 32, the crank shaft 34 is provided with a pair of stop levers 33 which are affixed thereto, and both ends 34a of the crank shaft 34 are rotatably supported by the connecting section 3.

FIG. 31 shows relative positions among the cam 31, the angle detecting bar 32 and the stop lever 33 when the connecting section 3 is rotated. The position of the cam 31 is fixed irrespectively of the movement of the connecting section 3. On the other hand, the angle detecting bar 32 provided in the connecting section 3 is arranged so as to rotate and interlock the connecting section 3. The angle detection bar 32 is arranged so as to slide on the surface of the cam 31 with the rotation of the connecting section 3, and makes a reciprocating movement (swinging movement) within the connecting section 3 as shown in FIG. 26 through FIG. 29. The crank shaft 34 is rotated with the reciprocating movement of the angle detection bar 32, and the stop lever 33 is rotated within a range of approximate 90°.

Figure 30:
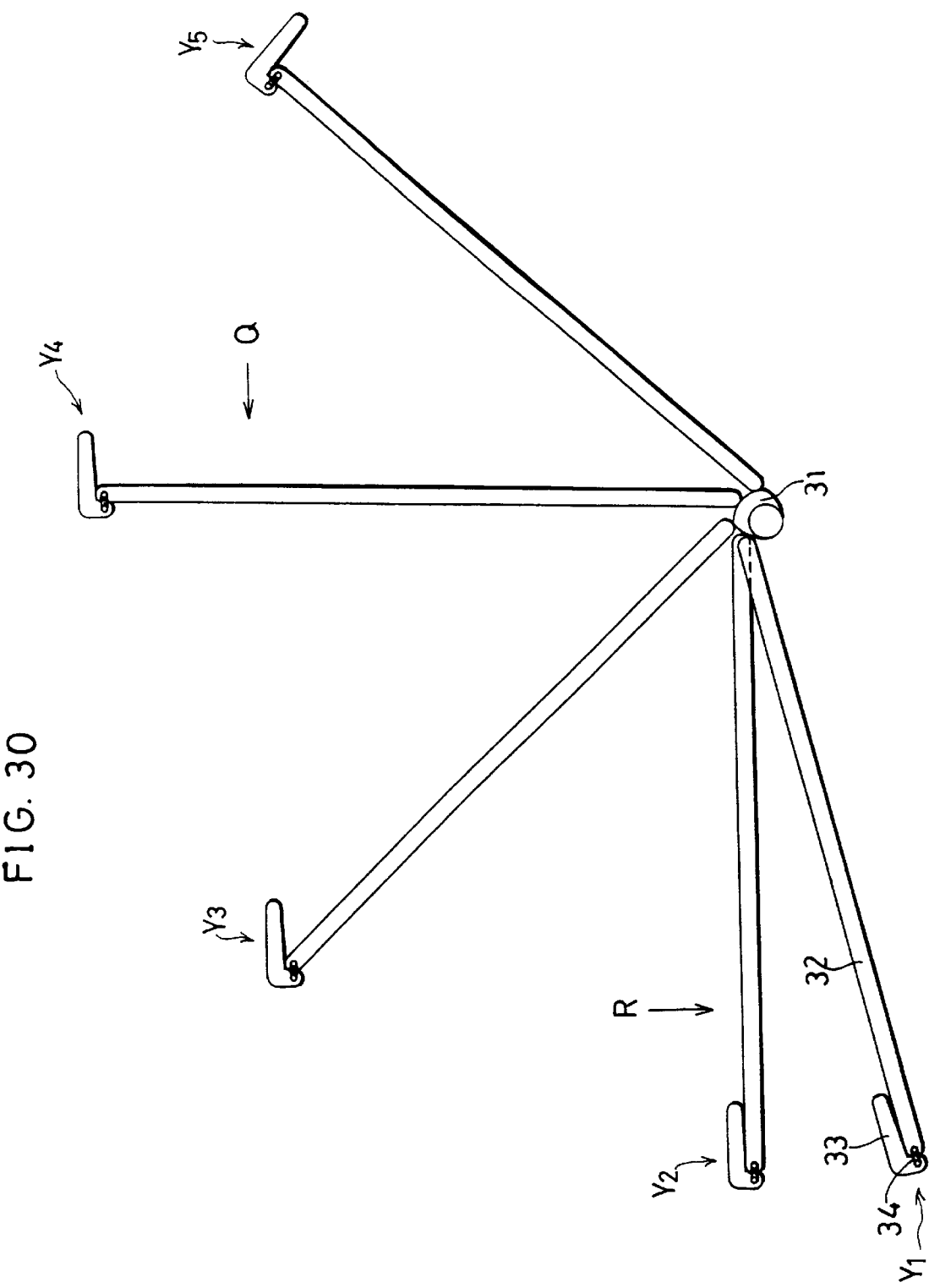
FIG. 30 is an explanatory view showing changes in the over-rotation preventing mechanism when the connecting section is rotated.

FIG. 30 shows relative position of the stop lever 33 and the lever drive section 35 which move in accordance with the movement of the connecting section 3. En FIG. 30, $Y_1$, $Y_3$ and $Y^5$ respectively correspond to the pen-input position shown in FIG. 27, the position shown in FIG. 28 and the pen-input position shown in FIG. 26. FIG. 31 is a view taken in the direction R of FIG. 30 in the position of $Y_2$, and FIG. 32 is a view taken in the direction of Q of FIG. 30 in the position of $Y_4$.

Figure 27:
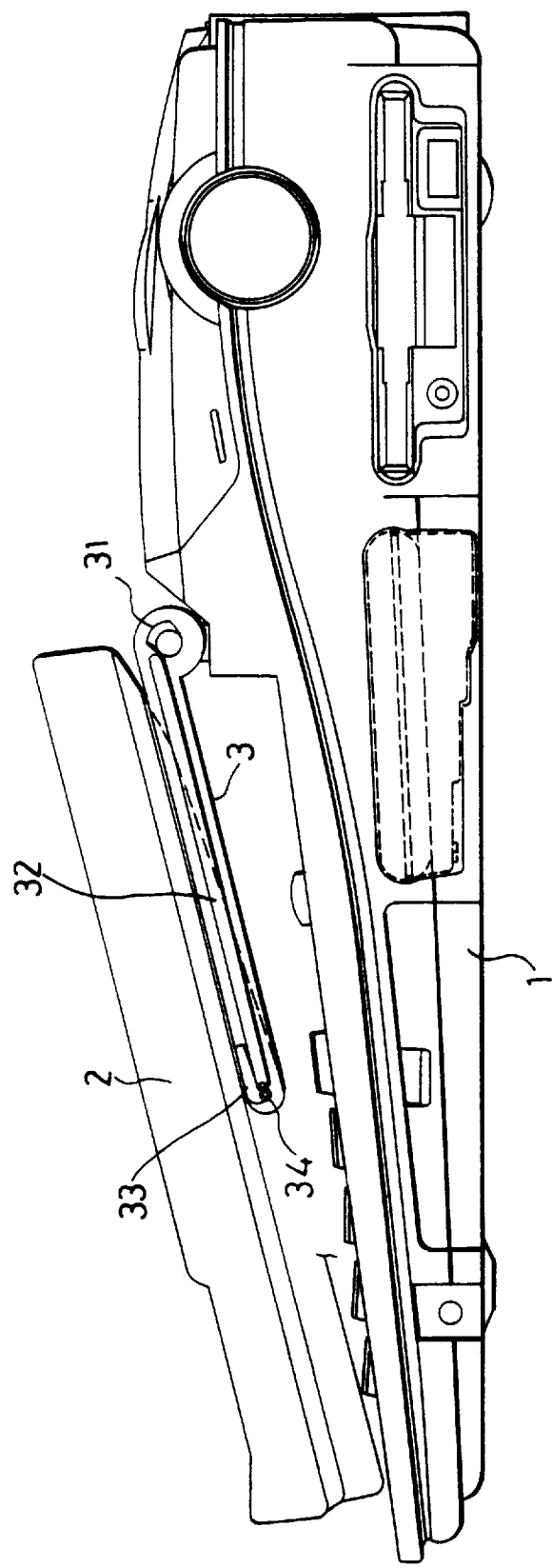
FIG. 27 is a partial cross section showing the side view of the information processing apparatus provided with the over-rotation preventing mechanism in the pen-input position.
Figure 28:
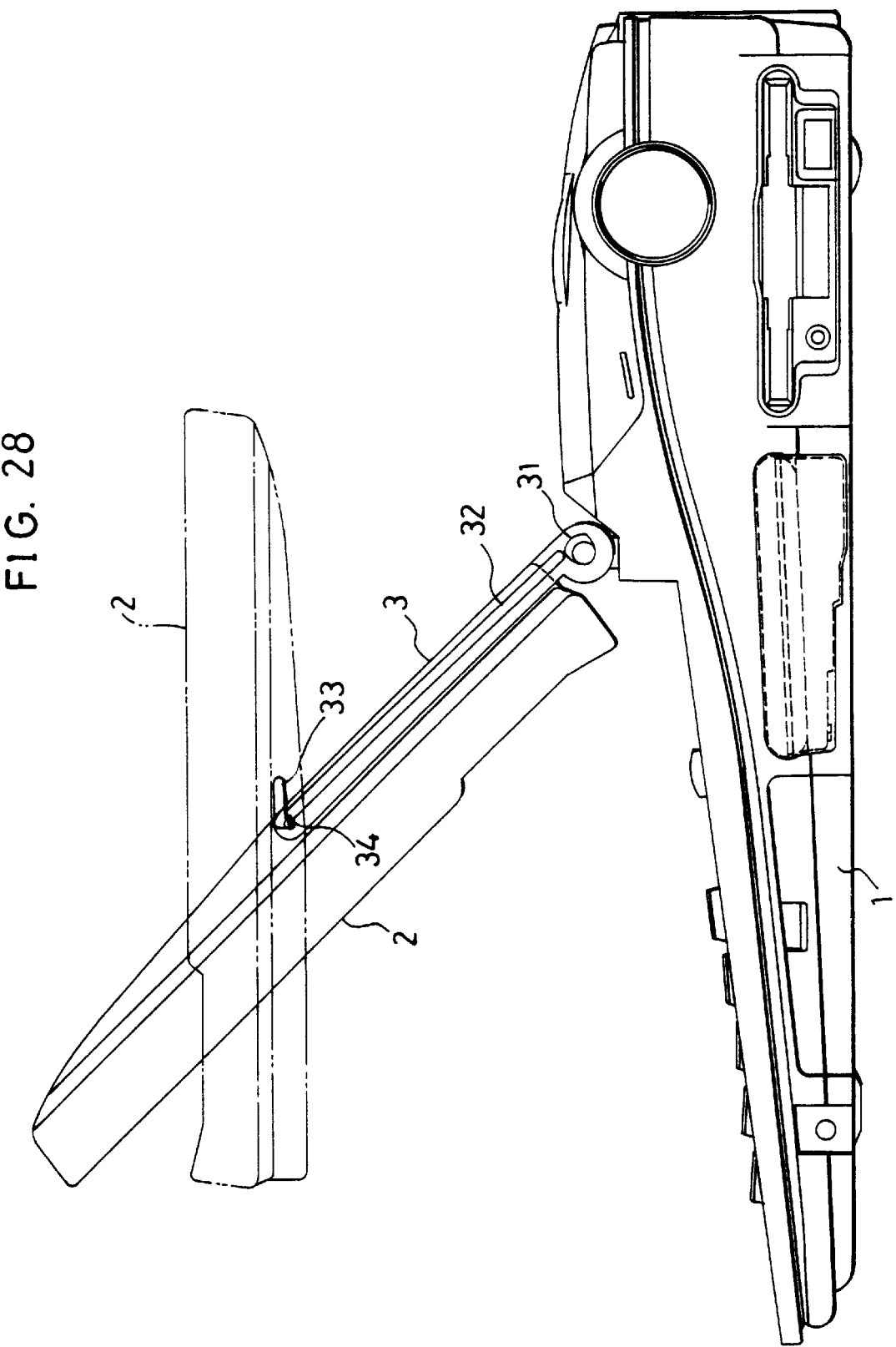
FIG. 28 is a partial cross section showing the side view of the information processing apparatus provided with the over-rotation preventing mechanism.
Figure 29:
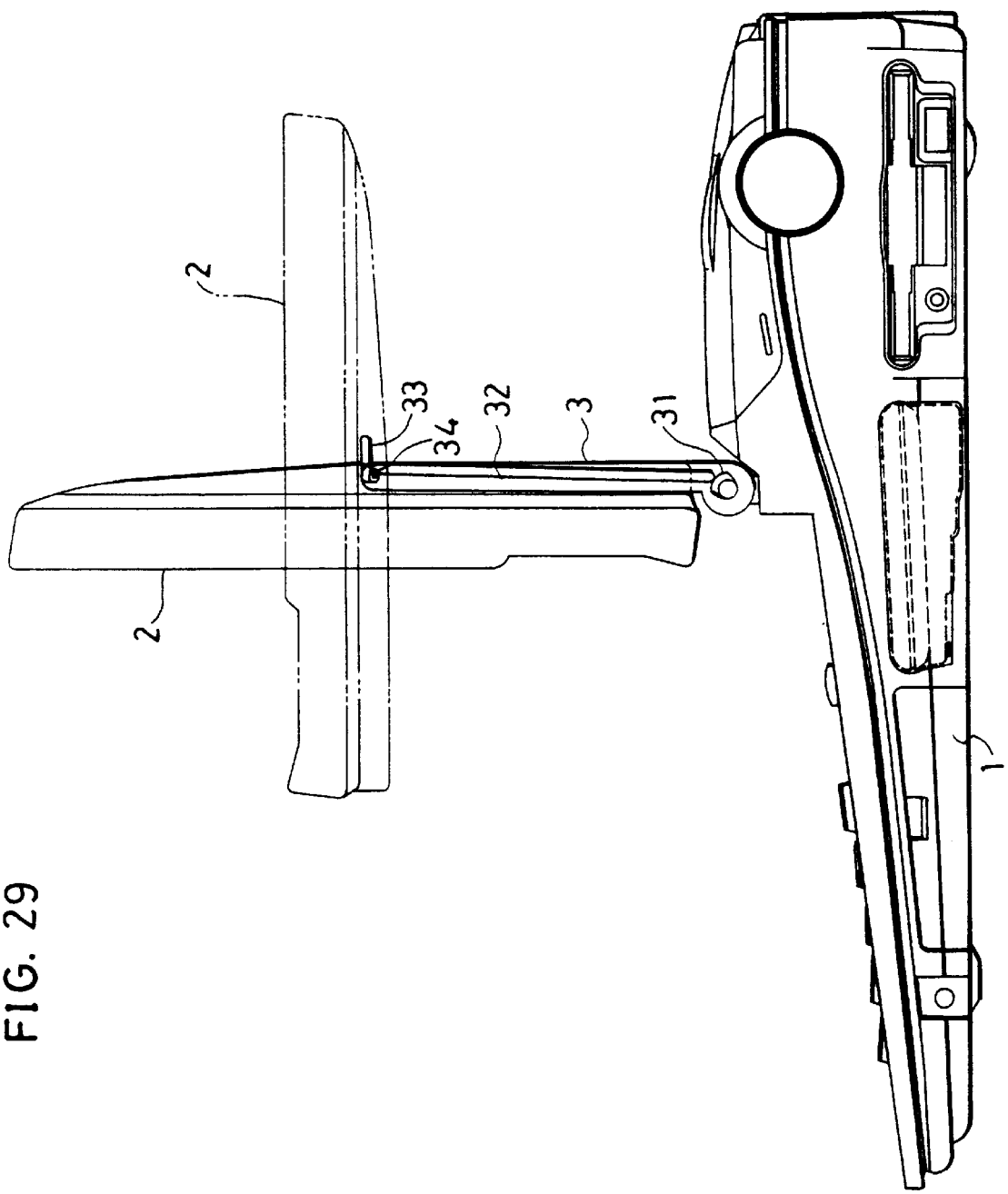
FIG. 29 is a partial cross section showing the side view of the information processing apparatus provided with the over-rotation preventing mechanism with the connecting section which is set at the position substantially perpendicular to the main body.

As shown in FIG. 27, when the apparatus is set in the pen-input position, the stop lever 33 is stored in the storing section of the connecting section 3. Thus, in this position, the rotating movement of the input display section 2 is not controlled by the stop lever 33. As shown in FIG. 28 and FIG. 29, as the apparatus position is moved from the pen-input position to the key-input position, i.e, the connecting section 3 is rotated so as to have a greater angle with respect to the main body 1, the stop lever 33 comes out of the connecting section 3. In this arrangement, the rotatable range of the input display section 2 is controlled by the stop lever 33 so that the input display section 2 does not over-rotate.

As shown in FIG. 26, in the key-input position, even if the input display section 2 is rotated in the direction of $B_1$, the rotation of the input display section 2 can be stopped when the back surface thereof is brought in contact with the stop lever 33 which comes out of the connecting section 3, thereby preventing a contact between the input display section 2 and the main body 1.

As described, the information processing apparatus of the present invention is arranged such that the rotating movement of the input display section 2 is controlled by the stop lever 33 so as to prevent the contact between the input display section 2 and the main body 1 when the apparatus is set in the key-input position, thereby preventing both the input display section 2 and the main body 1 from being damaged or broken due to possible impact between them.

In the present embodiment, the over-rotation preventing mechanism which drives the stop lever 33 by the lever drive section 35 provided with the cam 31, the angle detection bar 3.2 and the crank shaft 34 are adopted. However, the configuration of the over-rotation preventing mechanism is not limited to the above arrangement. For example, it may be arranged so as to drive the slop lever 33 using a gear and a belt which enables an interlocking movement with the rotating movement of the connecting section 3.

As described, as shown in FIG. 1 through FIG. 3, the information processing apparatus of the present embodiment has the main body 1 including the key input control section 4, the input display section 2 having the transparent tablet which enables pen input on the input display section 5 and the connecting section 3 for connecting the display section 2 and the main body 1. One end of the connecting section 3 is connected to the main body 1 so as to be rotatable by the first hinge mechanism 10. The other end of the connecting section 3 is connected to the approximate center of the back surface of the input display section 2 by the second hinge mechanism 11.

Having the above arrangement, the information processing apparatus of the present invention is enables to take the following three positions: the stored position (see FIG. 1) in which the input display screen 5 of the input display section 2 faces the key input control section 4 of the main body 1; the key-input position (see FIG. 2) at which the display screen 5 of the input display section 2 form a predetermined angle to the key input control section 4 of the main body 1 so that key-input is permitted using the key input control section 4 while observing the display screen 5; and the pen-input position (see FIG. 3) at which the input display screen 5 of the input display section 2 is placed upward and nearly flat above the key input control section 4 of the main body 1 so that pen-input is permitted.

In the above arrangement, since one end of the connecting section 3 is rotatably connected to the back surface of the input display section 2 by the second hinge mechanism 11, the back surface of the input display section 2 is supported by the connecting section 3 when the apparatus is set in the key-input position and the pen-input position.

Since the rotation center (fulcrum) of the input display section 2 which is rotatably provided with respect to the connecting section 3 exists on the back surface, the connecting section 3 serves as a stopper for the rotating movement of the input display section 2. Thus, the rotatable range of the input display section 2 can be controlled within 180° without requiring a special mechanism. In the above arrangement, when the apparatus is set in the pen-input position, the input display section 2 can be prevented from over-rotating and contacting the key input control section 4 of the main body 1. As shown in FIG. 21(*a*) and FIG. 21(*c*), in the key-input position and the pen-input position, the back surface of the input display section 2 is supported by a connecting member 3 in contact therewith. Thus, an unstable condition of the input display section 2 can be avoided, and thus it is maintained in a stable condition.

The information processing apparatus of the present embodiment having the above arrangement is further provided with a locking mechanism 7 which enables the input display section 2 to be locked to and unlocked from the connecting section 3. The locking mechanism 7 includes the lock spring 8 and the lock angle 9.

In the above arrangement, when the apparatus position is changed from the stored position to the key-input position or vice versa, the input display section 2 is locked to the connecting section 3, and they can be integrally rotated. This permits the above rotating movement can be achieved with a simplified manner.

As shown in FIG. 5, the locking mechanism 7 is arranged such that the input display section 2 is unlocked automatically from the connecting section 3 only by pulling the bottom part of the input display section 2. Namely, the input display section 2 can be unlocked from the connecting section 3 only if the user pulls the input display section 2 in an operating direction from the key-input position to the pen-input position (see FIG. 17 and FIG. 21). Since the apparatus position can be smoothly changed from the key-input position to the pen-input position, an improved operation efficiency can be achieved.

As shown in FIG. 10 through FIG. 13, the information processing apparatus of the present embodiment is provided with a braking force change mechanism which includes a main shaft 12 having a partial gear 12*a*, and shafts 13 and 14 respectively having gears 13*a* and 14*a*. Since the above braking force change mechanism is provided, a braking force can changed between the movement from the stored position to the key-input position, i.e., when the connecting section 3 is rotated in the "open" direction and the movement from the key-input position to the pen-input position or to the stored position, i.e., when the connecting section 3 is rotated in the "close" direction.

According to the above arrangement, while the input display section 2 is lifted up from the stored position, a small braking force is exerted onto the connecting section 3 being rotated. Therefore, the above movement can be achieved with a small resistance. On the other hand, when the apparatus position is changed from the key-input position to the stored position or to the pen-input position, a large braking force is exerted onto the connecting section 3 being rotated when the input display section 2 comes close to the main body 1. Therefore, when the connecting section 3 is rotated in the "close" direction, a collision between the input display section 2 and the main body 1 can be prevented, thereby permitting a force of impact on the input display section 2 and the main body 1 to be reduced.

In pursuit of still improved operation efficiency, the information processing apparatus of the present invention may be arranged so as to change the braking force exerted onto the connecting section 3 being rotated not only between the "open" direction and the "close" direction, but also during the rotation in the same direction. More specifically, in the case of rotating in the "open" direction, when an angle formed by the input display section 2 and the main body 1 falls in a range where an angle adjustment is to be made (105°–145°), a large braking force is exerted so as to allow an easy angle adjustment. On the other hand, in the case of rotating in the "close" direction, a small braking force is exerted until the input display section 2 comes close to the main body 1 so as to reduce the resistance.

As shown in FIG. 20, the information processing apparatus of the present invention is provided with the projections 1*c* which are higher than the input keys 4*a* on both sides of the key input control section 4 of the main body 1. With the above projections 1*c*, when the apparatus position is changed from the key-input position to the pen-input position, at least a predetermined interval can be ensured between the input display section 2 and the key input control section 4.

Therefore, key input error due to a contact between the input display section 2 and the key input control section 4 which may occur when the apparatus position is changed from the key-input position to the pen-input position can be avoided.

As shown in FIG. 22 and FIG. 23, the information processing apparatus of the present embodiment is arranged such that the connecting section 3 has an inner space so as to allow a free passage for the FPC cable 22 which electrically connects the main body 1 and the input display section 2. Within the inner space, the guide shaft 22 is provided so that its rotation center coincides with that of the second hinge mechanism 11. The guide shaft 22 has the through hole 22a which allows a free passage for the FPC wire 21 and the guide member 23 for connecting the guide shaft 22 to the back surface of the input display section 2. The guide member 23 also has the through hole 23a which allows a free passage for the FPC wire 21, which is connected to the through hole 22a. The cross section of the through hole 22a formed in the guide shaft 22 circularly expands into inner space of the connecting section 3.

As shown in FIG. 24(*a*) through FIG. 24(*c*), the input display section 2 is rotated about the connecting section, 3 within a range of approximate 180°, and with the rotating movement of the the input display section 2, the guide shaft 22 is also rotated. In this case, the FPC wire 21 which communicates through the through holes 22a and 23a bends at an angle of approximate 90°. However, the FPC wire 21 can be prevented from bending sharply as it bends through the through hole 22a having a circular cross section formed in the guide shaft 22. This permits an improved durability of the FPC wire 21 without being disconnected, thereby ensuring a long life of the apparatus.

The information processing apparatus having the above arrangement of the present embodiment is further provided with the cover film 26 which covers the through hole 22a formed in the guide shaft 22. Since the through hole 22a is covered by the cover film 26, the unpresentable condition that the FPC wire 21 appears from the through hole 22a can be prevented.

As shown in FIG. 26 through FIG. 32, the information processing apparatus is provided with the stop lever 33 which controls the rotatable range of the input display section 2 with respect to the connecting section 3 and the lever drive section 35 which drives the stop lever 33. When the apparatus position is changed from the stored position to the key-input position, i.e., when the connecting section 3 is rotated in the "open" direction, the stop lever 33 comes out of the storing space of the connecting section 3 onto the orbit of the rotation of the input display section 2. On the other hand, when the apparatus position is changed from the key-input position to the pen-input position or to the stored position, i.e., when the connecting section 3 is rotated in the "close" direction, the stop lever 33 comes off the orbit of the input display section 2 to be stored in the storing space of the connecting section 3.

According to the above arrangement, in the key-input position, the rotating movement of the input display section 2 is controlled by the stop lever 33 so as to avoid a contact between the input display section 2 and the main body 1, thereby preventing both the input display section 2 and the main body 1 from being damaged or broken due to a collision between them.

Furthermore, in the pen-input position and the stored position, the stop lever 33 is stored in the storing space of the connecting section 3. Therefore, desirable pen-input position and stored position can be ensured without having the problem that the orbit of the rotation of the input display section 2 is disturbed by the connecting section 3.

EMBODIMENT 2

The following description will discuss another embodiment of the present invention with reference to FIG. 33 through FIG. 37. For convenience, members having the same function as in the first embodiment will be designated by the same codes, and thus the descriptions thereof shall be omitted here.

The information processing apparatus of the present embodiment has basically the same configuration as the information processing apparatus of the first embodiment, and the apparatus can take the following three positions: a stored position, a key-input position and a pen-input position.

Figure 34:
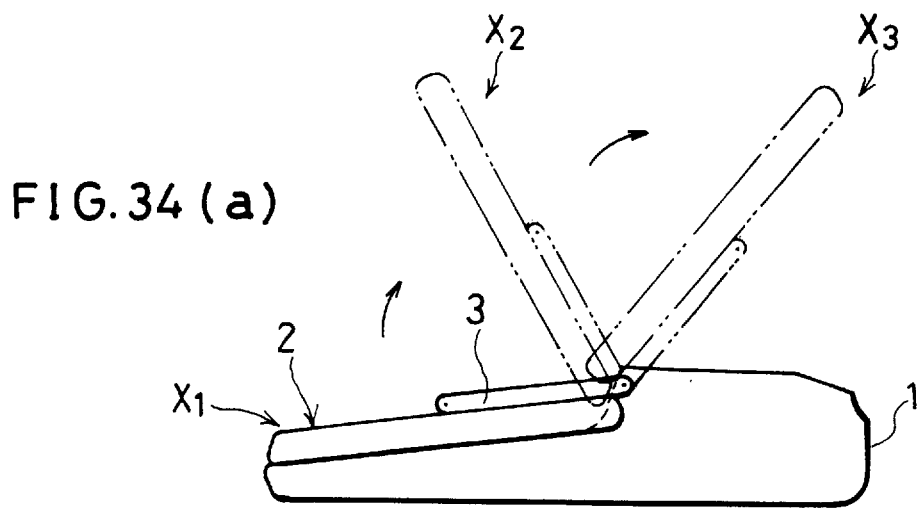
FIG. 34(a) through 34(c) are side views of the information processing apparatus showing changes in the positions of the input display section of the information processing apparatus.
Figure 34:
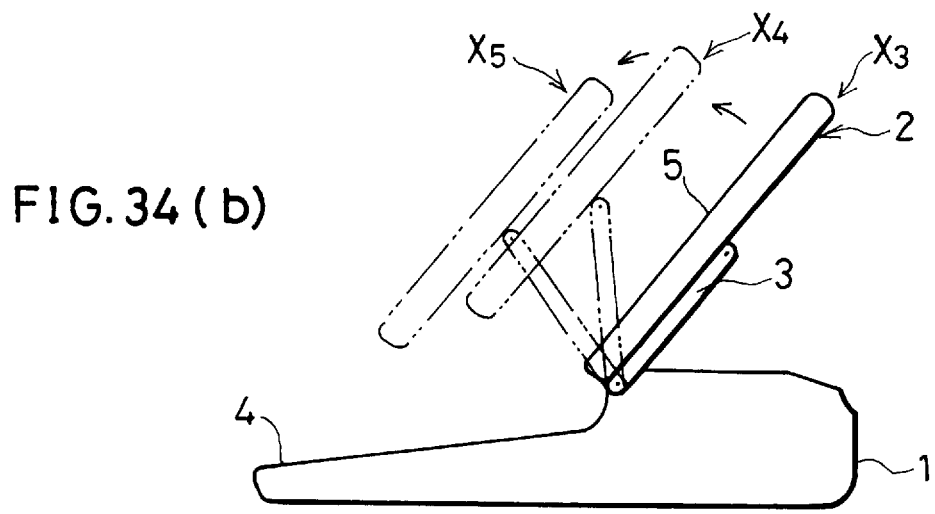
Figure 34:
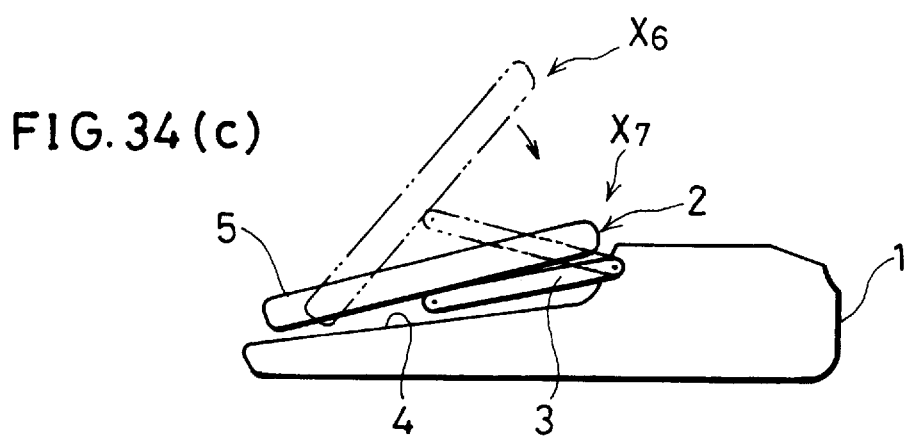
Figure 35:
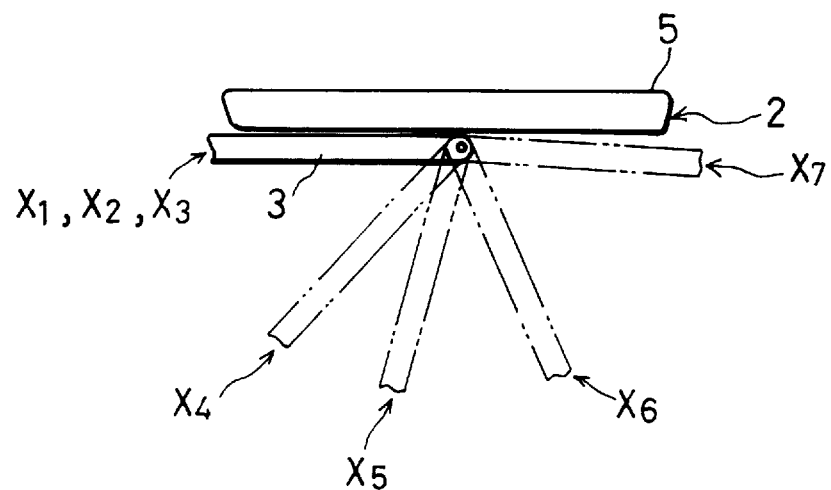
FIG. 35(a) is a side view showing the relationship between the input display section and the connecting section.
FIG. 35(b) is a side view showing an operation of the switch provided on the connecting section.
Figure 35:
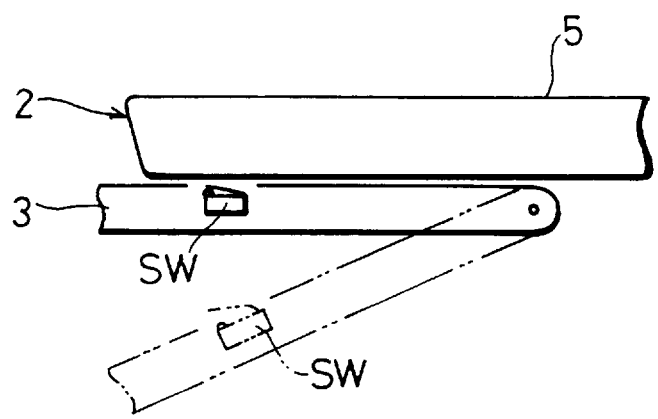
Figure 36:
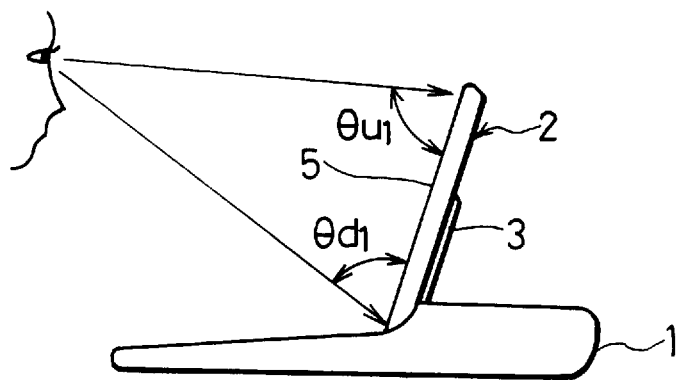
FIG. 36(a) through FIG. 36(c) are side views respectively showing relationships between the input display screen and the line of sight.
Figure 36:
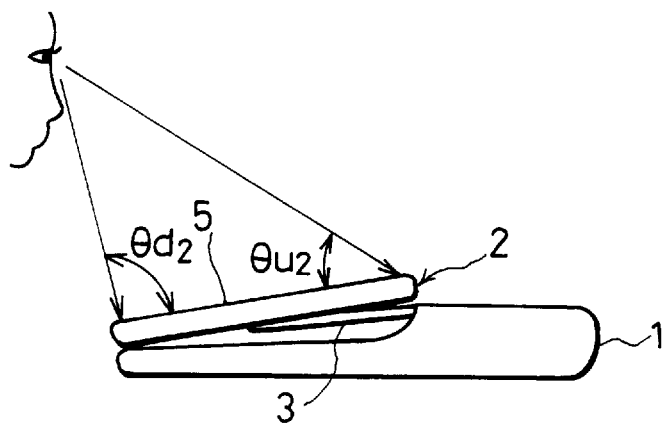
Figure 36:
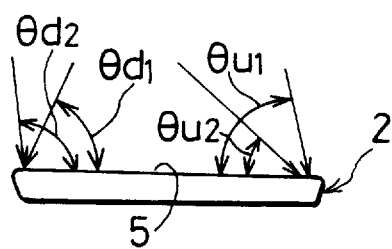

As shown in FIG. 34(*a*) through FIG. 34(*c*), in the information processing apparatus of the present embodiment, a main body 1 and an input display section 2 are connected by a connecting section 3. The connecting section 3 is provided so as to be rotatable with respect to the main body 1 and the input display section 2. The main body 1 includes a key input control section 4 which is covered by the input display section 2 in the stored position shown in FIG. 34(*a*).

In the information processing apparatus of the present embodiment, the stored position is shown by the solid line in FIG. 34(*a*), the key-input position is shown by the solid line in FIG. 34(*b*), and the pen-input position is shown by the solid line in FIG. 34(*c*).

When the position of the input display section 2 is greatly changed between the key-input position and the pen-input position, a display voltage can be adjusted to obtain an optimal display voltage for each position. In the case of carrying out a pen-input operation, coordinate error may occur between the above two positions. Furthermore, although it is arranged such that the pen-input is not permitted in the pen-input position, a signal may be generated from the key input control section. In order to counteract the above problem, the information processing apparatus of the present invention is provided with a control system having the configuration shown in FIG. 33, which determines key-input valid or invalid, and controls display voltage and also adjusts coordinates of the tablet.

The control system includes a control section 41, a tablet control section 43, key-input valid/invalid determining section 47, a power supply section 45, a display voltage control section 46, coordinate adjusting section 44 and a display position detecting section 48.

The control section 41 serves as a main control section which includes CPU, ROM, RAM, a memory section such as a floppy disk, a printing section, etc. The key input control section 4 is connected to the control section 41 through the key-input valid/invalid determining section 47. The control section 41 is connected to the input display section 2.

The power supply section 45 is provided for supplying a power to the entire apparatus and for supplying a voltage S4 to the control section. The power supply section 45 also supplies a voltage S5 to the display voltage control section 46.

The on-screen position detecting section 48 includes a switch which is set ON/OFF according to the position of the input display section 2. The switch is set ON when the information processing apparatus is in the key-input position, and it is set OFF in the pen-input position. The on-screen position detecting section 48 inputs a signal S1 indicating of ON/OFF of the switch to the key-input valid/invalid determining section 417, the display voltage control section 46 and the coordinate adjusting section 44.

The key-input valid/invalid determining section 47 determines whether the signal S2 from the key input control section 4 is valid or invalid based on the signal S1 from the key input control section 4. More specifically, when the signal S1 indicative of ON is received, it is determined that the signal S2 from the key input control section 4 is valid, and the signal S3 indicative of "valid" is inputted to the control section 41. On the other hand, when the signal S1 indicative of OFF is received, it is determined that the signal S2 is invalid, and the signal S3 indicative of "invalid" is inputted to the control section 41.

The display voltage control section 46 controls the display voltage S6 to be applied to the input display section 2 so that an optimal display condition for each state can be achieved based on the signal S1 from the display position detecting section 48 indicative of ON or OFF.

In the case of carrying out pen-input using the tablet 5a and the pen 6, if the information processing apparatus position is changed, coordinates may be recognized differently, and therefore the adjustment of coordinates are required. Two kinds of data for the adjustment of coordinates are prepared: coordinate adjustment data A for the key-input position, and coordinate adjusting data B for the pen-input position. The coordinate adjusting section 44 selects between a signal S11 of the coordinate adjusting data A or a signal S12 of the coordinate adjusting data B depending on whether the signal S1 from the display position detecting section 48 indicative of ON or OFF.

The tablet control section 43 for controlling the function of the tablet is connected to the coordinate adjusting section 44. A signal S8 from the tablet 5a and a signal S9 from the pen 6 are inputted to the tablet control section 43. Based on the signal S8 and the signal S9, the tablet control section 43 inputs a signal S10 to the coordinate adjusting section 44. As described, the coordinate adjusting section 44 selected between the signal S11 and the signal 12 based on the signal S1, and inputs the signal S13 to the control section 41 after adjusting the signal S10. The control section 41 inputs a signal S7 to the input display section 2 and adjusts a display for each position of the information processing apparatus.

Namely, when the information processing apparatus is set in the key-input position, the switch provided in the display position detecting section 48 is set ON, and the signal S1 indicative of ON is sent to the coordinate adjusting section 44, the display voltage control section 46 and the key input valid/invalid determining section 47. Then, the coordinate adjusting section 44 selects the signal S11 of the coordinate adjusting data A corresponding to the key-input control position and inputs a signal S13 to the control section 41 after adjusting the signal S10 from the tablet control section 43. The display voltage control section 46 applies the display voltage S6 corresponding to the key-input position to the input display section 2. As a result, the key-input valid/invalid determining section 47 determines that the signal S2 from the key input control section 4 is valid and inputs the signal S3 indicative of "valid" to the control section 41.

On the other hand, when the information processing apparatus is set in the pen-input position, the switch provided in the display position detecting section 48 is set OFF, and the signal indicative of "OFF" is sent to the coordinate adjusting section 44, the display voltage control section 46 and also the key-input valid/invalid determining section 47. As a result, the coordinate adjusting section 44 selects the signal S12 of the coordinate adjusting data B corresponding to the pen-input position, and inputs the signal S13 to the control section 41 after adjusting the signal S10 from the tablet control section 43. The display voltage control section 46 applies the voltage S6 corresponding to the pen-input position to the input display section 2. As a result, the key-input valid/invalid determining section 47 determines that the signal S2 form the key input control section 4 is invalid, and inputs the signal S3 indicative of "invalid" to the control section 41.

As described, the information processing apparatus which is driven under the conditions suitable for the key-input position and the pen-input position.

Additionally, the coordinate adjusting data A and the coordinate adjusting data B are shown using dependent tables in the present embodiment. However, it may be arranged such that individual data can be distinguished from the calculation based on the signal S1. Alternatively, it may be arranged such that depending on the condition of the display position detecting section 48, a condition suitable for each condition is selected by a plurality of signals instead of using a single signal S1.

An example of the display position detecting section 48 will be explained below.

FIG. 34(a) shows an orbit of the input display section 2 from the stored position to the key-input position. As shown in the figure, the input display section 2 in the stored position is moved to the positions $X_1$, $X_2$ and $X_3$ in this order and finally to the key-input position.

When the apparatus position is changed from the key-input position to the pen-input position, the position of the input display section 2 is changed from the position shown in FIG. 34(b) to the position shown in FIG. 34(c). First, the position of the input display section 2 is moved from the key-input position $X_3$ to the position $X_4$ and further to the position $X_5$ so as to gradually move the key input control section 4 upward. Then, from the position $X_6$, the input display section 2 is moved so as to place nearly flat above the key input position 4 with the input display screen 5 facing upward, thereby being set in the pen-input position $X_7$.

FIG. 35(a) shows respective relative positions between the input display section 2 and the connecting section 3 in accordance with the respective positions $X_1$ through $X_7$ shown in FIG. 34(a) through FIG. 34(c). As described, the connecting section 3 rotates on the orbit within 180° with respect to the input display section 2. As shown in FIG. 35(b), for the switch provided in the display position detecting section 48, the switch SW is provided in the connecting section 3 which is switched ON when it comes in contact with the input display section 2. The switch SW is set ON when the connecting section 3 is in the position $X_1$ through $X_3$ shown in FIG. 35(b). The switch SW is set OFF when the connecting section 3 is in the position $X_4$ through $X_7$.

Based on ON/OFF of the switch SW, the display position detecting section 48 inputs the signal S1 to the key input valid/invalid determining section 47, the display voltage control section 46 and the coordinate adjusting section 44.

In the present embodiment, explanations are given through the case where the switch SW of the display position detecting section 48 is provided in the connecting section 3. However, it may be provided in other positions such as beside the key input control section 4 of the main body 1, on the circumference of the input display section 2, inside the outer edge of the input display section 2. Alternatively, it may be arranged such that the position of the input display section 2 is detected by detecting the position of a member, which is changed in accordance with the movement of the input display section 2 or detecting the tilt direction of the input display section 2. Other than the above arrangement, it may be arranged so as to use a light emitting element and a light receiving element. In this case, in the case of carrying out key-input or pen-input, the display position is detected in such a manner that a light emitted from the light emitting element provided on the movable or fixed position is received by the light receiving element.

The display voltage control section 46 will be explained below.

FIG. 36(a) through FIG. 36(c) show relationships between the input display screen 5 and the angle of sight in the key-input position and the pen-input position.

In FIG. 36(a) which shows the key-input position, the line of sight to the top end of the input display screen 5 and the input display screen 5 form an angle of "θu1". Similarly, the line of sight to the bottom end of the input display screen 5 and the input display screen 5 form an angle of "θd1". In FIG. 36(b) which shows the pen-input position, the line of sight to the top end of the input display screen 5 and the input display screen 5 form an angle of "θu2". Similarly, the line of sight to the bottom end of the input display screen 5 and the input display screen 5 form an angle of "θd2". The relationship among the above angles are summarized in FIG. 36(c).

As described, when the display position is changed with respect to the input display screen 5, the angle of sight is greatly changed. Namely, between the key-input position and the pen-input position, the angle of sight of the user with respect to the input display screen 5 is greatly changed. For example, in the case of using the liquid crystal display as the input display section 2, in order to obtain an optimal contrast in any positions, the display voltage is required to be adjusted for each position.

The display voltage can be controlled by the switch SW (see FIG. 35(b)) provided in the connecting section 3. Namely, in the key-input position, the switch SW is set ON, and a suitable voltage S6 is applied to the input display section 2 from the display voltage control section 46. On the other hand, in the pen-input position, the switch SW is set OFF, and therefor a suitable display voltage S6 is applied to the input display section 2 from the display voltage control section 46. As a result, an optimal contrast for each position of the input display section 2 can be achieved, thereby achieving an improved display quality in any position.

The coordinate adjusting section 44 will be explained below.

Figure 37:
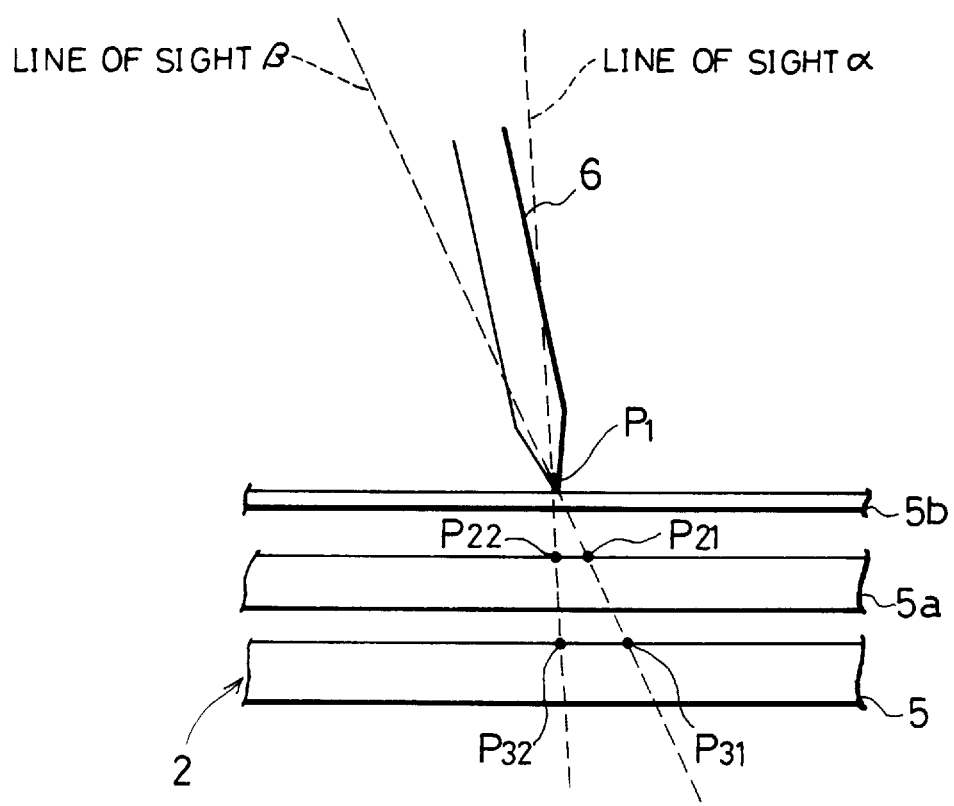
FIG. 37 is a cross section showing a change in the coordinate in each surface of the input display section.

FIG. 37 shows the state where the input display section 2 including the tablet 5a is made in contact with the pen 6. The transparent tablet 5a is provided on the surface of the input display screen 5 whereon a protective sheet 5b is laminated.

When a point of the pen 6 is brought in contact with a point $P_1$ on the protective plate 5b, a line extended from the line of sight so as to pass through the point $P_1$ passes through the point $P_{22}$ and crosses the tablet 5a, and further passes through the point $P_{32}$ and crosses the input display screen 5. On the other hand a line extended from a line of sight b so as to pass a point $P_1$ passes through a point $P_{21}$ and crosses the tablet 5a. This extended line also passes through a point $P_{31}$ and crosses the input display section 5. Namely, although the pen 6 touches the same position on the protective sheet 5b, if angle of sight changes, the position on the input display screen 5 intended by the user becomes different.

Here, some input display sections 2 are arranged such that the tablet and the input display screen are integrated. In this arrangement of the input display section 2, if the angle of sight changes, the coordinate on the input display screen 5, corresponding to the position touched with the pen 6 on the protective plate 5b becomes different.

As described, when carrying out pen-input while observing the content displayed on the input display screen 2, the point $P_1$ actually touched with the pen 6 does not correspond to the objective coordinate.

Therefore, in the case of carrying out the pen-input using the tablet 5a and the pen 6, even if the relative position between the user and the input display section 2 is maintained constant, the angle of sight differs depending on the position on the input display screen 5. Therefore, normally, an adjustment is made for eliminating a physical coordinate error for each coordinate position. However, in the information processing apparatus of the present embodiment, pen-input is permitted both in the key-input position and the pen-input position, and thus coordinate error generated in each position is different. Therefore, the information processing apparatus of the present embodiment has the coordinate adjusting data A and the coordinate adjusting data B for the respective positions.

A selection between the data A and the data B is made using the switch SW provided on the display position detecting section 48. Namely, when the signal S1 from the display position detecting section 48 indicates the key-input position, the coordinate adjusting section 44 selects the coordinate adjusting data A and adjusts the coordinate to be inputted to the control section 41. On the other hand, when the signal S1 from the display position detecting section 48 indicates the pen-input position, the coordinate adjusting section 44 selects the coordinate data B and adjusts the inputted coordinate.

As described, according to the position detected by the display position detecting section 48, the coordinate error corresponding to the respective positions can be calculated, thereby improving an accuracy in the tablet-input.

Moreover, when the apparatus is in the pen-input position, the key input control section 4 is covered by the input display section 2, and normally, input from the key input control section 4 is not made. However, due to an extraneous substance inserted between the input display section 2 and the key input control section 4, the key input may be made, which causes an error. In order to prevent the above problem, the information processing apparatus of the present embodiment is provided with the key-input valid/invalid determining section 47. In the determination made by the key-input valid/invalid determining section 47, the switch SW of the display position detecting section 48 can be used.

In the above arrangement, if it is detected by the switch SW that the apparatus is set in the pen-input control position, even if key-input is made, an occurrence of the error input can be avoided since the key-input valid/invalid determining section 47 determines the key-input invalid.

As described, the information processing apparatus of the present embodiment is provided with the display position detecting section 48, which permits to detect whether the apparatus is in the key-input position or in the pen-input position. The information processing apparatus of the present embodiment is also provided with the display voltage control section 46. Therefore, based on the result of detection by the display position detecting section 48, the display voltage to be applied to the input display section 2 can be controlled, thereby ensuring a desirable display condition in any positions.

The information processing apparatus of the present embodiment is provided with the coordinate adjusting section 44 which adjusts the coordinate inputted from the tablet 5a using the coordinate adjusting data corresponding to each position based on the result of detection by the display position detecting section 48. This permits the coordinate to be accurately recognized both when carrying out pen-input in the key-input position and the pen-input position, thereby improving an accuracy in tablet-input.

Moreover, since the information processing apparatus of the present embodiment is provided with the key-input valid/invalid determining section 47, based on the result of detection by the display position detecting section 48, when the apparatus is set in the pen-input position, the key-input is determined invalid. As a result, ever if an extraneous substance is inserted between the input display section 2 and the key input control section 4, input error can be avoided, thereby improving the operation efficiency.

EMBODIMENT 3

The following description will discuss still another embodiment of the present invention with reference to FIGS. 2, 3, 20 and FIGS. 38–49. For convenience, members having the same function as in the first embodiment will be designated by the same code, and thus the descriptions there of shall be omitted here.

Figure 38A:
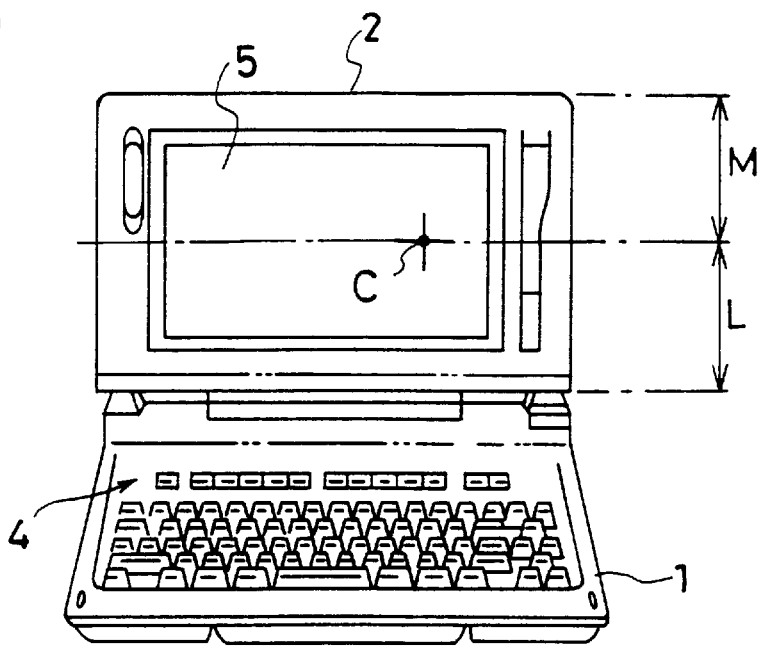
FIG. 38(a) which shows still another embodiment of the present invention is a front view showing the information processing apparatus in the first key-input position.
Figure 38B:
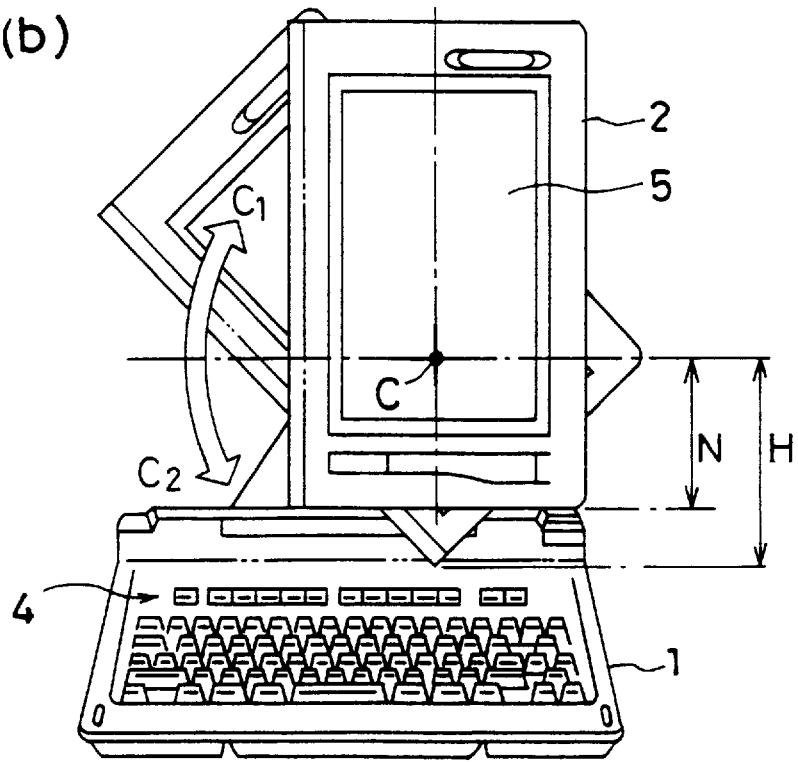
FIG. 38(b) is a front view showing the information processing apparatus when the apparatus position is changed from the first key-input position to the second key-input position.
Figure 39:
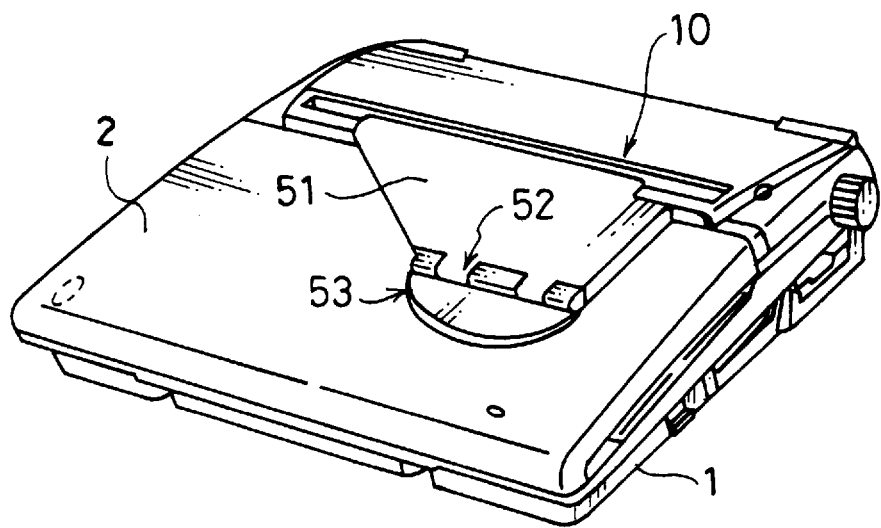
FIG. 39 is a perspective view of the information processing apparatus in the stored position.

As shown in FIGS. 38(a) and 38(b), the information processing apparatus of the present embodiment is arranged such that an input display section 2 can be switched from the horizontal position to the vertical position (hereinafter referred to as standard display and page layout display). For the above arrangement, in the information processing apparatus of the present embodiment, a connecting section 51 which has a different shape from the connecting section 3 used in previous embodiments, for connecting a main body 1 and the input display section 2 as shown in FIG. 39. Sections which connect the connecting section 51 and the input display section 2 also have different structures from the previous embodiments.

However, members such as the main body 1, the input display section 2, a key input operation section 4 and a first hinge mechanism 10 which connects the main body 1 and the connecting section 51 have almost the same functions as those of the previous embodiment 1.

Figure 40:
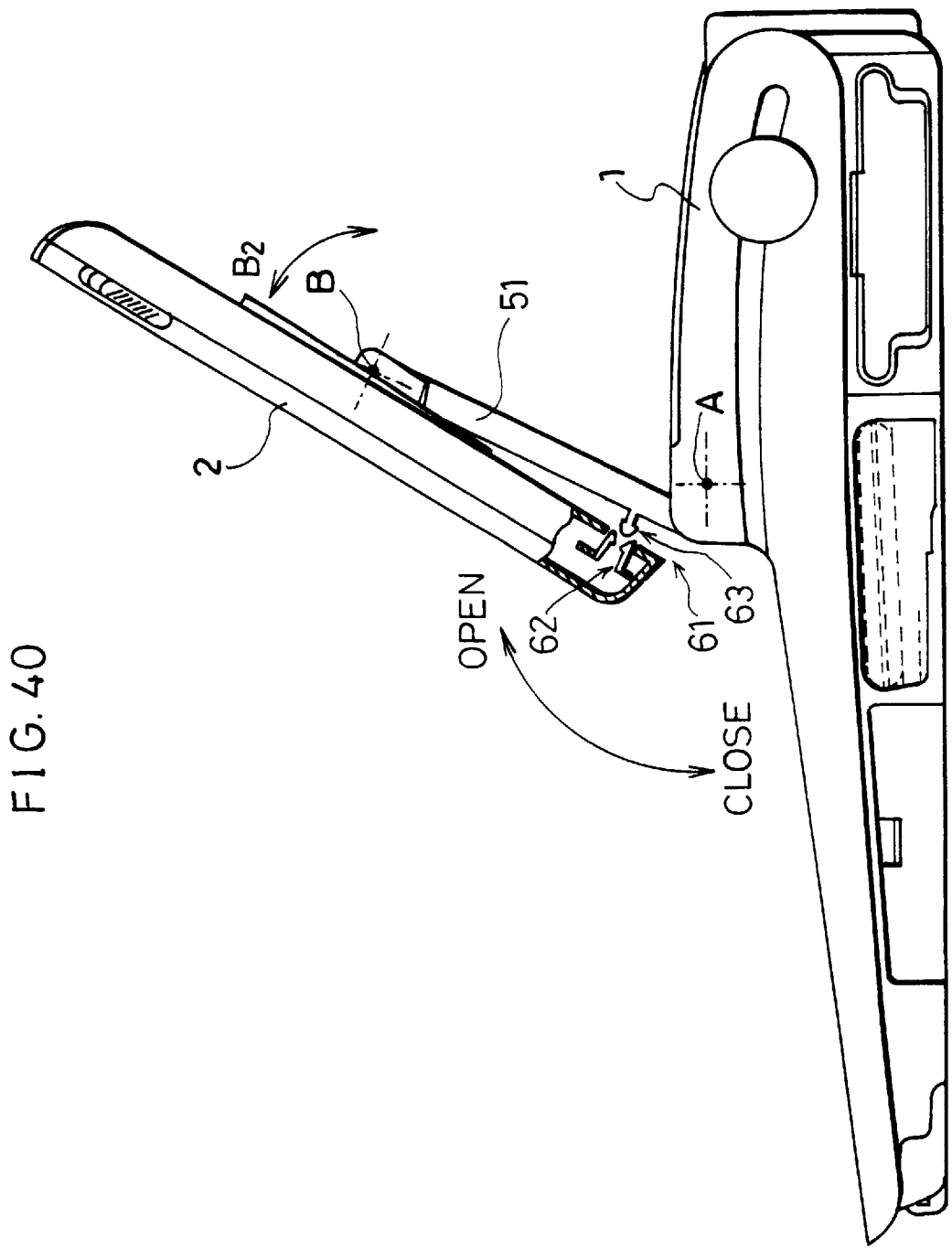
FIG. 40 is a partial cross section showing the state of the information processing apparatus unlocked by the locking mechanism in the first key-input position.

As in the case of the embodiment 1, one end of the connecting section 51 is rotatably connected to the main body 1 by the first hinge mechanism 10. As shown in FIG. 40, the connecting arm 51 rotates about the rotation center A in "open" and "close" directions with respect to the main body 1.

As shown in FIG. 39, the other end of the connecting section 51 is connected to the back surface of the input display section 2 by a second hinge mechanism 52 and a display rotation mechanism 53 (display rotating means). The connecting position of the connecting arm 51 to the input display section 2 will be described in more detail later.

Figure 41A:
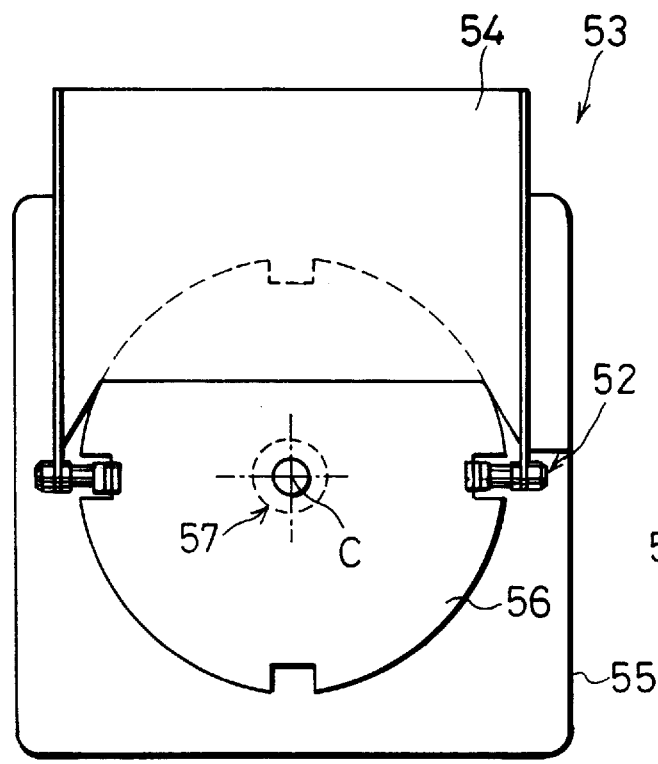
FIG. 41(a) is a plan view of the display rotation mechanism provided in the information processing apparatus.
Figure 41C:
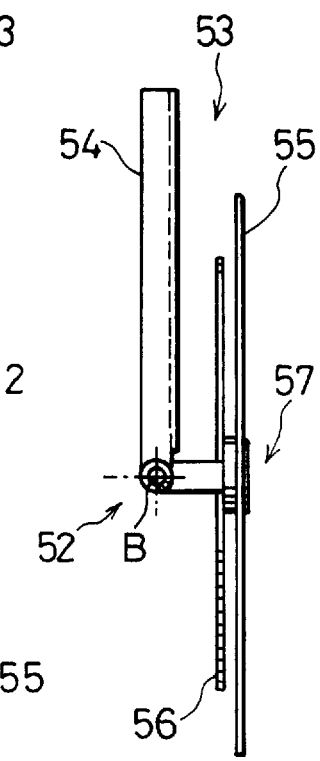
FIG. 41(c) is a side view of the display rotating mechanism.
Figure 41B:
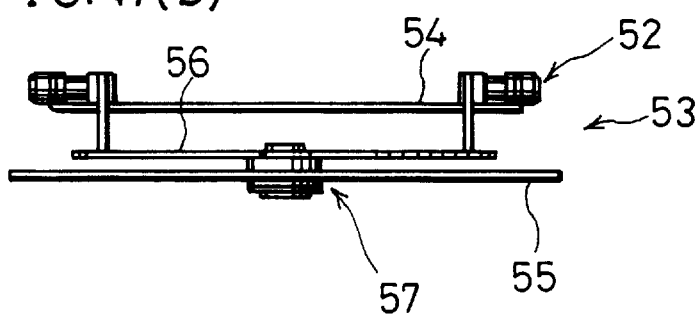
FIG. 41(b) is a front view showing the display rotating mechanism in the information processing apparatus.

As shown in FIG. 41(a) through FIG. 41(c), the display rotating mechanism is provided with an arm 54, a base section 55 and a circular plate 56. The arm 54 is fixed to the connecting arm 51. The base section 55 is fixed to the back surface of the input display section 2. The circular plate 56 is provided between the base section 55 and the arm 54. The circular plate 56 and the arm 54 are rotatably connected by the second hinge mechanism 52. In this arrangement, the arm section 54 rotates about the rotation center B with respect to the circular plate 56. The base section 55 is rotatably connected to the circular plate 56 by a rotation shaft 57. Thus, the base section 55 is rotated about the rotation center C with respect to the circular plate 56. Namely, the rotation shaft of the arm 54 is set perpendicular to the rotation shaft of the base section 55.

As described, the input display section 2 to which the base section 55 is secured rotates about the rotation center B (see FIG. 40) and also rotates about the rotation center C (see FIG. 38(b)) with respect to the connecting arm 51 to which the arm 54 is secured. Additionally, moving means of the present invention is composed of the first hinge mechanism 10 and the second hinge mechanism 52.

Figure 42:
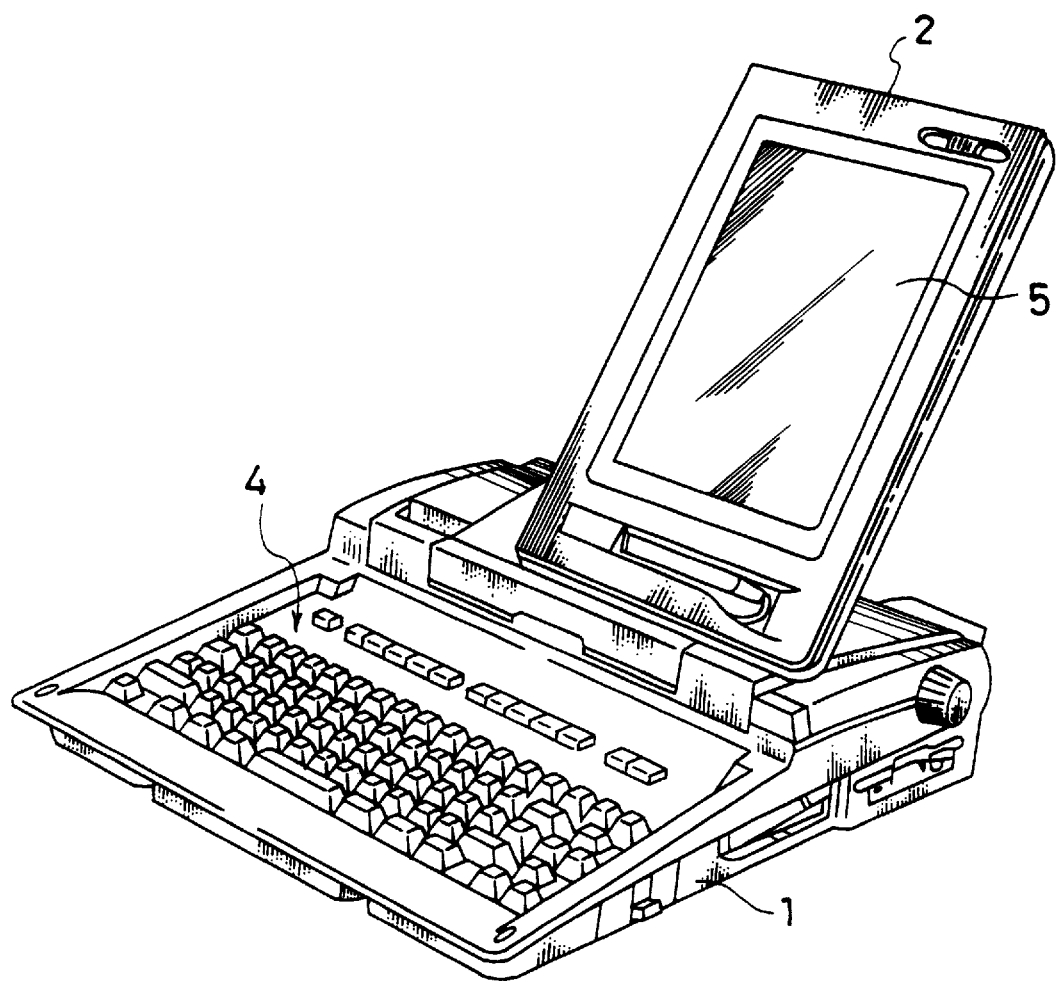
FIG. 42 is a perspective view showing the information processing apparatus in the second key-input position.
Figure 43:
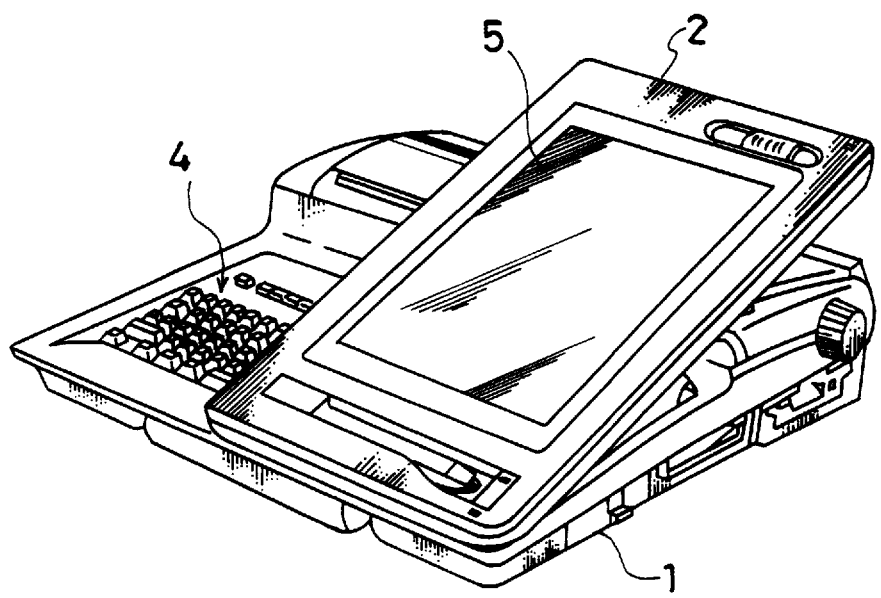
FIG. 43 is a perspective view showing the information processing apparatus in the second pen-input position.
Figure 44:
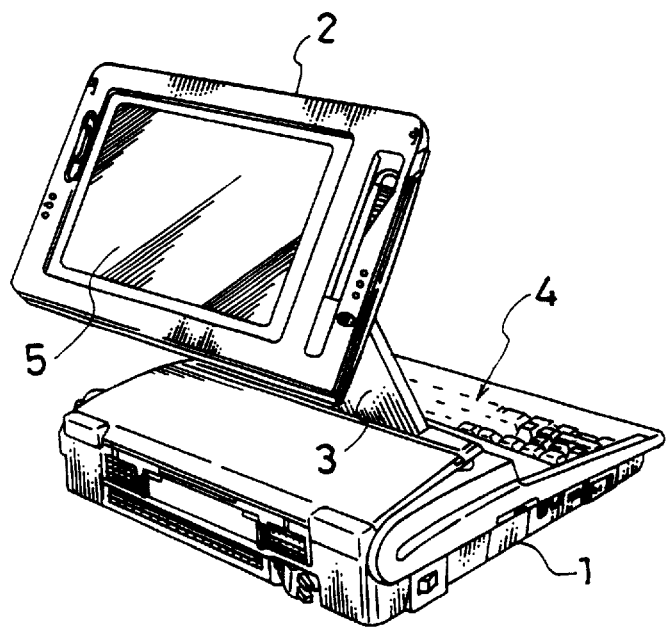
FIG. 44 is a perspective view showing the information processing apparatus with the display section at the back of the main body.

Having the above arrangements, the information processing apparatus of the present embodiment can take the following six positions:

1) a stored position shown in FIG. 39 at which an input display screen 5 of the input display section 2 is placed so as to face the key input control section 4 of the main body 1;
2) a first key-input position shown in FIG. 2 at which key-input is permitted while observing the input display screen 5 which is horizontally placed;
3) a first pen-input position shown in FIG. 3 at which pen-input is permitted on the input display screen 5 which is horizontally placed;
4) a second key-input position shown in FIG. 42 at which key-input is permitted while observing the display screen 5 which is vertically placed;
5) a second pen-input position shown in FIG. 43 at which pen-input is permitted on the display screen 5 which is vertically placed; and
6) an inverted position shown in FIG. 44 at which the input display screen 5 is inverted at the back of the main body 1.

Each of the above positions will be described below.

The apparatus position can be changed from the 1) stored position to the 2) first key-input position by rotating the input display section 2 holding the front edge of the input display section 2. The apparatus position can be further changed from the 2) first key-input position to the first pen-input position by pulling the bottom end of the input display section 2 towards the user.

As shown in FIG. 38(b), by rotating the input section 2 in the $C_1$ direction, the apparatus position can be changed from the 2) first key input position to the 4) second key-input position. As in the case of changing the apparatus position from the 2) first key input position to the 3) first pen-input position, by pulling the lower end of the input display section 2, the apparatus position can be changed from the 4) second key-input position to the 5) second pen-input position. Furthermore, by rotating the input display section 2 in the $C_2$ direction, the apparatus in the 3) first pen-input position to the 5) second pen-input position.

Lastly, from 2) the first key-input position, by rotating the input display section 2 by 180° about the rotation center C, the input display section 5 can be flipped over, and by further rotating the input display section 2 about the rotation center B so as to place the input display screen 5 behind the apparatus, the apparatus can be set in the 6) inverted position.

As described, by connecting the back surface of the input display section 2 to one end of the connecting arm 51 by the second hinge mechanism 52 and the display rotating mechanism 53, the input display section 2 can be rotated not only about the rotation center B with respect to the connecting arm 51 but also about the rotation center C in the $C_1$ direction and the $C_2$ direction. As a result, not only the key-input and pen-input while observing the horizontally placed screen but also the key-input and pen-input while observing the vertically placed screen are permitted.

As described, with the horizontally placed screen, data contained in a vertically placed A-4 size sheet cannot be displayed at one time. However, since the screen can be vertically placed in the arrangement of the present embodiment, all the data can be displayed at one time, thereby achieving an improved operation efficiency.

In the present embodiment, since the display rotating mechanism 53 is used, key-input and pen-input are permitted with the vertically placed input display section 2. The apparatus may be arranged such that only the key-input is permitted with the vertically placed input display section 2, and the pen-input is not permitted. In this case, the apparatus may be arranged such that the input display section 2 is rotatably connected to the front end of the connecting arm 51 by the rotation shaft 57 and that the position can be changed from the first key-input position to the first pen-input position by means of another mechanism.

Furthermore, by connecting the input-display section 2 to the connecting arm 51 by the use of the display rotating mechanism 53, the information processing apparatus can take the inverted position. Therefore, the input display section 2 can be placed behind the main body 1. For the above reason, the observing position of the input display section 5 is not limited to the position in front of the main body, the input display section 5 can be looked from behind the main body as well.

As in the case of the embodiment 1, since the connecting section 51 is provided on the back surface of the input display section 2, when rotating the input display section 2 about the rotation center B as shown in FIG. 40, the connecting arm 51 serves as a stopper. Namely, when the input display section 2 is rotated, it comes in contact with the connecting section 51 on the side of the back surface, the rotatable range of the input display section 2 is controlled within 180°. Therefore, in the first key-input position shown in FIG. 2 and the second key-input position shown in FIG. 2, the back surface of the input display section 2 comes in contact with and is supported by connecting section 51, and the rotation of the input-display section 2 in the direction of $B_2$ shown in FIG. 40 can controlled. As described, since the back surface of the input display section 2 is supported by the connecting section 51, unstable condition of the input display section 2 can be avoided, and the input display section 2 can be held in the above position in a stable condition.

Also in the first pen-input position shown in FIG. 3 and the second pen-input position shown in FIG. 43, the back surface of the input display section 2 comes in contact with and is supported by the connecting section 51 so as to control the rotation of the input display section 2 in the direction of $B_2$. As in the previous position, since the back surface of the input display section 2 is supported by the connecting section 51, an unstable condition of the input display section 2 can be avoided, and the input display section 2 can be held in the above position in a stable condition.

In the information processing apparatus of the present embodiment, the rotation center C of the input display section 2 is set such that with the horizontally placed input display section 2, a distance L from the rotation center C to the bottom end of the input display section 2 is equal to a distance M from the rotation center C to the upper end of the input display section 2 as shown in FIG. 38(*a*). Also, the rotation center C is set such that with the vertically placed input display section 2, a distance N from the rotation center C to the lower end of the input display section 2 is equal to the distance L and the distance M as shown in FIG. 38(*b*). Namely, with the horizontally placed screen, the rotation center C is at the position displaced from the center of the input display section 2 to the right as shown in FIG. 38(*a*).

The above mentioned position of the rotation center C is set in the case where the input display section 2 rotates in a clockwise direction. Therefore, in the case where the input display section 2 is rotated in a counterclockwise direction, with the horizontally placed screen, the rotation center C should be set at a position displaced from the center of the input display section 2 to the left.

As described, by setting the rotation center C such that the distance L is equal to the distance N, the connecting section 51 can be secured to the input display section 2 at the same position in the both cases where the input display section 2 is placed horizontally and vertically. Moreover, in the case where the input display section 2 is fixed to the connecting section 51 by the locking mechanism 61 (see FIG. 40) provided between the input display section 2 and the connecting section 51, the locking mechanism 61 can be used in common in both cased where the screen is placed horizontally and vertically. Additionally, in the case of providing fixing means which supports the bottom end of the cabinet of the input display section 2, the above members can be easily positioned.

Moreover, as shown in FIG. 38(*b*), a distance H from the rotation center C to the main body 1 can be maintained constant irrespectively of the position of the input display section 2 (horizontally or vertically placed or being rotated). Since the bottom end of the input display section 2 takes the closest position to the main body 1 when the input display section 2 is rotated by 45° from the horizontal position, by setting the rotation center C so as to satisfy $H>L\sqrt{2}$, second the input display section 2 can be rotated without contacting the cabinet of the main body 1.

As in the case of the previous embodiment 1, projections 1*c* are formed on both sides of the main body 1. Therefore, by setting the center of rotation C so as to satisfy L=M=N, not only when moving from the first key input position to the first pen-input position but also when moving from the second key-input position to the second pen-input position, the end of the input display section 2 first comes in contact with the projections 1*c*. Namely, by the projections 1*c*, a predetermined interval between the input display section 2 and the key operation section 4 can be maintained. Therefore, the above movements can be achieved without making the end of the input display section 2 in contact with the input display section 4, thereby preventing an occurrence of key-input error.

By setting the center of rotation C as explained above, in the first pen-input position shown in FIG. 45, one end of the input display section 2 can be supported by the front portion of the cabinet of the main body 1 in a stable condition. Therefore, a contact between the key input control section 4 and the input display section 2 can be surely prevented. In the second pen-input position, one end of the input display section 2 is supported by the front portion of the cabinet of the main body 1, a contact between the key input control section 4 and the input display section 2 can be prevented.

In the described information processing apparatus, normally a printer is provided at the back of the main body 1. Therefore, the center of rotation C is set such that a printing section 60 of the printer at the back of the main body 1 can be seen from the operator. As a result, an operation efficiency in positioning the printing start position can be improved, and printing out condition and the printed sheet can be easily confirmed.

Figure 46:
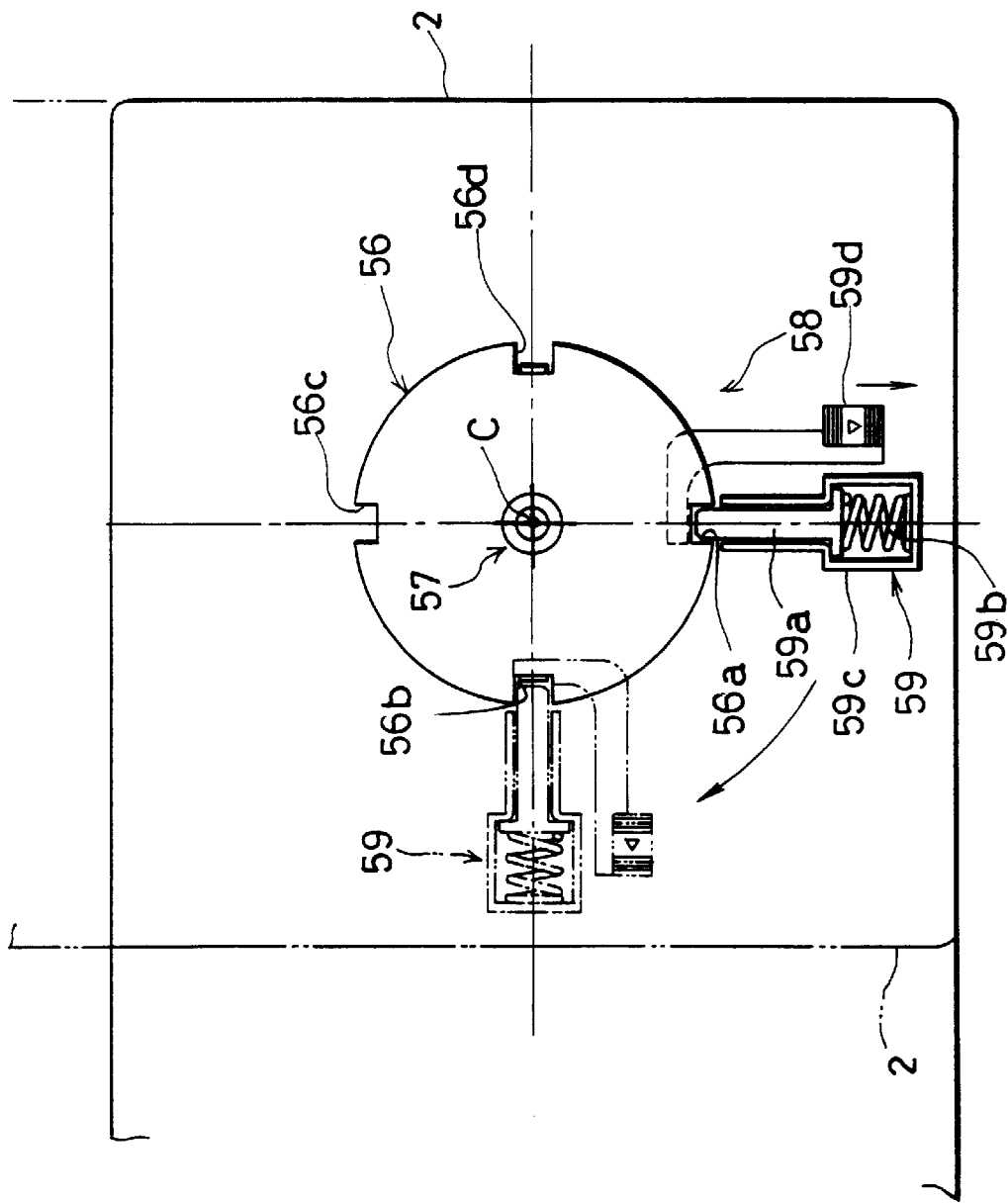
FIG. 46 is a plan view showing the rotation angle controlling mechanism in the information processing apparatus.
Figure 47:
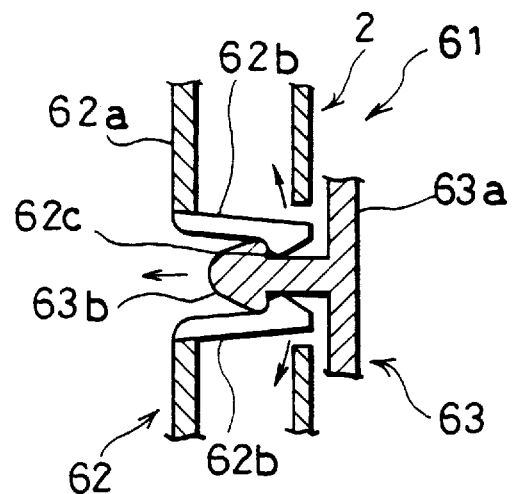
FIG. 47(a) is a cross section showing the rocking mechanism in the locked state.
FIG. 47(b) is a cross section showing the locking mechanism in the unlocked state.
Figure 47:
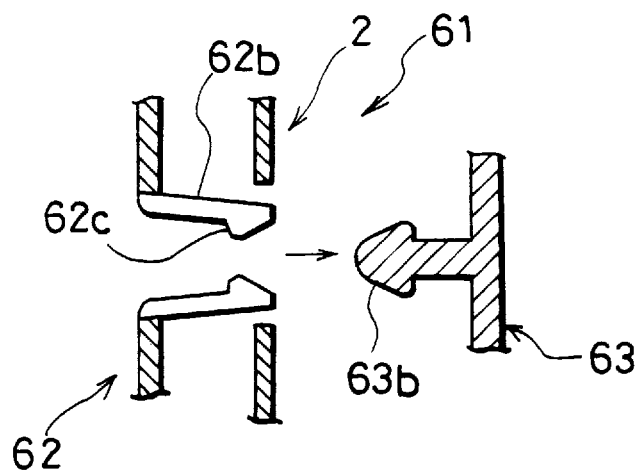

Furthermore, as shown in FIG. 46, the information processing apparatus of the present embodiment is provided with a rotation angle controlling mechanism 58 (rotation angle control means) for controlling a rotation angle of the input display section 2 at every 90°. The rotation angle controlling mechanism 58 is composed of a circular plate 56 in the display rotating mechanism 53 and a fixing mechanism 59 provided on the back surface of the input display section 2. In the circular plate 56, cut sections 56a, 56b, 56c and 56d are formed at every 90°. The fixing mechanism 59 is provided with a fixing pin 59a, a coil spring 59b, a guide 59c and a sliding hook 59d.

The fixing pin 59a is pushed toward the circular plate 56 by the coil spring 59b, and it is set so as to be engaged with either one of the cut sections 56a, 56b, 56c and 56d according to the rotation angle of the input display section 2. The respective movable ranges of the fixing pin 59a and the coil spring 59b are controlled by the guide 59c. By pressing down the sliding hook 59d and the fixing pin 59a towards the coil spring 59b, the fixing pin 59a is set come out of the cut section 56a, 56b, 56c or 56d.

In the above arrangement, by setting the fixing pin 59a so as to mate with either one of the cut sections 56a, 56b, 56c and 56d, the rotation of the input display section 2 with respect to the connecting section 51 is controlled, thereby fixing the both of the above components.

In FIG. 46, the solid line shows the input display section 2 in the first key input position. In this position, the fixing pin 59a mates with the cut section 56a, and the input display section 2 is fixed to the connecting arm 51 through the rotation angle controlling mechanism 58. In order to move the input display section 2 in the above position to the second key-input position, first, the sliding hook 59d is once pressed down so as to cancel the fixing pin 59a from mating with the cut section 56a. As a result, the input display section 2 is set so as to be rotatable. Then, as the input display section 2 is rotated by 90° in an arrow direction to a position shown by the two-dot long and two short dashes line, the fixing mechanism 59 reaches to the cut section 56b, and the fixing pin 59a pushed by the coil spring 59b mates with the cut section 56b. As a result, the apparatus is set in the second key-input position, thereby fixing the input display section 2 at this position.

In the above arrangement, the rotation of the input display section 2 is stopped at every 90° by the rotation angle controlling mechanism 58 so as to prevent the input display section 2 is fixed to the connecting section 51 at an intermediate angle in an unstable condition. Therefore, both in the first key-input position at which the input display screen 5 is horizontally placed and in the second key-input position at which the input-display screen 5 is vertically placed, the input display section 2 can be placed without being tilted, thereby preventing the display screen 5 from hitting at an intermediate angle in an unstable condition. Moreover, since the rotation of the key-input section 2 is controlled, during the movement from the first key-input position to the first pen-input position and from the second key-input position to the second pen-input position, horizontal and vertical reference lines of the input display section 2 respectively can be kept parallel to the reference lines of the main body 1. Thus, in the above movement, unstable condition of the input display section 2 can be prevented, thereby permitting the apparatus position to be changed smoothly.

As shown in FIG. 40, the information processing apparatus of the present embodiment is provided with a locking mechanism 61 (locking means) which enables the input display section 2 to be locked to and unlocked from the connecting section 51. The locking mechanism 61 is provided with a locking spring 62 provided in the input display section 2 and a lock pin 63 (fixing section) provided in the connecting section 51. FIG. 40 shows the position where the input display section 2 is unlocked from the connecting section 51.

As shown in FIG. 47(a), in the lock spring 62, a fixing members 62a are formed for securing the lock spring 62 to the input display section 2. The lock spring 62 also has two spring members 62b which are formed so as to respectively projected out from the fixing members 62a, and the section formed by the two spring members 62b serves as a stopper 62c.

The lock pin 63 has a fixing member 63a for securing the lock pin 63 to the connecting section 51 and a projection 63b formed so as to be engaged with the section 62c of the lock spring 62. More specifically, a bolt head shaped part formed at the end portion of the projection 63b is engaged with the stopper 62c.

As described, in the information processing apparatus of the present embodiment, the lock pin 63 is formed at the bottom portion of the connecting section 51. On the back surface side of the connection section 51, the lock springs 62 are formed both at the position where the lock pin 63 serves to lock the input display section 2 at the horizontal position and at the position where the lock pin 63 serves to lock the input display section 2 at the vertical position. Namely, the lock pin 63 can be used in common in the horizontal position and the vertical position of the input display section 2. In the apparatus of the present embodiment, in order to hold the input display section 2 in a stable condition, two lock pins 63 are formed on the connecting arm 51. For the two lock pins 63, two pairs of lock springs 62 are formed respectively at the predetermined position for the horizontal screen and at the predetermined position for the vertical screen.

In the first key-input position shown in FIG. 2 and the second key-input position shown in FIG. 42, when the bottom portion of the input display section 2 is pulled toward the user (i.e., when the input display section 2 is rotated about the center of rotation B with respect to the connecting section 51), the stopper 62c of the lock spring 62 in the fixed position shown in FIG. 47(a) is opened, and the stopper 62c comes off the projection 63b, thereby unlocking the input display section 2 from the connecting section 51. On the contrary, from the unlocked position shown in FIG. 47(b), when the input display section 2 is pressed onto the connecting section 51, the stopper 62c of the lock spring 62 is opened and the projection 62c is inserted into and is engaged with the stopper 62c, thereby locking the input display section 2 to the connecting section 51.

In the present embodiment, since the locking mechanism 61 which enables the input display section 2 to the connecting section 51 is provided, during the movement from the stored position to the first key-input position, the input display section 2 is fixed to the connecting section 51, thereby achieving a smoother rotating movement. In the first key-input position and the second key-input position, the rotation of the input-display section 2 is controlled by the locking mechanism 61. Therefore, the input display section 2 can be set in a stable condition in the first key-input position and the second key-input position.

Moreover, since the locking mechanism 61 unlocks the input display section 2 only by pulling the bottom portion of the input display section 2, the apparatus position can be smoothly changed, thereby improving an operation efficiency.

In the information processing apparatus of the present embodiment, the lock pin 63 is used in common in the horizontal position and the vertical position of the input display section 2. Therefore, compared with the case where rocking mechanisms are required for the respective positions, the simplified structure can be achieved.

Figure 48:
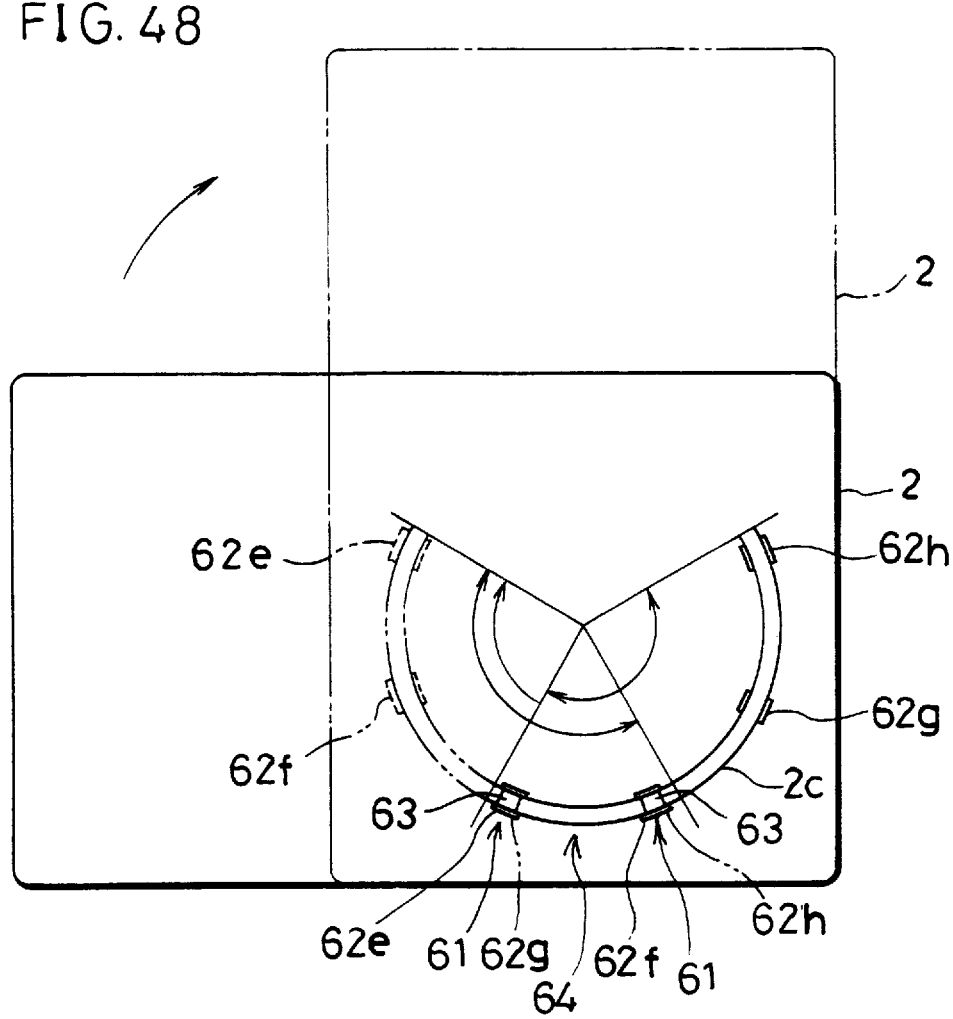
FIG. 48 is an explanatory view showing the locking guide mechanism provided in the information processing apparatus.

Moreover, the apparatus position can be changed from the first key-input position to the second key-input position without unlocking the input display section 2 from the connecting section 51 by the locking mechanism 61. For this feature, as shown in FIG. 48, the lock guiding mechanism 64 (lock guiding means) is provided in the information processing apparatus of the present embodiment.

The lock guiding mechanism 64 is composed of the lock pin 63 provided in the locking mechanism 61 and the lock guiding groove 2c provided on the input display section 2 for guiding the end of the projection 63b of the lock pin 63. When the input display section 2 is rotated, the end of the lock pin 63 is guided along the lock guiding groove 2b. The lock springs 62 in the locking mechanism 61 are provided along the lock guiding groove 2b with a predetermined interval. Here, in order to distinguish lock springs 62 (four in total), they are respectively designated by 62e, 62f, 62g and 62h from the left in the figure.

In the above arrangement, the apparatus position can be changed from the first key-input position to the second key-input position without unlocking the input display section 2 from the connecting section 51 by the locking mechanism 61.

Figure 49:
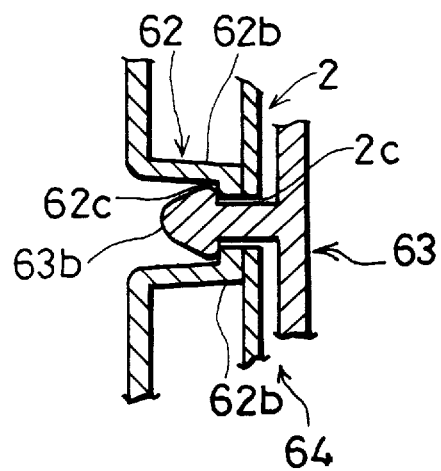
FIG. 49 is a cross section showing a lock pin of the locking mechanism to be guided by the locking guide mechanism.

In the first key-input position shown in FIG. 2, when the input display section 2 is pressed onto the connecting section 51, the lock pin 63 is engaged-with the locking spring 62 as shown in FIG. 49. In this position, the lock pins 63 are respectively stopped by the lock springs 62e and 62f, and the input display section is locked to the connecting section 51 as shown in FIG. 48. In this state, while the input display section 2 is rotated in an arrow direction to the vertical position shown by two-dot long and two short dashed line, the end of each rock pin 63 is guided along the lock guiding groove 2b of the input display section 2, thereby enabling the apparatus position to be moved to the second key-input position shown in FIG. 42 without unlocking the input display section 2 by the locking mechanism 61. In this position, as shown in FIG. 48, the lock pins 63 are respectively interlocked with the lock springs 62g and 62h (corresponding to the positions of the lock springs 62e and 62f in the horizontal position of the screen). From this position, by pulling the input display section 2 towards the user, the input display section 2 can be unlocked from the connecting section 51.

As described, since the lock guiding mechanism 64 is provided, irrespectively of the locked state of the input display section 2, the input display section 2 can be rotated from the horizontal position to the vertical position, thereby achieving an improvement in the operation efficiency. Moreover, the input display section 2 is not unlocked at an intermediate angle, which also permits an improvement in the operation efficiency. Furthermore, since the lock guiding mechanism 64 is provided, a stable rotating movement of the input display section 2 can be achieved, thereby permitting a still improved function of the rotation angle controlling mechanism 14.

Additionally, in order to provide the lock pin 63 used in common and the lock guiding mechanism 64, it is necessary to set the rotation center C of the input display section so as to satisfy L=M=N.

As described, according to the arrangement of the information processing apparatus of the present embodiment, the position of the input display section 2 can be selected between the horizontal position and the vertical position according to the sheet which stores thereon data to be processed. In the convention device, for example, in the case of using a vertically placed A-4 size sheet, if too many rows exist in one page, all the data contained in one page cannot be displayed on the horizontally placed input display screen 5. However, in the information processing apparatus of the present embodiment, with the use of the vertically placed input display screen 5, data in a greater number of rows can be displaced, and thus all the data contained in one page may be displayed, thereby achieving an operation efficiency in dealing with the case where many rows of data are contained in one page.

When the input display section 2 is further rotated by 90° from the vertical position, the input display section 2 is inverted. From this position, by rotating the input display section 2 down to the back of the main body 1, the user can see the input display section 2 from behind the main body 1.

In the information processing apparatus of the present embodiment, the input display section 2 locked to the connecting section 51 by the locking mechanism 61, thereby achieving stable operation at any input positions. Moreover, the apparatus position can be changed from the key-input position to the pen-input position with the locking mechanism locked by the lock guiding mechanism 64. Thus, also by the above mechanisms, the operation efficiency of the apparatus can be improved.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An information processing apparatus comprising:

a main body including a key-control section;

an input display section including data input means on a display screen thereof;

a connecting member for connecting said input display section to said main body;

a flexible signal wire which passes through an inner space of said connecting member and electrically connects said main body and said input display section;

a guide shaft member rotatable provided on one end of said connecting member so that its center of rotation coincides with that of said second hinge means;

a guide shaft connecting member for connecting said guide shaft member to the back surface of said input display section, wherein a first through-hole is formed in said guide shaft member so that its cross section circularly expands into the inner space of said connecting member in order to allow a free passage for said flexible signal wire and a second through-hole is formed in said guide shaft connecting member so as to join to said first through-hole in order to allow a free passage for said flexible signal wire;

first hinge means for rotatably connecting one end of said connecting member to said main body;

second hinge means for rotatably connecting the other end of said connecting member to a back surface of said input display section; and locking means for locking said input display section to said connecting member and unlocking said input display section from said connecting member, said apparatus being arranged so as to take the following three positions:

a stored position at which the display screen of said input display section is placed so as to face the key-control section of said main body;

a first input control position at which the back surface of said input display section is supported by said connecting member, and the display screen of said input display section forms a predetermined angle to the key-control section of said main body so that key-input is permitted using the key-control section while observing the display screen of said input display section; and a second input control position at which the back surface of said input display section is supported by said connecting member, and the display screen of said input display section is placed facing upward and substantially flat above the key-control section of said main body so that data-input is permitted using said data input means, said locking means permits said connecting member to be locked to said input display section during a movement from said stored position to said first input control position, or from said first input position to said stored position and to be unlocked from said input display section during a movement from said first input position to said second input position or from said second input position to said first input position.

2. The information processing apparatus as set forth in claim 1, wherein:

said locking means includes a shaft and a section to be engaged with the shaft, and the shaft is provided on said input display section or said connecting member and the section to be engaged with the shaft is provided on said input display section or said connecting member on which the shaft is not provided.

3. The information processing apparatus as set forth in claim 1, further comprising:

inclination control means for controlling inclination of said connecting member to said main body in said first input control position.

4. The information processing apparatus as set forth in claim 1, further comprising:

a covering member for covering said first through-hole formed in said input guide shaft member.

5. An information processing apparatus comprising:

a main body including a key-control section; an input display section including data input means on a display screen thereof;

a connecting member for connecting said input display section to said main body;

first hinge means for rotatably connecting one end of said connecting member to said main body; and second hinge means for rotatably connecting the other end of said connecting member to said input display section, and variable efficiency braking force means for exerting a braking force on said connecting member being rotated and for changing the efficiency of said exerted braking force in accordance with a rotating direction of said connecting member with respect to said main body, said apparatus being arranged so as to take the following three positions:

a stored position at which the display screen of said input display section is placed so as to face the key-control section of said main body;

a first input control position at which the display screen of said input display section forms a predetermined angle to the key-control section of said main body so that key-input is permitted using the key-control section while observing the display screen of said input display section; and a second input control position at which the display screen of said input display section is placed facing upward and substantially flat above the key-control section of said main body so that data-input is permitted using said data input means.

6. The information processing apparatus as set forth in claim 5, wherein:

said variable efficiency braking force means includes braking force control means for changing the efficiency of said braking force exerted on said connecting member being rotated in accordance with a rotation angle of said connecting member.

7. The information processing apparatus as set forth in claim 5, wherein:

said variable efficiency braking force means includes at least one one-way clutch associated with said first hinge means and which provides a greater resistance against movement of said connecting member in a first rotational direction with respect to said main body than toward movement of said connecting member in an opposite direction.

8. An information processing apparatus comprising:

a main body including a key-control section;

an input display section including data input means on a display screen thereof;

a connecting member for connecting said input display section to said main body;

first hinge means for rotatably connecting one end of said connecting member to said main body; and second hinge means for rotatably connecting the other end of said connecting member to said input display section, said apparatus being arranged so as to take the following three positions:

a stored position at which the display screen of said input display section is placed so as to face the key-control section of said main body;

a first input control position at which the display screen of said input display section forms a predetermined angle to the key-control section of said main body so that key-input is permitted using the key-control section while observing the display screen of said input display section; and a second input control position at which the display screen of said input display section is placed facing upward and substantially flat above the key-control section of said main body so that data-input is permitted using said data input means, said apparatus further comprising:

a rotatable range controlling member for controlling a rotatable range of said input display section with respect to said connecting member by contacting the back surface of said input display section, said rotatable range controlling member being provided on said connecting member so as to be capable of moving forward and backward; and drive means for moving said rotatable range controlling member along an orbit of rotation of said input display section when said connecting member is rotated in an "open" direction during a movement from said stored position to said first input control position and for moving said rotatable range controlling member so as to come off the orbit of rotation of said input display section when said connecting member is rotated in a "close" direction during a movement from said first input control position to said second input control position or to said stored position.

9. The information processing apparatus as set forth in claims 8, wherein:
said drive means includes angle detection means for detecting a rotation angle of said input display section so as to drive said rotatable range control means based on a rotation angle of said input display section detected by said angle detection means.

10. An information processing apparatus comprising:
a main body including a key-control section; and
an input display section including data input means on a display screen thereof;
said apparatus being arranged so as to take the following three positions:
a stored position at which the display screen of said input display section is placed so as to face the key-control section of said main body;
a first input control position at which the display screen of said input display section forms a predetermined angle to the key-control section of said main body so that key-input is permitted using the key-control section while observing the display screen of said input display section; and
a second input control position at which the display screen of said input display section is placed facing upward and substantially flat above the key-control section of said main body so that data-input is permitted using said data input means, said apparatus further comprising:
display position detection means for detecting whether said input display section is in said first input control position or in said second input control position, and
key input determination means for determining a key-input invalid when said display position detection means detects that said input display position is in said second input control position.

11. The information processing apparatus as set forth in claim 10, further comprising:
a connecting member for connecting said main body to said input display section provided so that one end thereof is secured to the back surface of said input display section, and
wherein:
said display position detection means comprises a switch mechanism mounted in said connecting member which detects whether or not the back surface of said input display section is in contact with an outer surface of said connecting member.

12. An information processing apparatus comprising:
a main body including a key-control section; and
an input display section including data input means on a display screen thereof;
said apparatus being arranged so as to take the following three positions:
a stored position at which the display screen of said input display section is placed so as to face the key-control section of said main body;
a first input control position at which the display screen of said input display section forms a predetermined angle to the key-control section of said main body so that key-input is permitted using the key-control section while observing the display screen of said input display section; and
a second input control position at which the display screen of said input display section is placed facing upward and substantially flat above the key-control section of said main body so that data-input is permitted by said data input means;
said apparatus further comprising:
display position detection means for detecting whether said input display position is in said first input control position or in said second input control position, said display position detection means providing a signal indicative of said input display section being disposed in either said first input control position or said second input control position; and
display voltage control means for providing a first display voltage and a second display voltage to said input display section, said first display voltage differing from said second display voltage, and for altering between providing either said first display voltage or said second display voltage to said input display section in response to said signal generated by said display position detection means, wherein a change in display voltage alters the display screen contrast to compensate for a difference in angle of sight with respect to said display section between said first input control position and said second input control position.

13. The information processing apparatus as set forth in claim 12, further comprising:
a connecting member for connecting said main body to said input display section provided so that one end thereof is secured to the back surface of said input display section, and
wherein:
said display position detection means comprises a switch mechanism mounted in said connecting member which detects whether or not the back surface of said input display section is in contact with an outer surface of said connecting member.

14. An information processing apparatus comprising:
a main body including a key-control section; and
an input display section including data input means on a display screen thereof, coordinates on a surface of said data input means corresponding to coordinates on a surface of said display screen;
said apparatus being arranged so as to take the following three positions:
a stored position at which the display screen of said input display section is placed so as to face the key-control section of said main body;
a first input control position at which the display screen of said input display section forms a predetermined angle to the key-control section of said main body so that key-input is permitted using the key-control section and data input is permitted by said data input means while observing the display screen of said input display section; and
a second input control position at which the display screen of said input display section is placed facing upward and substantially flat above the key-control section of said main body so that data-input is permitted using said data input means;
said apparatus further comprising:
display position detection means for detecting whether said input display section is positioned in said first input control position or in said second input control position, said display position detection means providing a signal indicative of said input display section being disposed in either said first input control position or said second input control position; and coordinate adjusting means for eliminating coordinate errors associated with coordinates on said surface of the data input means and corresponding coordinates on said surface of the display screen, said coordinate adjusting means using a first set of coordinate adjusting data and a second set of coordinate adjusting data, wherein said coordinate adjusting means compensates for a difference in angle of sight with respect to said input display section between said first input control position and said second input control position by selecting between using either said first set of coordinate adjusting data or said second set of coordinate adjusting data in response to said signal generated by said display position detection means.

15. The information processing apparatus as set forth in claim 14, further comprising:

a connecting member for connecting said main body to said input display section provided so that one end thereof is secured to the back surface of said input display section, and wherein:

said display position detection means comprises a switch mechanism mounted in said connecting member which detects whether or not the back surface of said input display section is in contact with an outer surface of said connecting member.

16. An information processing apparatus comprising:

a main body including a key-control section;

an input display section allowing data input directly on a display screen whose length is different from width;

a connecting member, said connecting member connecting said input display section to said main body;

display moving arrangement comprising a first hinge member that rotatably connects one end of said connecting member to said main body, a second hinge member that rotatably connects an opposite end of said connecting member to a back surface of said input display section, said second hinge member having a rotation axis parallel to a rotation axis of said first hinge member, and a display orientation rotation mechanism connected to said second hinge member, said rotation mechanism permitting rotation of said input display section about an axis intersecting and orthogonal to said rotation axis of said second hinge member;

wherein said display moving arrangement enables said input display section to assume at least the following four positions:

a stored position at which the display screen of said input display section is placed so as to face the key-control section of said main body;

a first input control position at which the display screen of said input display section forms a predetermined angle to said key-control section of said main body so that key-input is permitted using the key-control section while observing a horizontally placed display screen orientation;

a second input control position at which the display screen of said input display section is placed facing upward and substantially flat above the key-control section of said main body so that data input can be made directly to the display screen while observing a horizontally placed display screen orientation; and a third input control position at which the display screen of said input display section forms a predetermined angle to the key-control section of the main body so that key-input is permitted using the key-control section while observing a vertically placed display screen orientation obtained by rotating said input display section by 90° by said display orientation rotation mechanism.

17. An information processing apparatus comprising:

a main body including a key-control section;

an input display section allowing data input directly on a display screen whose length is different from width;

a connecting member, said connecting member connecting said input display section to said main body;

display moving arrangement comprising a first hinge member that rotatably connects one end of said connecting member to said main body, a second hinge member that rotatably connects an opposite end of said connecting member to a back surface of said input display section, said second hinge member having a rotation axis parallel to a rotation axis of said first hinge member, and a display orientation rotation mechanism comprising a shaft connected to said hinge member, said shaft permitting rotation of said input display section about an axis intersecting and orthogonal to said rotation axis of said second hinge member;

wherein said display moving arrangement enables said input display section to assume at least the following five positions:

a stored position at which the display screen of said input display section is placed so as to face the key-control section of said main body;

a first input control position at which the display screen of said input display section forms a predetermined angle to said key-control section of said main body so that key-input is permitted using the key-control section while observing a horizontally placed display screen orientation;

a second input control position at which the display screen of said input display section is placed facing upward and substantially flat above the key-control section of said main body so that data input can be made directly to the display screen while observing a horizontally placed display screen orientation;

a third input control position at which the display screen of said input display section forms a predetermined angle to the key-control section of the main body so that key-input is permitted using the key-control section while observing a vertically placed display screen orientation obtained by rotating said input display section by 90° by said display orientation rotation mechanism; and a fourth input control position at which the display screen of said input display section is placed facing upward and substantially flat above said key-control section of said main body so that data input can be made directly to the display screen while observing a vertically placed display screen orientation obtained by rotating said input display section by 90° from said second input control position by said display orientation rotation mechanism.

18. The information processing apparatus as set forth in claim 17, further comprising:

rotation angle control means for controlling rotation of said input display section by said display rotating means at every 90°.

19. The information processing apparatus as set forth in claim 18, wherein:

said input display section includes a rotatably provided rotation support plate in which four grooves are formed at every 90°, and a member to be engaged with one of the grooves so as to control the rotation of said input display section.

20. The information processing apparatus as set forth in claim 17, further comprising:

locking means for locking said input display section to said connecting member and unlocking said input display section from said connecting member.

21. The information processing apparatus as set forth in claim 18, wherein:

said locking means are respectively formed at a predetermined position on the back surface of said input display section and a predetermined position on said connecting member so that said locking means can be used both in said first input control position and in said third input control position.

22. The information processing apparatus as set forth in claim 21, further comprising:

lock guiding means for guiding a securing member of said locking means with a rotating movement of said input display section so that said input display section is rotatable between a horizontally placed position and a vertically placed position with said input display section kept locked to said connecting member by said locking means.

23. The information processing apparatus as set forth in claim 17, wherein:

an axis of rotation of said input display section to be rotated by said display rotating means is located at a position slightly displaced from the center of said input display section so that a distance from the center of rotation to said input display screen in said first input control position is equal to a distance from the center of rotation of said input display section to a bottom end of said input display section in said third input control position.

24. The information processing apparatus as set forth in claim 5, wherein said variable efficiency braking force means includes:

first brake means for exerting a predetermined brake force against a rotating movement of said connecting member with respect to said first hinge means;

second brake means for exerting a predetermined brake force only against a predetermined rotating direction; and brake coupling means, provided between said first brake means and said second brake means, for combining said second brake means with said first brake means when a rotation angle of the connecting member falls within a predetermined range.

25. An information processing apparatus comprising:

a main body including a key-control section;

an input display section including data input means on a display screen whose length is different from width;

a connecting member for connecting said input display section to said main body;

display rotating means for rotating said input display section by 90°; and moving means which enables said input display section to take the following five positions:

a stored position at which the display screen of said input display section is placed so as to face the key-control section of said main body;

a first input control position at which the display screen of said input display section forms a predetermined angle to said key-control section of said main body so that key-input is permitted using the key-control section while observing a horizontally placed display screen;

a second input control position at which the display screen of said input display section is placed facing upward and substantially flat above the key-control section of said main body so that data-input is permitted using the data input means while observing a horizontally placed display screen;

a third input control position at which the display screen of said input display section forms a predetermined angle to the key-control section of the main body so that key-input is permitted using the key-control section while observing a vertically placed display screen obtained by rotating said input display section by 90° by said display rotating means; and an inverted position at which said input display screen is inverted at the back of the main body, wherein said moving means includes a first hinge means for rotatably connecting one end of said connecting member to said main body and a second hinge means for rotatably connecting an opposite end of said connecting member to the back surface of said input display section, and said display rotating means rotates the input display section about an axis intersecting and orthogonal to a rotation axis of said second hinge means.

26. An information processing apparatus comprising:

a main body including a key-control section;

an input display section including data input means on a display screen whose length is different from width;

a connecting member for connecting said input display section to said main body; and display rotating means for rotating said input display section; and moving means which enables said input display section to take the following six positions:

a stored position at which the display screen of said input display section is placed so as to face the key-control section of said main body;

a first input control position at which the display screen of said input display section forms a predetermined angle to said key-control section of said main body so that key-input is permitted using the key-control section while observing a horizontally placed display screen;

a second input control position at which the display screen of said input display section is placed facing upward and substantially flat above the key-control section of said main body so that data-input is permitted using the data input means while observing a horizontally placed display screen;

a third input control position at which the display screen of said input display section forms a predetermined angle to the key-control section of the main body so that key-input is permitted using the key-control section while observing a vertically placed display screen obtained by rotating said input display section by 90° by said display rotating means;

a fourth input control position at which the display screen of said input display section is placed facing upward and substantially flat above said key-control section of said main body so that data-input is permitted using said data input means while observing a vertically placed display screen obtained by rotating said input display section by 90° from said second input control position by said display rotating means; and an inverted position at which said input display screen is inverted at the back of the main body, wherein said moving means includes a first hinge means for rotatably connecting one end of said connecting member to said main body and a second hinge means for rotatably connecting an opposite end of said connecting member to the back surface of said input display section, and said display rotating means rotates the input display section about an axis intersecting and orthogonal to a rotation axis of said second hinge means.

* * * * *